INVENTOR.
ROGER C. GREENHALGH
BY
J. X. Mosser
AGENT.

Feb. 3, 1959

R. C. GREENHALGH 2,872,666

DATA TRANSFER AND TRANSLATING SYSTEM

Filed Dec. 21, 1955

NUMERIC CORE STORAGE

D0 = SIGN POSITION
8 = −    9 = +

| WORD | SIGN D0 | D1 | D2 | D3 | D4 | D5 | D6 | D7 | D8 | D9 | D10 |
|---|---|---|---|---|---|---|---|---|---|---|---|
| W0 | 0100001 / 9 | 1000100 / 2 | 0110000 / 5 | 1000010 / 3 | 0100100 / 7 | 0100010 / 8 | 0100001 / 9 | 1010000 / 0 | 1010000 / 0 | 1010000 / 0 | 1010000 / 0 |
| W1 | 0100010 / 8 | 1001000 / 1 | 1001000 / 1 | 1000100 / 2 | 0100010 / 8 | 1010000 / 0 | 1010000 / 0 | 1010000 / 0 | 1010000 / 0 | 1010000 / 0 | 1010000 / 0 |
| W2 | 0100001 / 9 | 0100010 / 8 | 0100001 / 9 | 1010000 / 0 | 1010000 / 0 | 1010000 / 0 | 1010000 / 0 | 1010000 / 0 | 1010000 / 0 | 1010000 / 0 | 1010000 / 0 |
| W3 | 0100010 / 8 | 0100001 / 9 | 1010000 / 0 | 1010000 / 0 | 0101000 / 7 | 0100010 / 8 | 0101000 / 6 | 0110000 / 5 | 0101000 / 6 | 1010000 / 0 | 1010000 / 0 |
| W4 | 0100001 / 9 | 1001000 / 1 | 0101000 / 6 | 0101000 / 6 | 0110000 / 5 | 0100010 / 8 | 0100001 / 9 | 1010000 / 0 | 1010000 / 0 | 1010000 / 0 | 1010000 / 0 |
| W5 | 0100010 / 8 | 1000100 / 4 | 0110000 / 4 | 0110000 / 5 | 0110000 / 5 | 1010000 / 0 | 1010000 / 0 | 1000100 / 3 | 1010000 / 0 | 1010000 / 0 | 1010000 / 0 |
| W6 | 0100001 / 8 | 1001000 / 1 | 1010000 / 0 | 0101000 / 6 | 0101000 / 6 | 0101000 / 6 | 0100100 / 7 | 1010000 / 0 | 1010000 / 0 | 1010000 / 0 | 1010000 / 0 |
| W7 | 0100001 / 9 | 1010000 / 0 | 1010000 / 0 | 0100100 / 7 | 0110000 / 5 | 1010000 / 0 | 1010000 / 0 | 0100001 / 9 | 1000100 / 2 | 0100010 / 8 | 1000010 / 3 |
| W8 | 0100001 / 9 | 1001000 / 1 | 1000100 / 2 | 1000100 / 2 | 1000010 / 3 | 0101000 / 6 | 1010000 / 0 | 1010000 / 0 | 1010000 / 0 | 1010000 / 0 | 1010000 / 0 |
| W9 | 0100010 / 8 | 0100010 / 8 | 1010000 / 0 | 1000100 / 2 | 1000010 / 3 | 1010000 / 0 | 1010000 / 0 | 1010000 / 0 | 1010000 / 0 | 1010000 / 0 | 1010000 / 0 |

DIGIT

FIG. 7

Feb. 3, 1959     R. C. GREENHALGH     2,872,666
DATA TRANSFER AND TRANSLATING SYSTEM
Filed Dec. 21, 1955     38 Sheets-Sheet 6

FIG. 8.

FIG_9.

Feb. 3, 1959    R. C. GREENHALGH    2,872,666
DATA TRANSFER AND TRANSLATING SYSTEM
Filed Dec. 21, 1955    38 Sheets-Sheet 8

| CHARAC-TER | TAPE CODE | BI-QUI CODE EVEN | | ODD | | 2/5 CODE EVEN | ODD |
|---|---|---|---|---|---|---|---|
| | | B | Q | B | Q | | |
| | | 5 | 1 | 0 | 0 | 6 0 2 | 1 |
| A | C-B-A-1 | 5 | 1 | 0 | 1 | 6 0 0 | 1 |
| B | C-B-A-2 | 5 | 1 | 0 | 2 | 6 0 0 | 2 |
| C | B-A-2-1 | 5 | 1 | 0 | 3 | 6 0 0 | 3 |
| D | C-B-A-4 | 5 | 1 | 0 | 4 | 6 0 3 | 1 |
| E | B-A-4-1 | 5 | 1 | 5 | 0 | 6 0 3 | 2 |
| F | B-A-4-2 | 5 | 1 | 5 | 1 | 6 0 6 | 0 |
| G | C-B-A-4-2-1 | 5 | 1 | 5 | 2 | 6 0 6 | 1 |
| H | C-B-A-8 | 5 | 1 | 5 | 3 | 6 0 6 | 2 |
| I | B-A-8-1 | 5 | 1 | 5 | 4 | 6 0 6 | 3 |
| | | 5 | 2 | 0 | 0 | 6 1 2 | 1 |
| J | B-1 | 5 | 2 | 0 | 1 | 6 1 0 | 1 |
| K | B-2 | 5 | 2 | 0 | 2 | 6 1 0 | 2 |
| L | C-B-2-1 | 5 | 2 | 0 | 3 | 6 1 0 | 3 |
| M | B-4 | 5 | 2 | 0 | 4 | 6 1 3 | 1 |
| N | C-B-4-1 | 5 | 2 | 5 | 0 | 6 1 3 | 2 |
| O | C-B-4-2 | 5 | 2 | 5 | 1 | 6 1 6 | 0 |
| P | B-4-2-1 | 5 | 2 | 5 | 2 | 6 1 6 | 1 |
| Q | B-8 | 5 | 2 | 5 | 3 | 6 1 6 | 2 |
| R | C-B-8-1 | 5 | 2 | 5 | 4 | 6 1 6 | 3 |
| | | 5 | 3 | 0 | 0 | 6 2 2 | 1 |
| | | 5 | 3 | 0 | 1 | 6 2 0 | 1 |
| S | A-2 | 5 | 3 | 0 | 2 | 6 2 0 | 2 |
| T | C-A-2-1 | 5 | 3 | 0 | 3 | 6 2 0 | 3 |
| U | A-4 | 5 | 3 | 0 | 4 | 6 2 3 | 1 |
| V | C-A-4-1 | 5 | 3 | 5 | 0 | 6 2 3 | 2 |
| W | C-A-4-2 | 5 | 3 | 5 | 1 | 6 2 6 | 0 |
| X | A-4-2-1 | 5 | 3 | 5 | 2 | 6 2 6 | 1 |
| Y | A-8 | 5 | 3 | 5 | 3 | 6 2 6 | 2 |
| Z | C-A-8-1 | 5 | 3 | 5 | 4 | 6 2 6 | 3 |
| 0 | 8-2 | 5 | 4 | 0 | 0 | 6 3 2 | 1 |
| 1 | C-1 | 5 | 4 | 0 | 1 | 6 3 0 | 1 |
| 2 | C-2 | 5 | 4 | 0 | 2 | 6 3 0 | 2 |
| 3 | 2-1 | 5 | 4 | 0 | 3 | 6 3 0 | 3 |
| 4 | C-4 | 5 | 4 | 0 | 4 | 6 3 3 | 1 |
| 5 | 4-1 | 5 | 4 | 5 | 0 | 6 3 3 | 2 |
| 6 | 4-2 | 5 | 4 | 5 | 1 | 6 3 6 | 0 |
| 7 | C-4-2-1 | 5 | 4 | 5 | 2 | 6 3 6 | 1 |
| 8 | C-8 | 5 | 4 | 5 | 3 | 6 3 6 | 2 |
| 9 | 8-1 | 5 | 4 | 5 | 4 | 6 3 6 | 3 |
| + ZERO | B-A-8-2 | | | | | | |
| − ZERO | C-B-8-2 | | | | | | |
| REC. MARK | C-A-8-2 | | | | | | |
| TAPE MARK | 8-4-2-1 | | | | | | |

FIG. 10.

| | B0 | B5 | 0 | 1 | 2 | 3 | 4 |
|---|---|---|---|---|---|---|---|
| 0 | 1 | 0 | 1 | 0 | 0 | 0 | 0 |
| 1 | 1 | 0 | 0 | 1 | 0 | 0 | 0 |
| 2 | 1 | 0 | 0 | 0 | 1 | 0 | 0 |
| 3 | 1 | 0 | 0 | 0 | 0 | 1 | 0 |
| 4 | 1 | 0 | 0 | 0 | 0 | 0 | 1 |
| 5 | 0 | 1 | 1 | 0 | 0 | 0 | 0 |
| 6 | 0 | 1 | 0 | 1 | 0 | 0 | 0 |
| 7 | 0 | 1 | 0 | 0 | 1 | 0 | 0 |
| 8 | 0 | 1 | 0 | 0 | 0 | 1 | 0 |
| 9 | 0 | 1 | 0 | 0 | 0 | 0 | 1 |

FIG. 11.

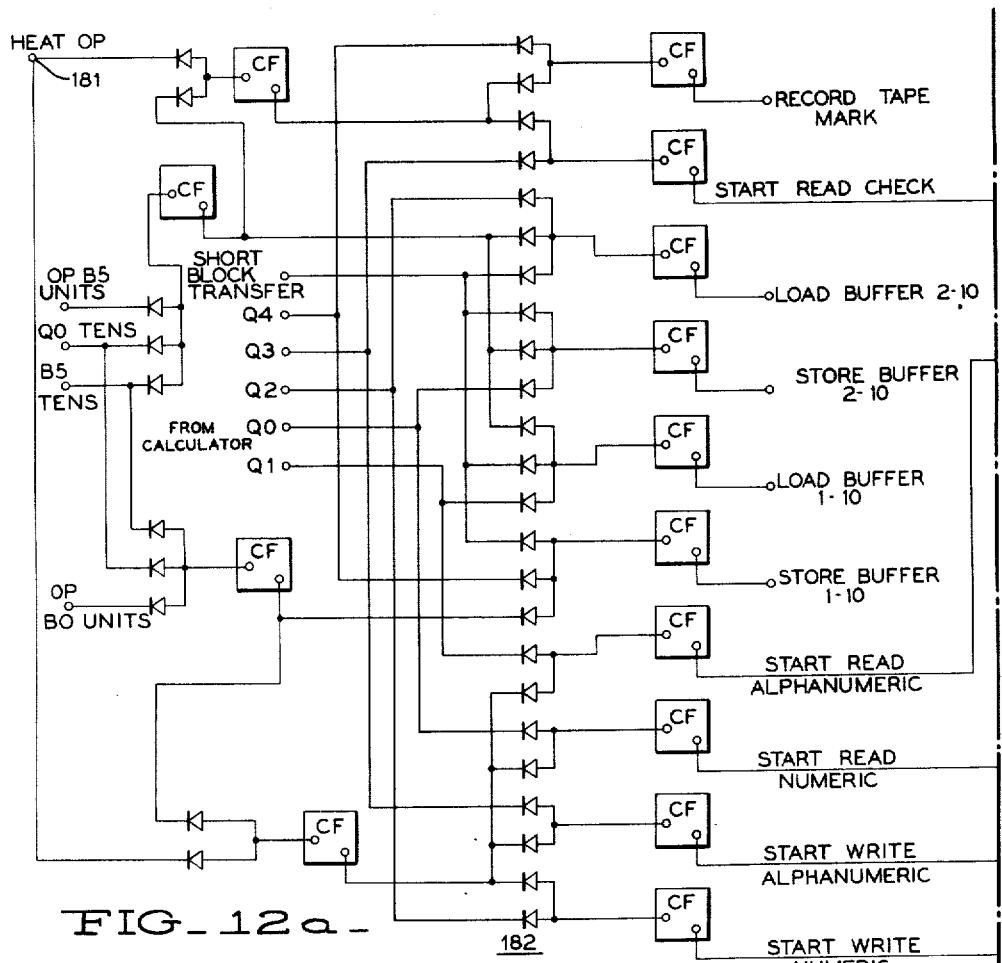
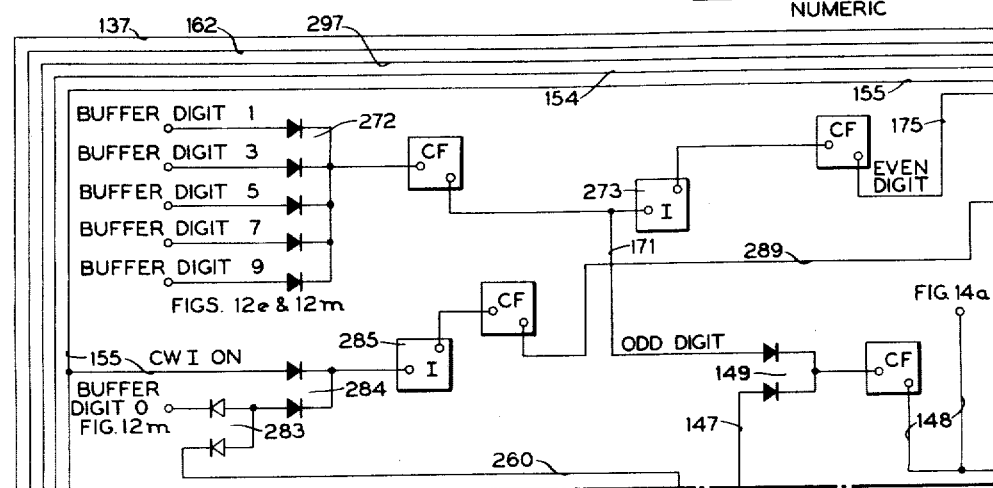

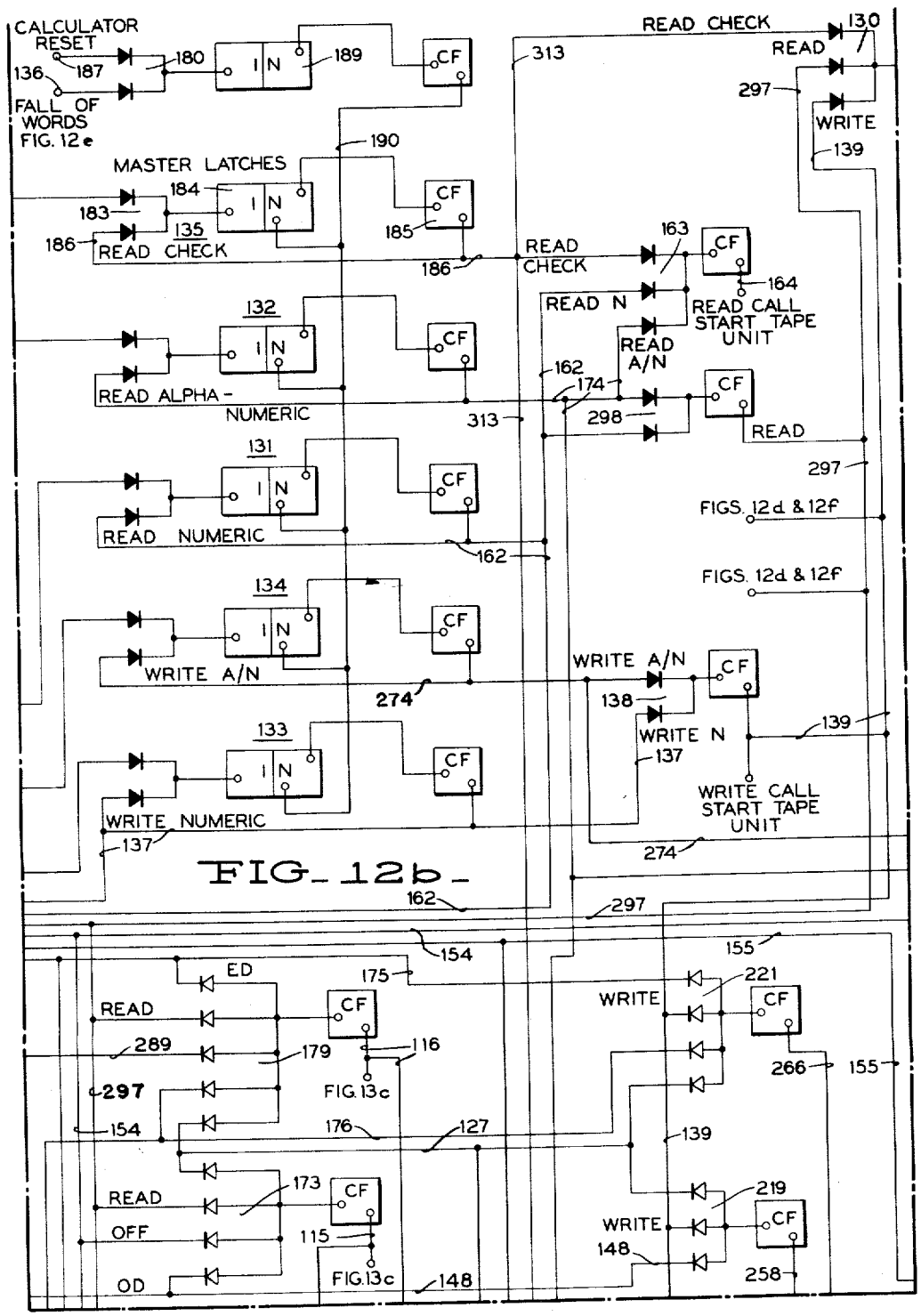

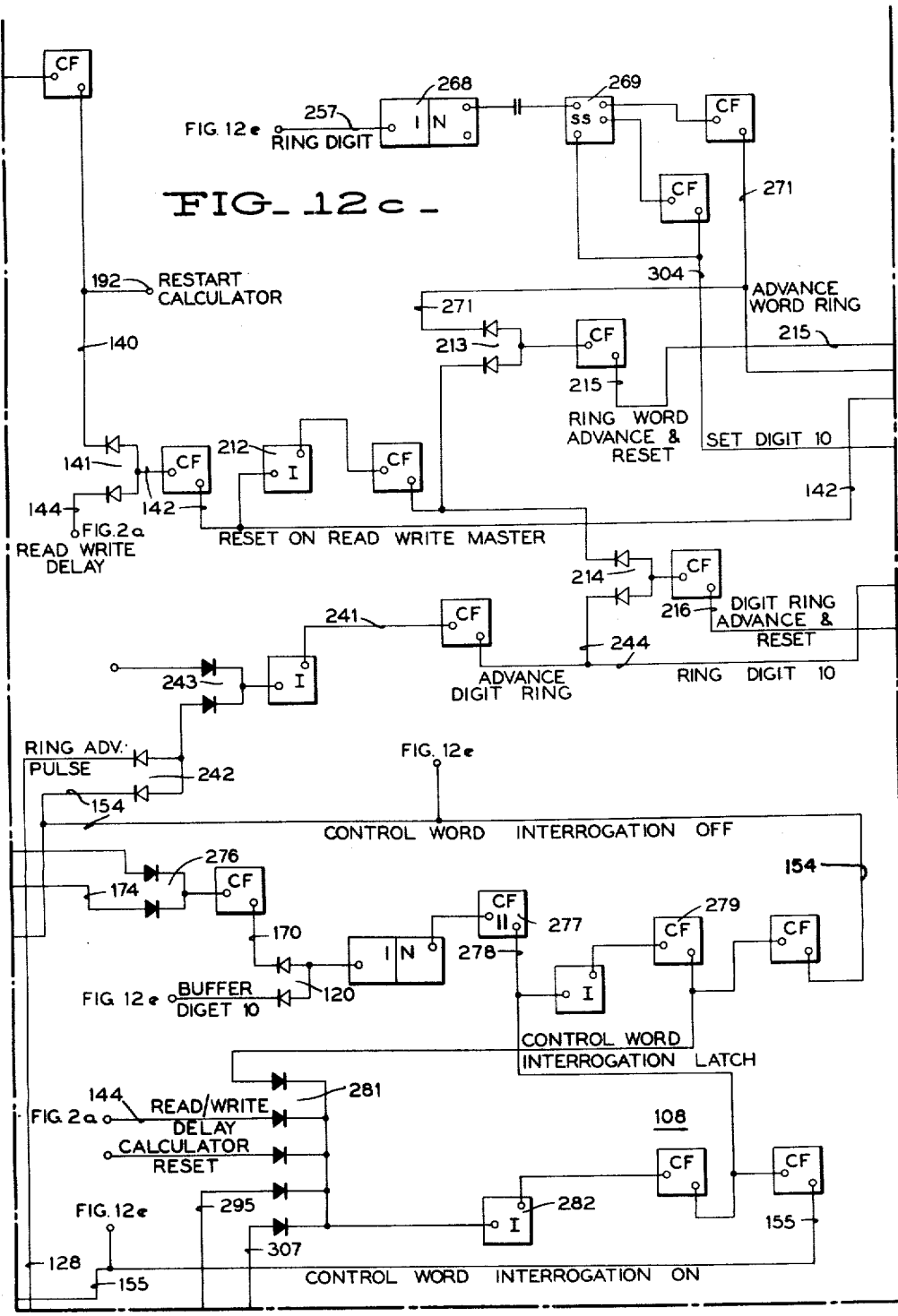

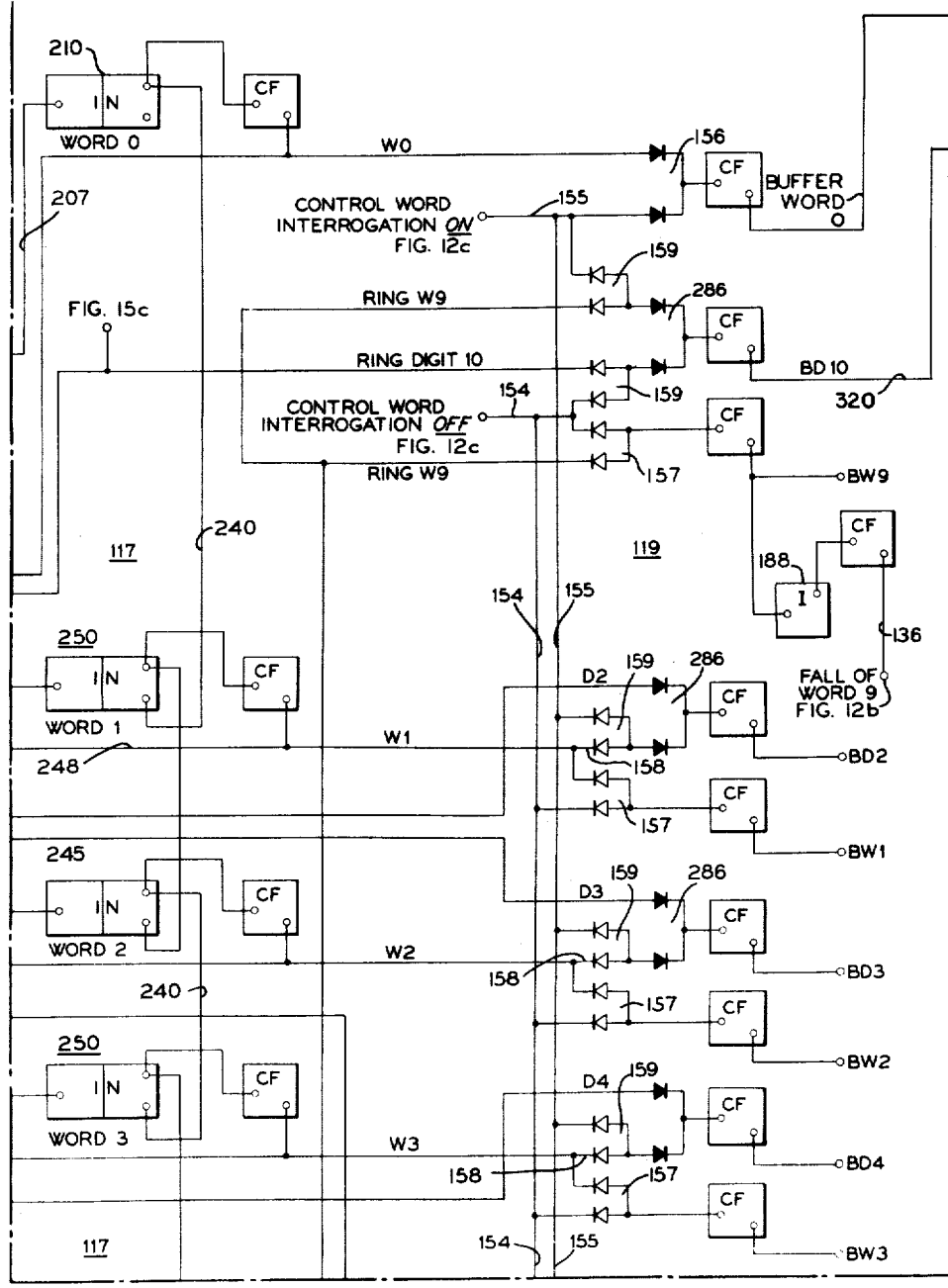

Feb. 3, 1959     R. C. GREENHALGH     2,872,666
DATA TRANSFER AND TRANSLATING SYSTEM
Filed Dec. 21, 1955     38 Sheets-Sheet 14

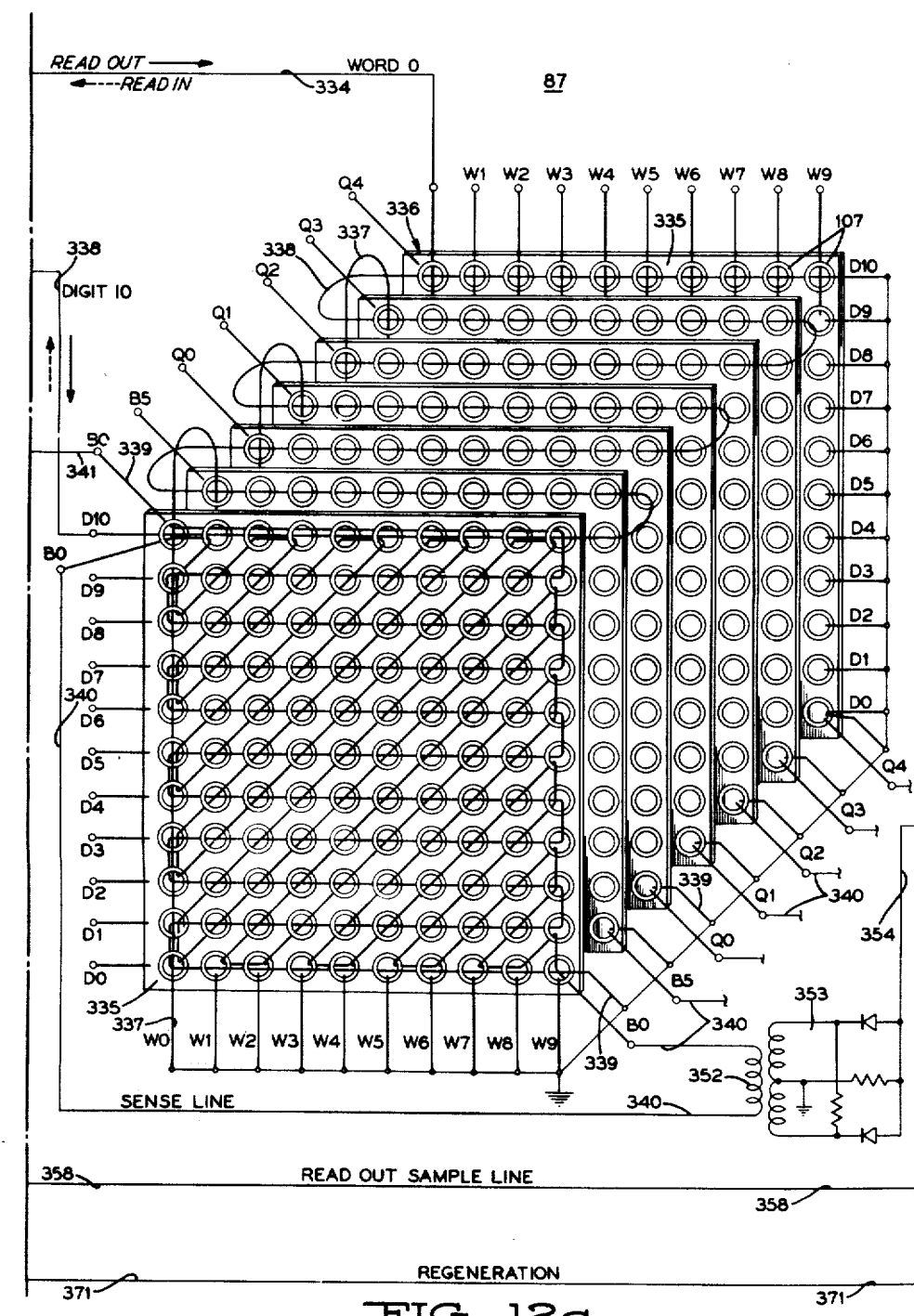

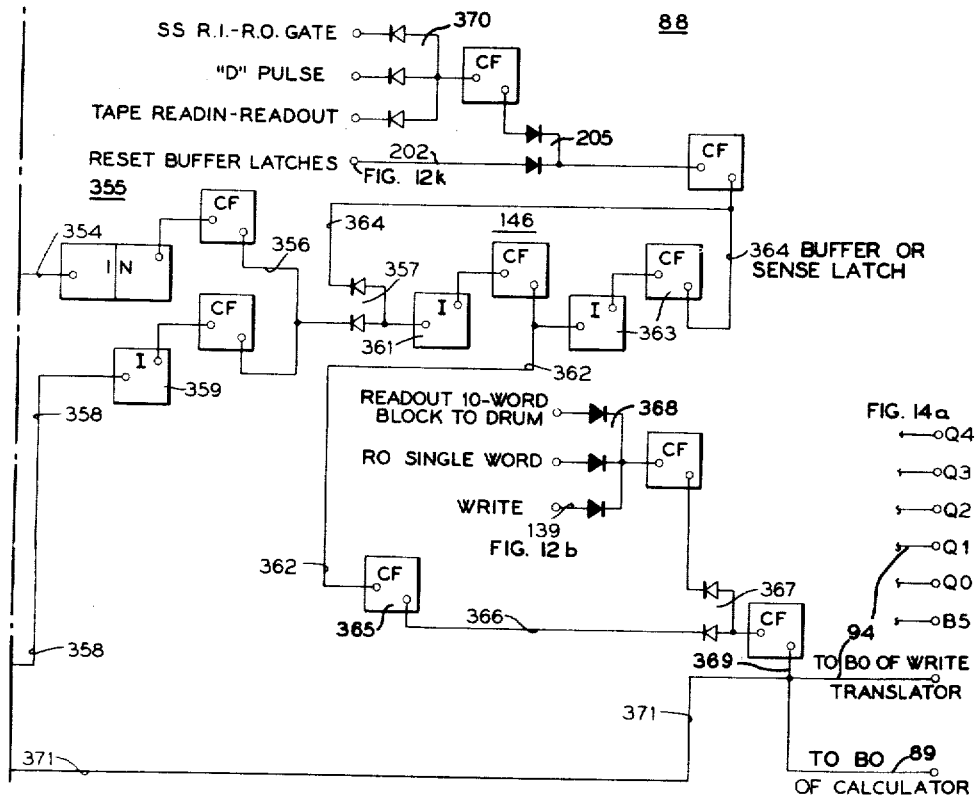

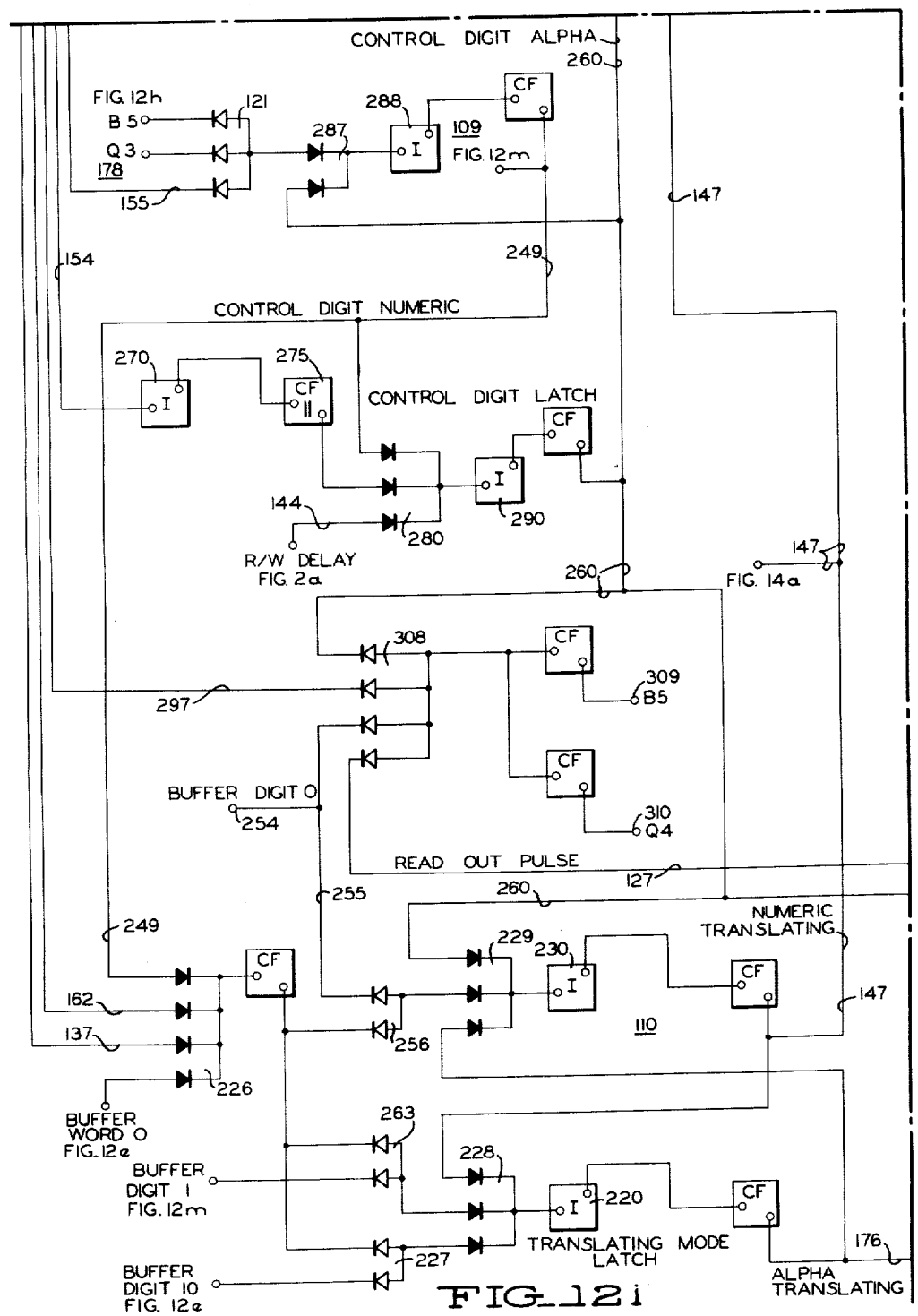

Feb. 3, 1959    R. C. GREENHALGH    2,872,666
DATA TRANSFER AND TRANSLATING SYSTEM
Filed Dec. 21, 1955    38 Sheets-Sheet 18

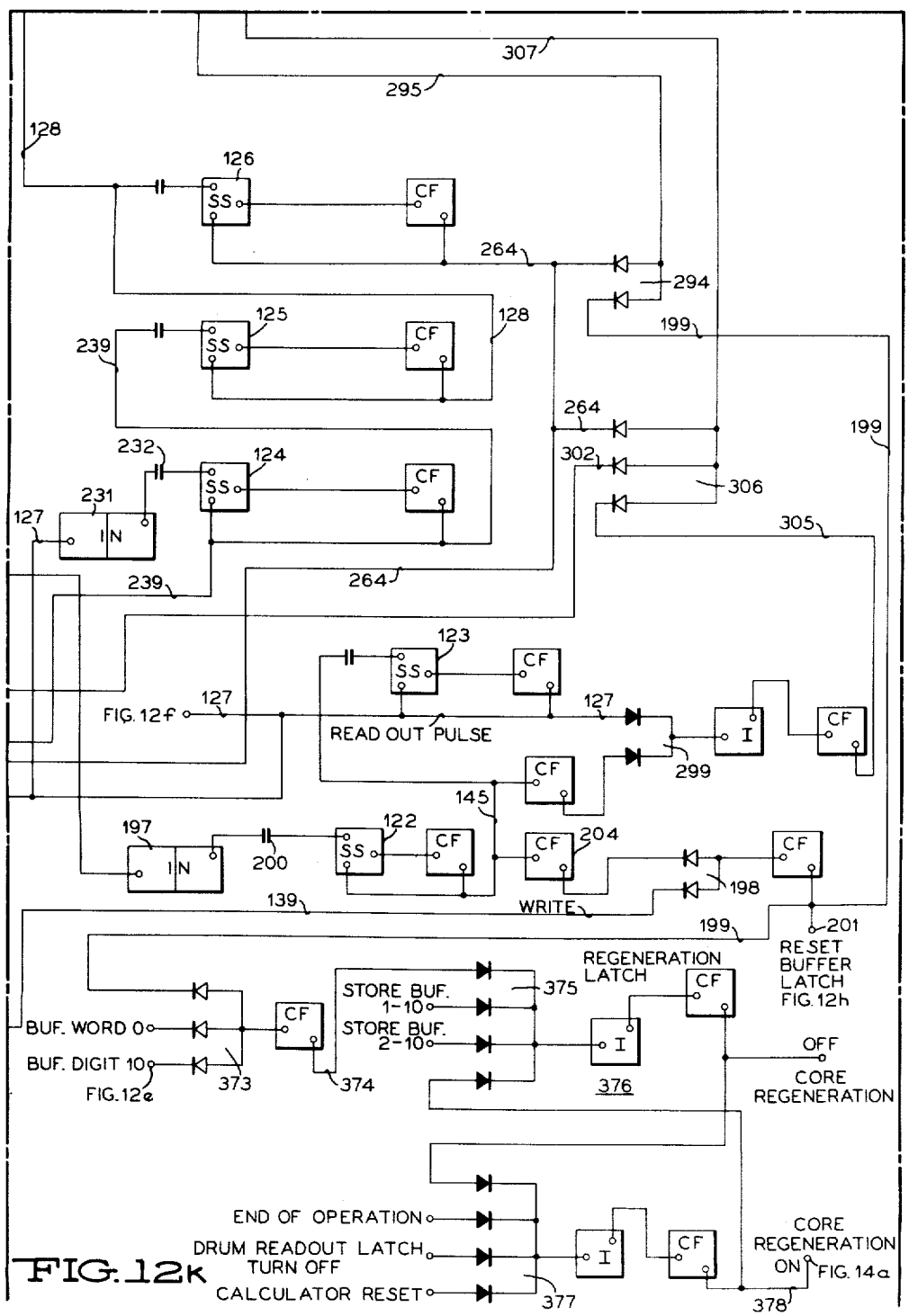

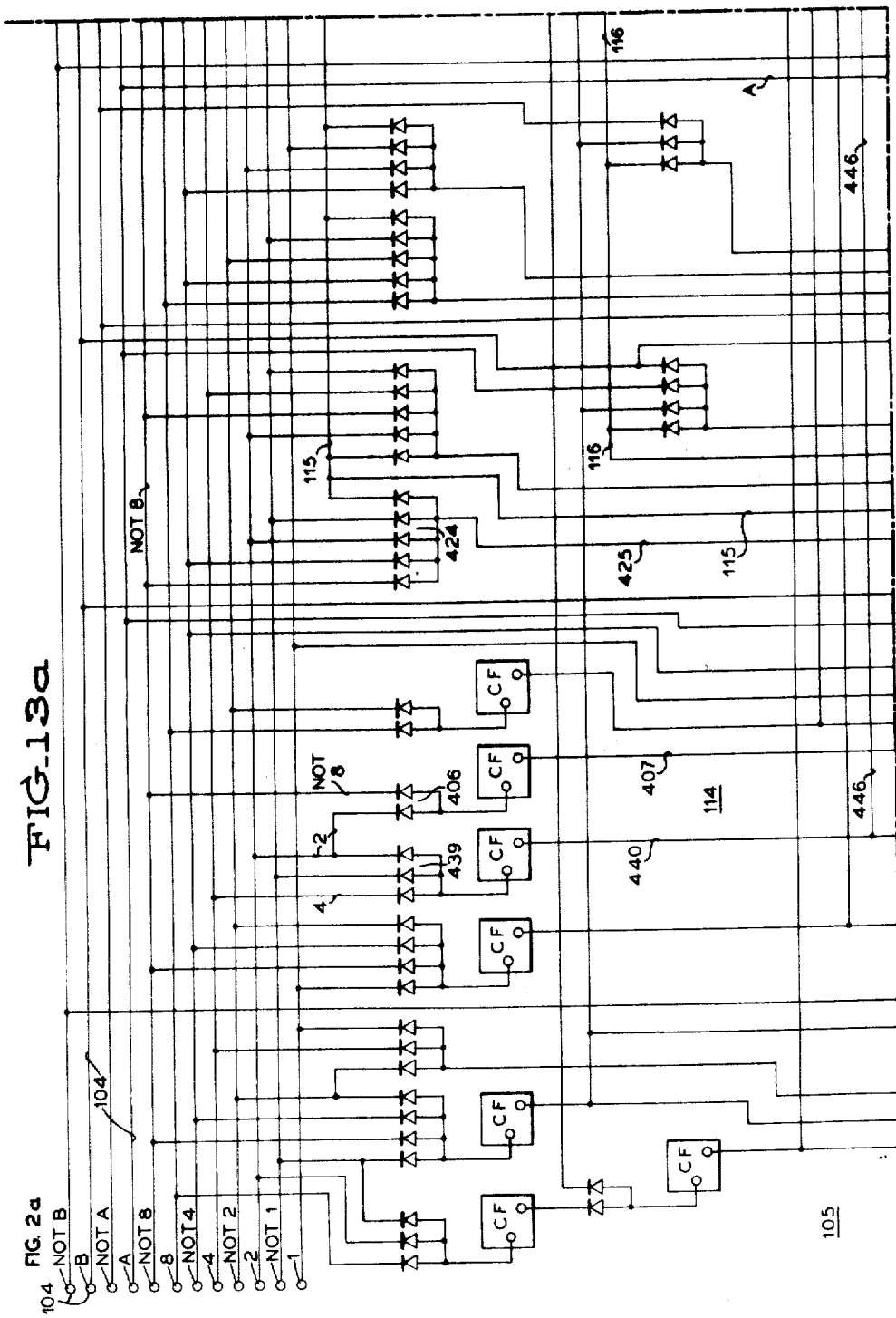

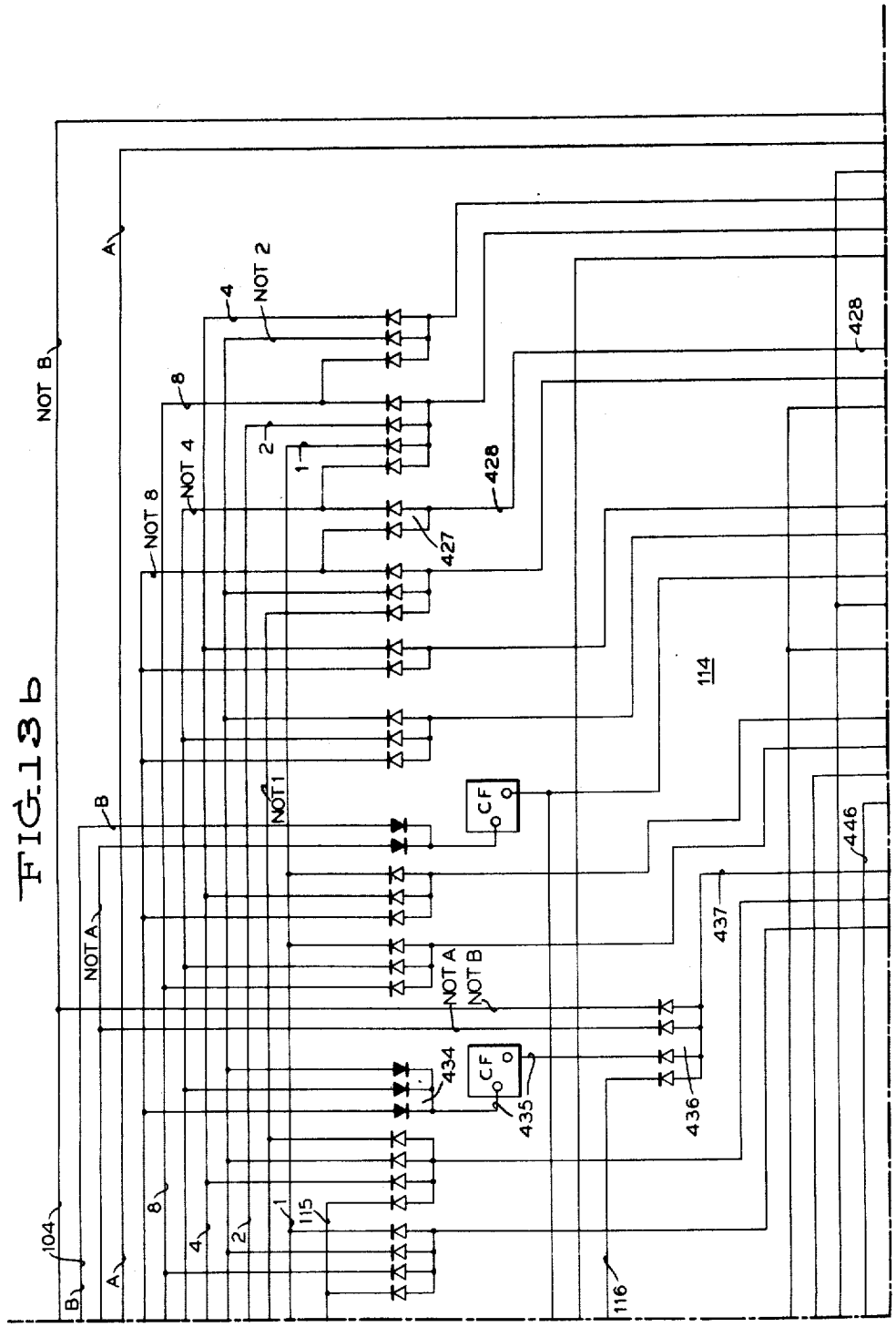

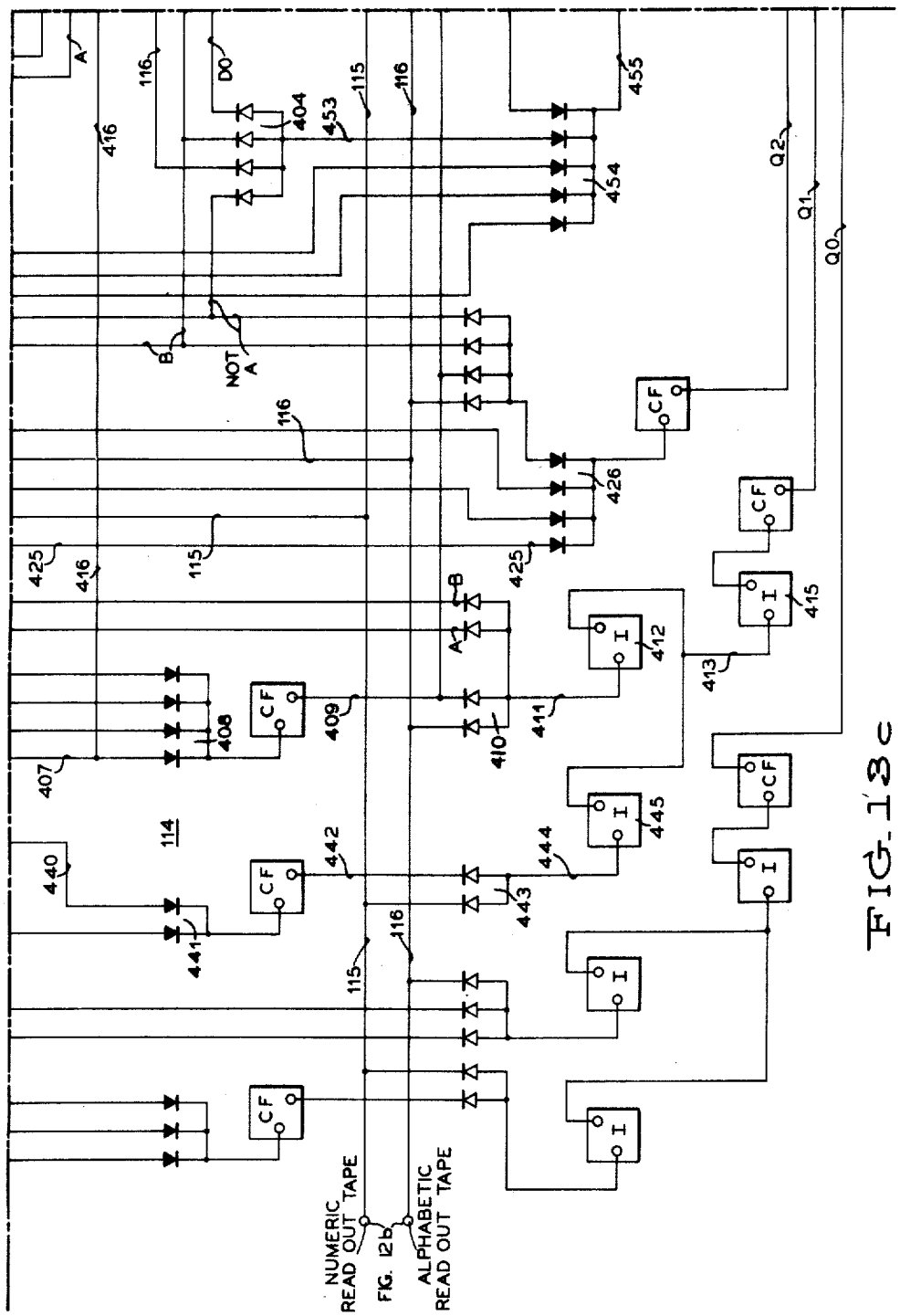

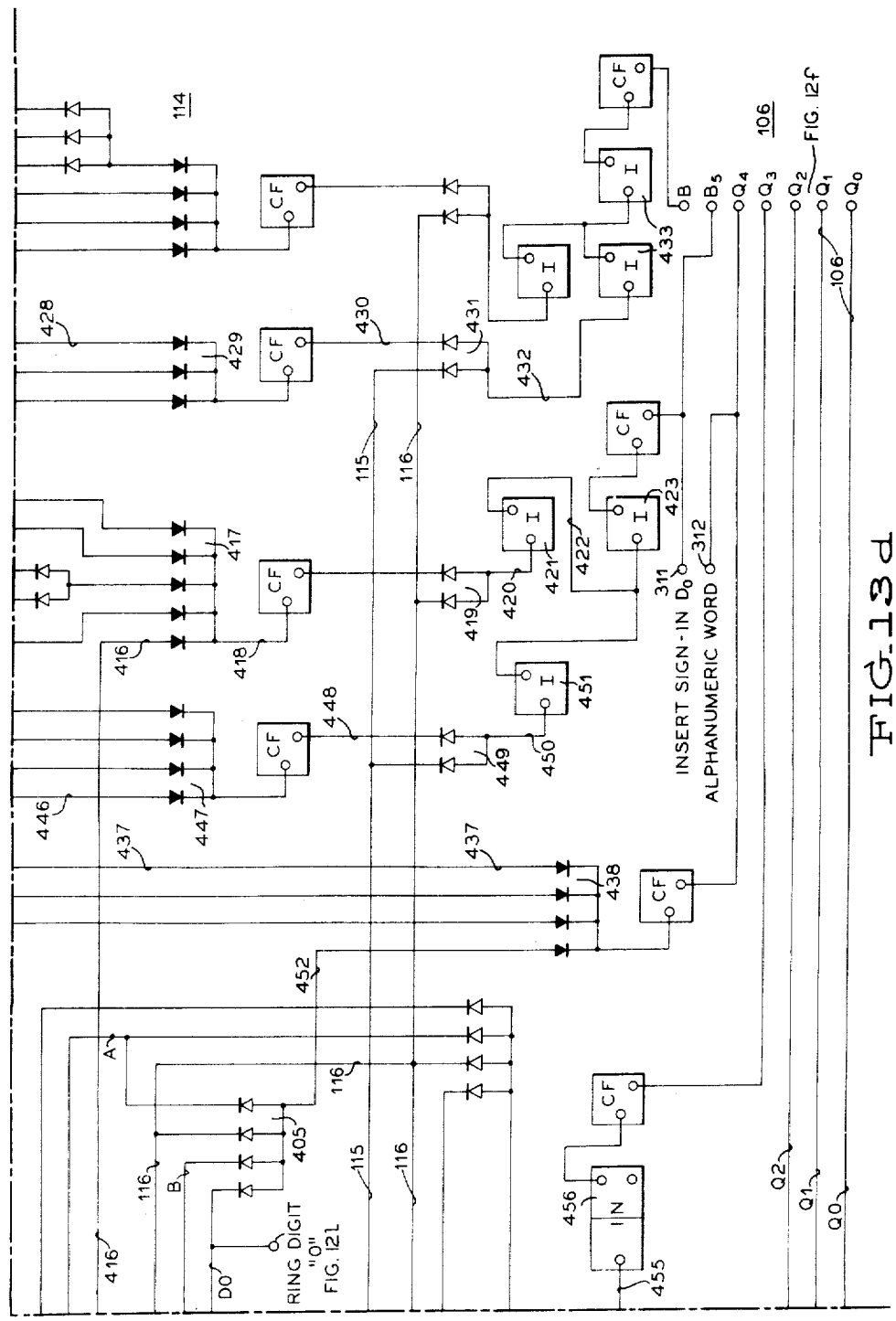

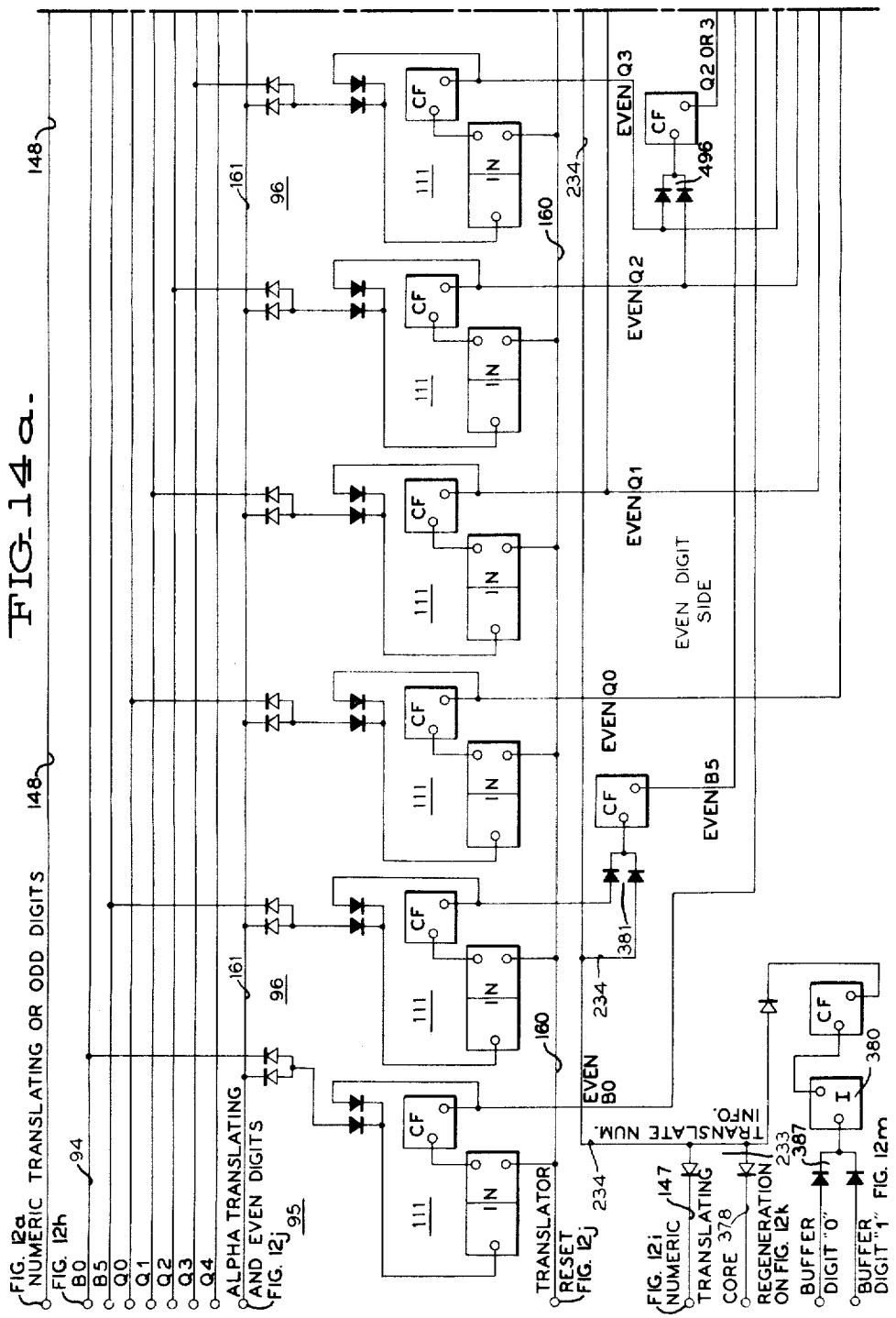

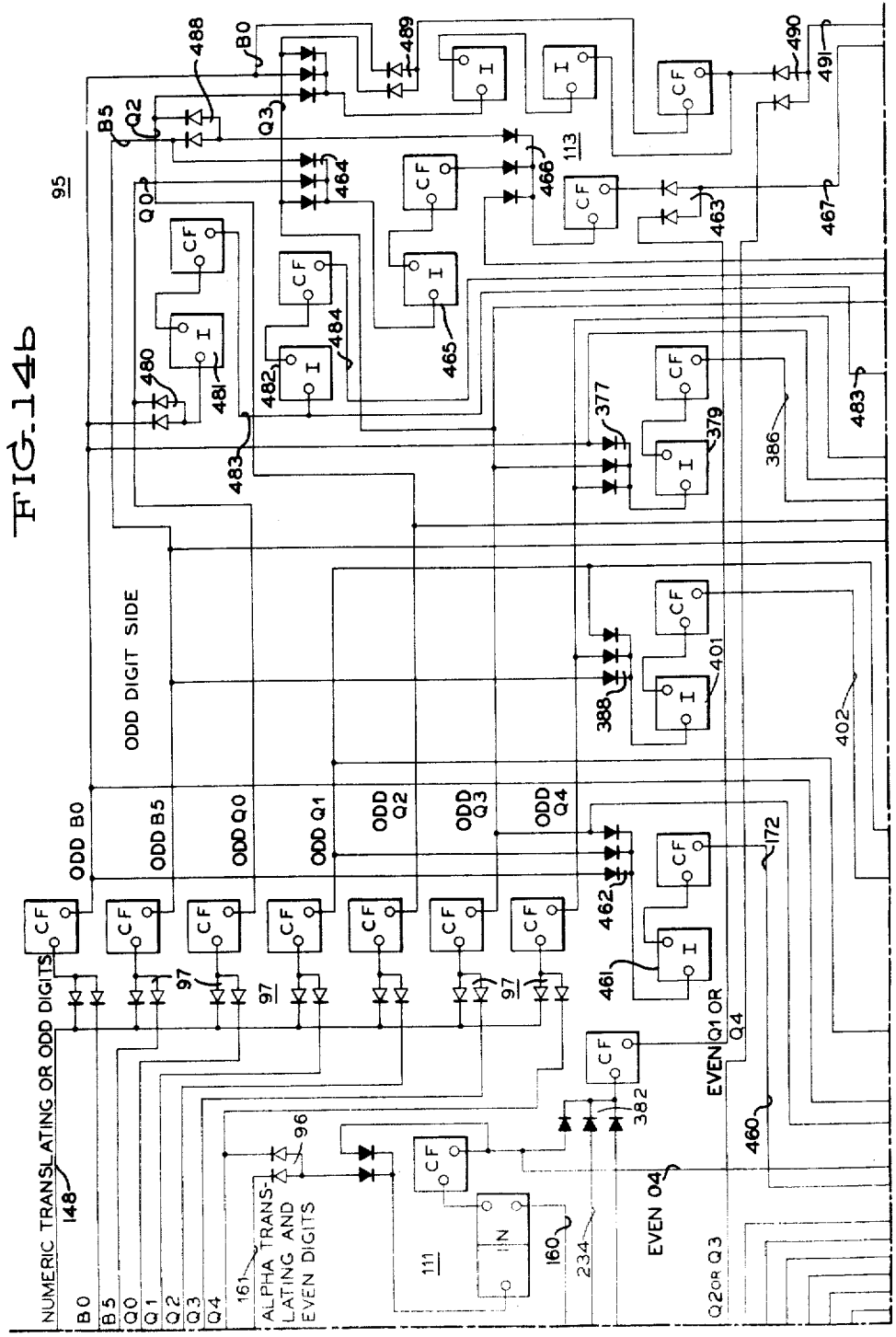

Feb. 3, 1959    R. C. GREENHALGH    2,872,666
DATA TRANSFER AND TRANSLATING SYSTEM
Filed Dec. 21, 1955    38 Sheets-Sheet 29

| FIG. 12a. | FIG. 12b. | FIG. 12c. | FIG. 12d. | FIG. 12e | FIG. 12f. | FIG. 12g. | FIG. 12h. |
|---|---|---|---|---|---|---|---|
| FIG. 12i. | FIG. 12j. | FIG. 12k | FIG. 12L. | FIG. 12m | | | |

FIG. 15

| FIG. 13a | FIG. 13b |
|---|---|
| FIG. 13c | FIG. 13d |

FIG. 16

| FIG. 14a | FIG. 14b |
|---|---|
|  | FIG. 14c |

FIG. 17

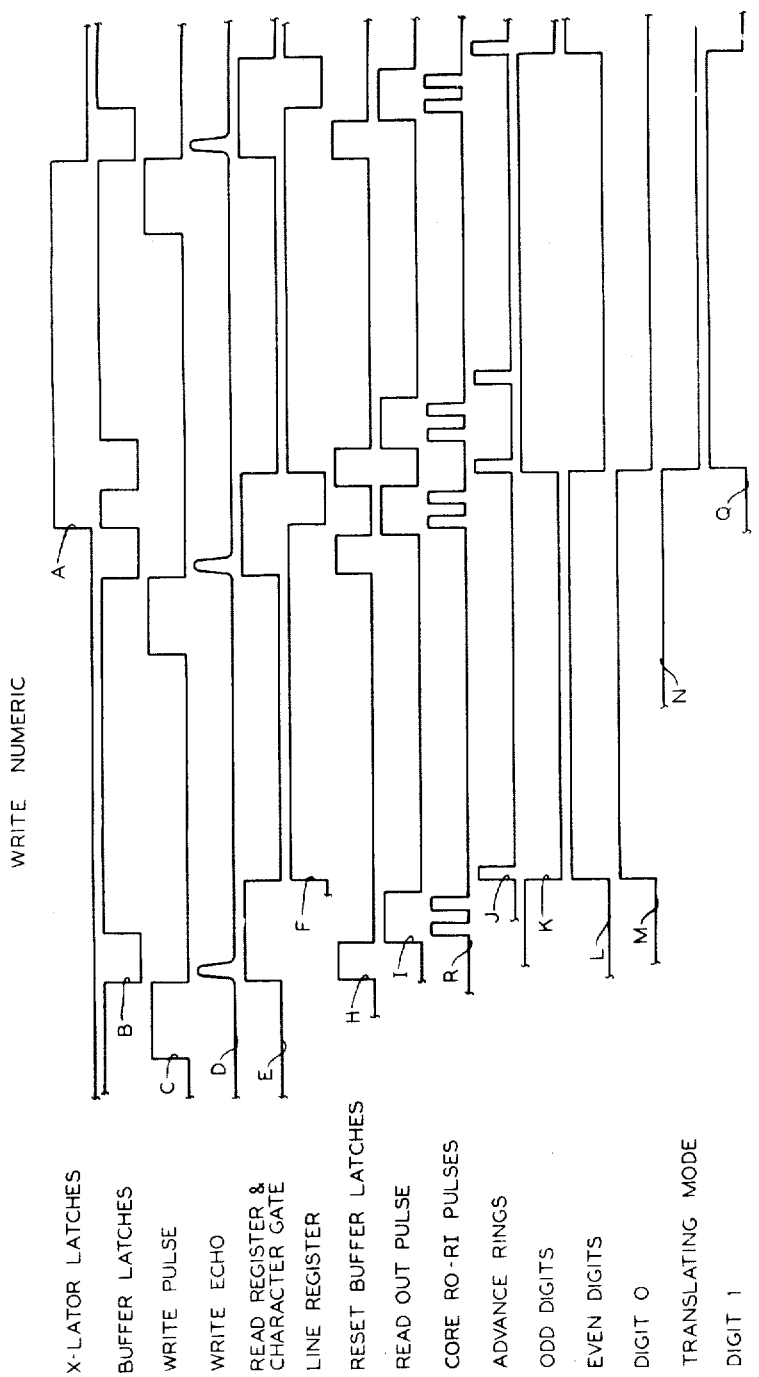

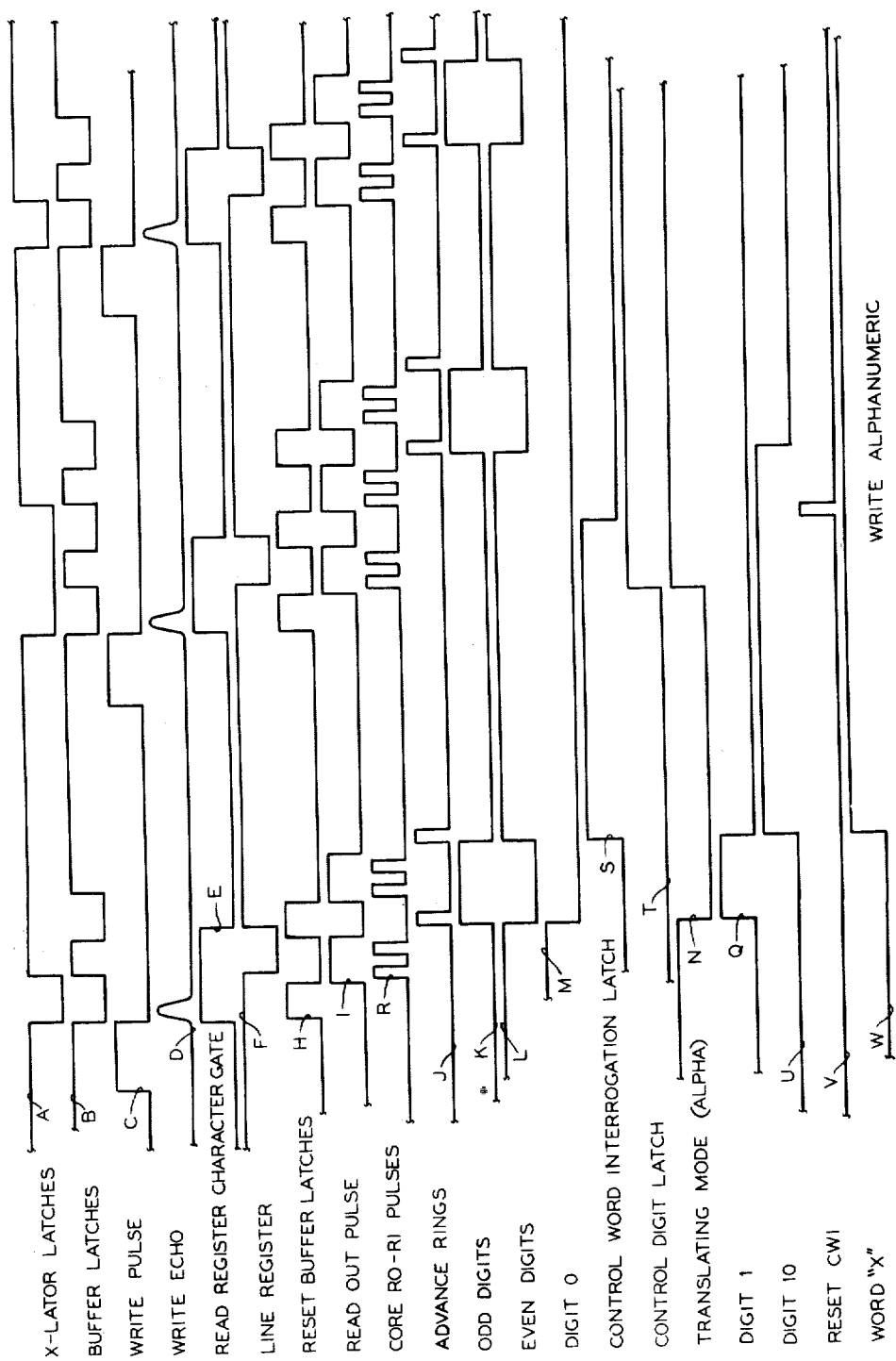

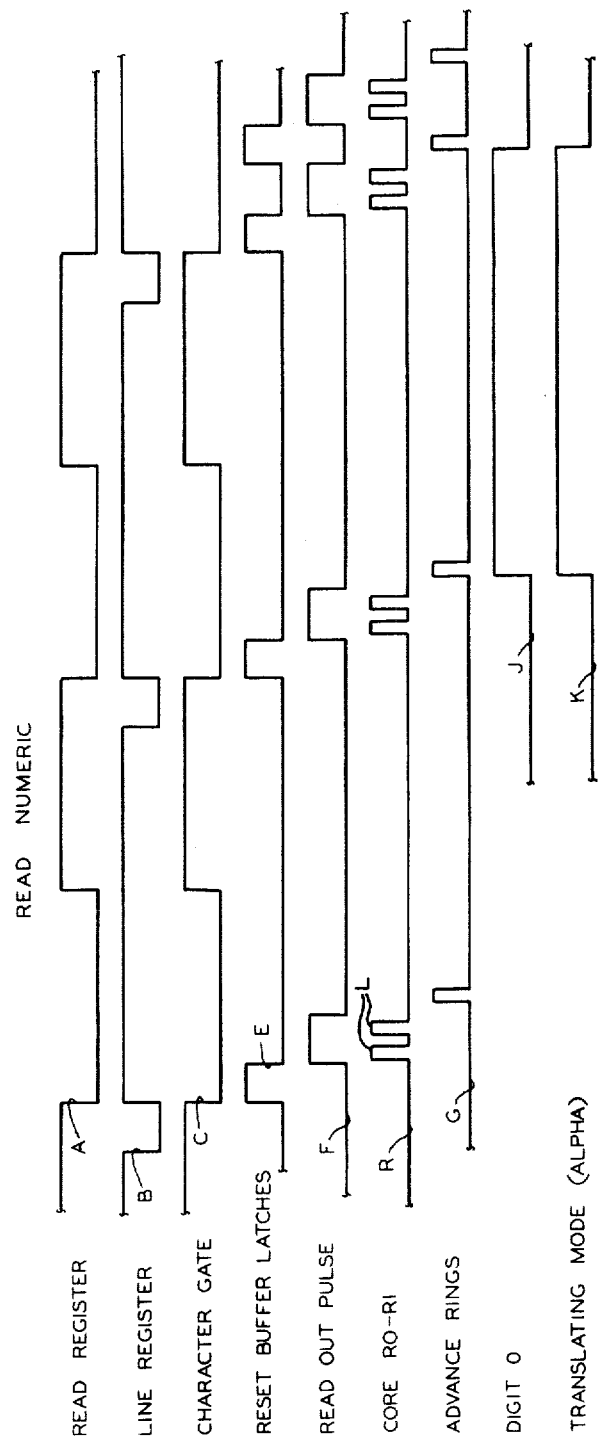

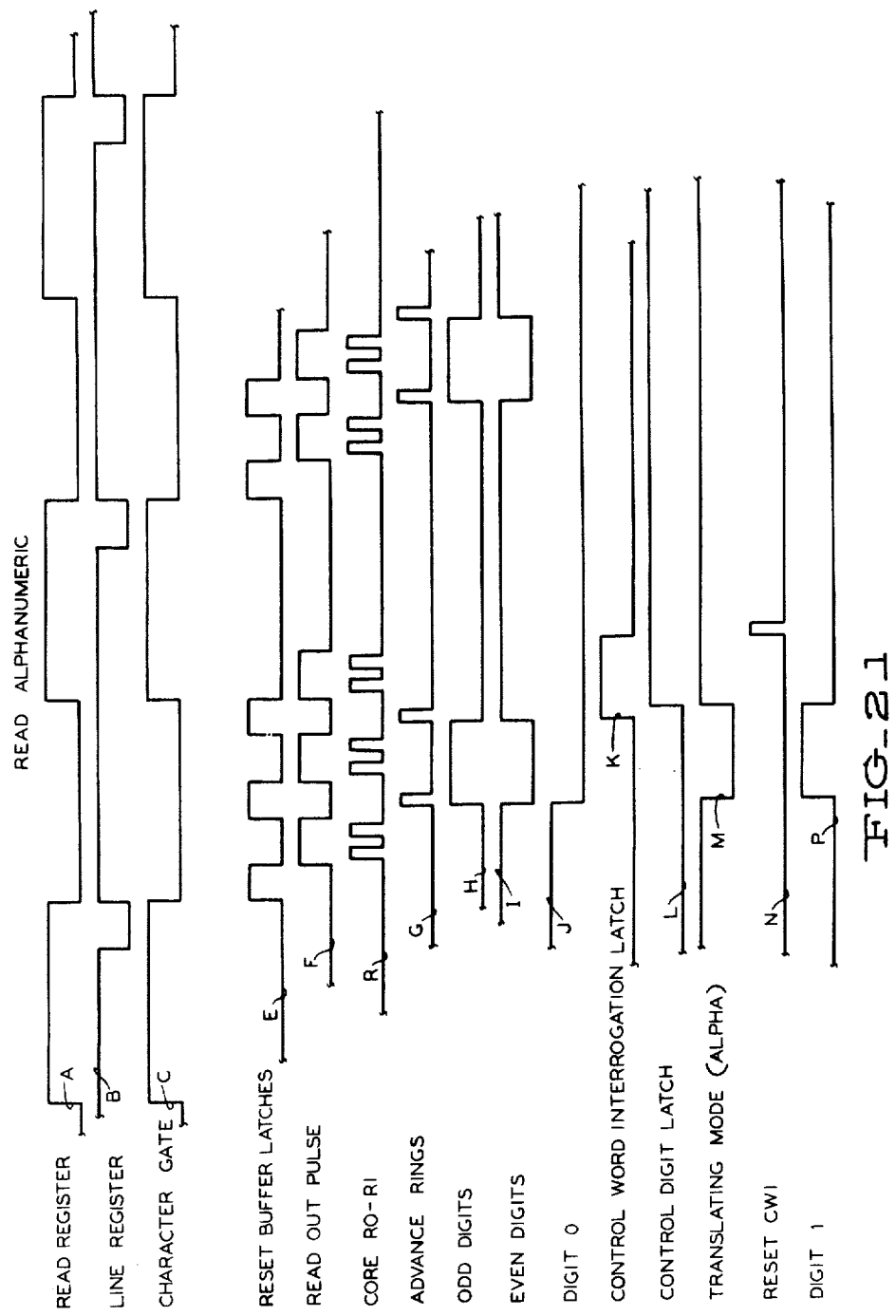

Feb. 3, 1959 R. C. GREENHALGH 2,872,666
DATA TRANSFER AND TRANSLATING SYSTEM
Filed Dec. 21, 1955 38 Sheets-Sheet 34

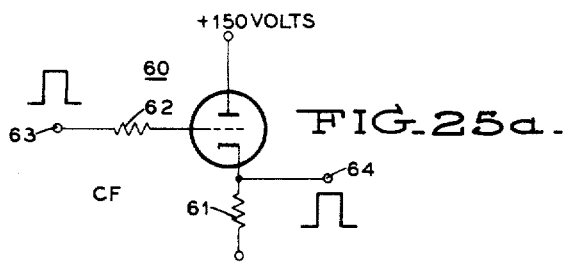
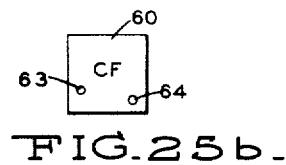
FIG. 25a.
FIG. 25b.
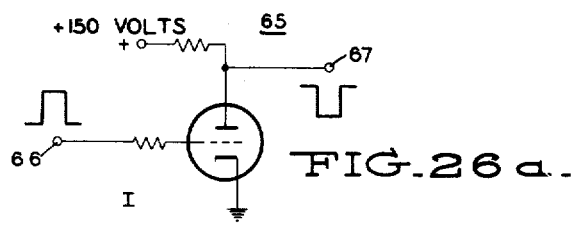
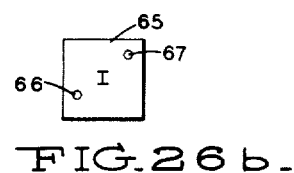
FIG. 26a.
FIG. 26b.
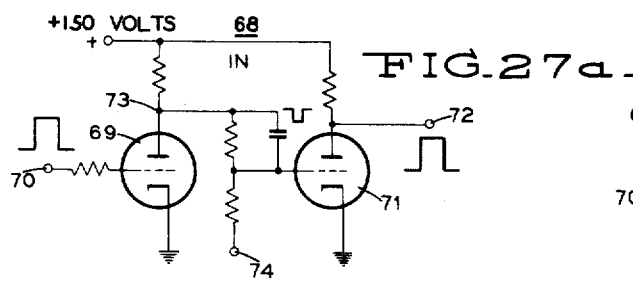
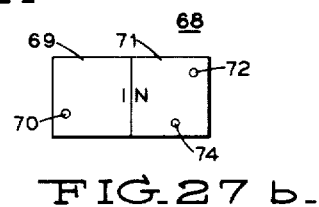
FIG. 27a.
FIG. 27b.
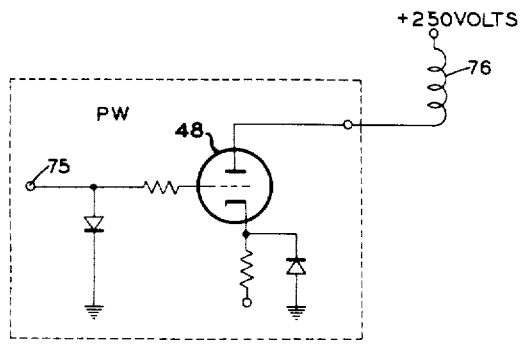
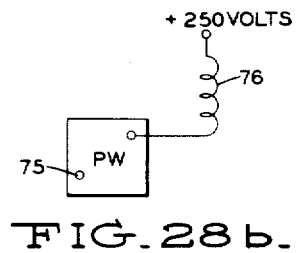
FIG. 28a.
FIG. 28b.

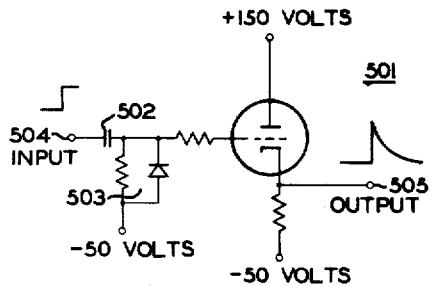
FIG_29a
FIG_29b
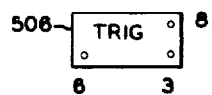
FIG_30b
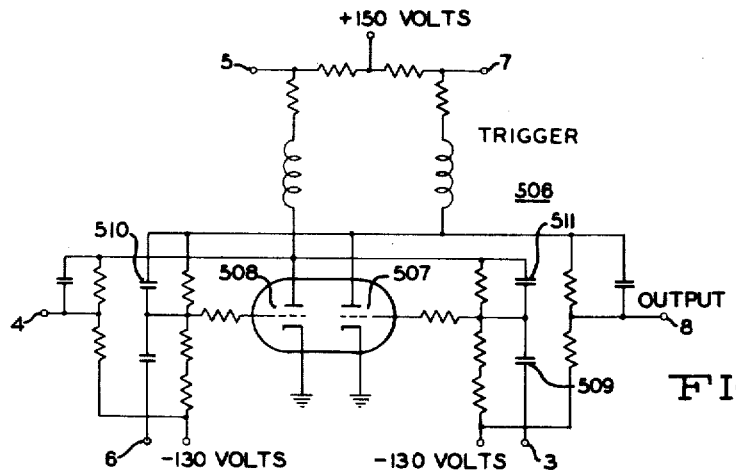
FIG_30a
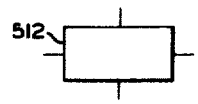
FIG_31b
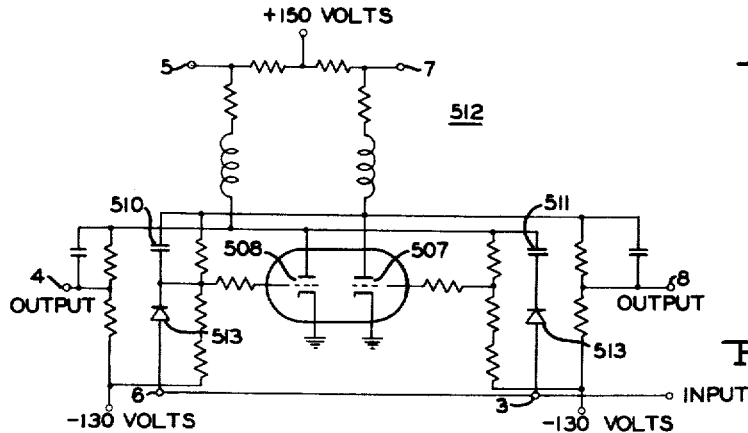
FIG_31a

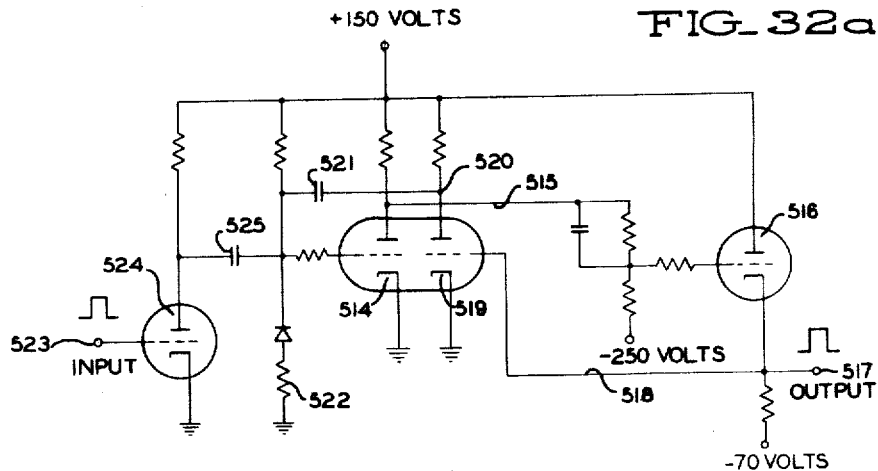
FIG_32a
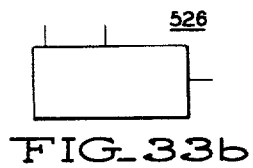
FIG_33b
FIG_32b
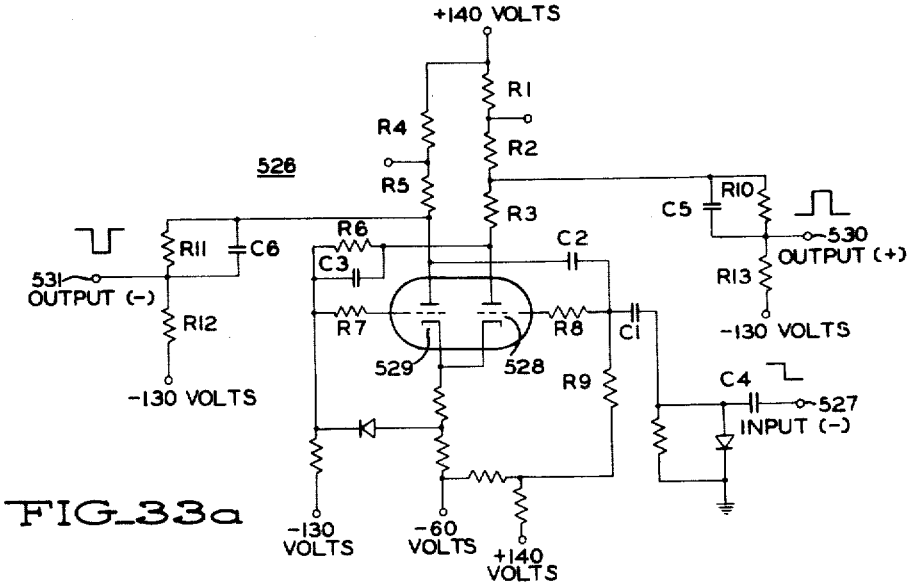
FIG_33a

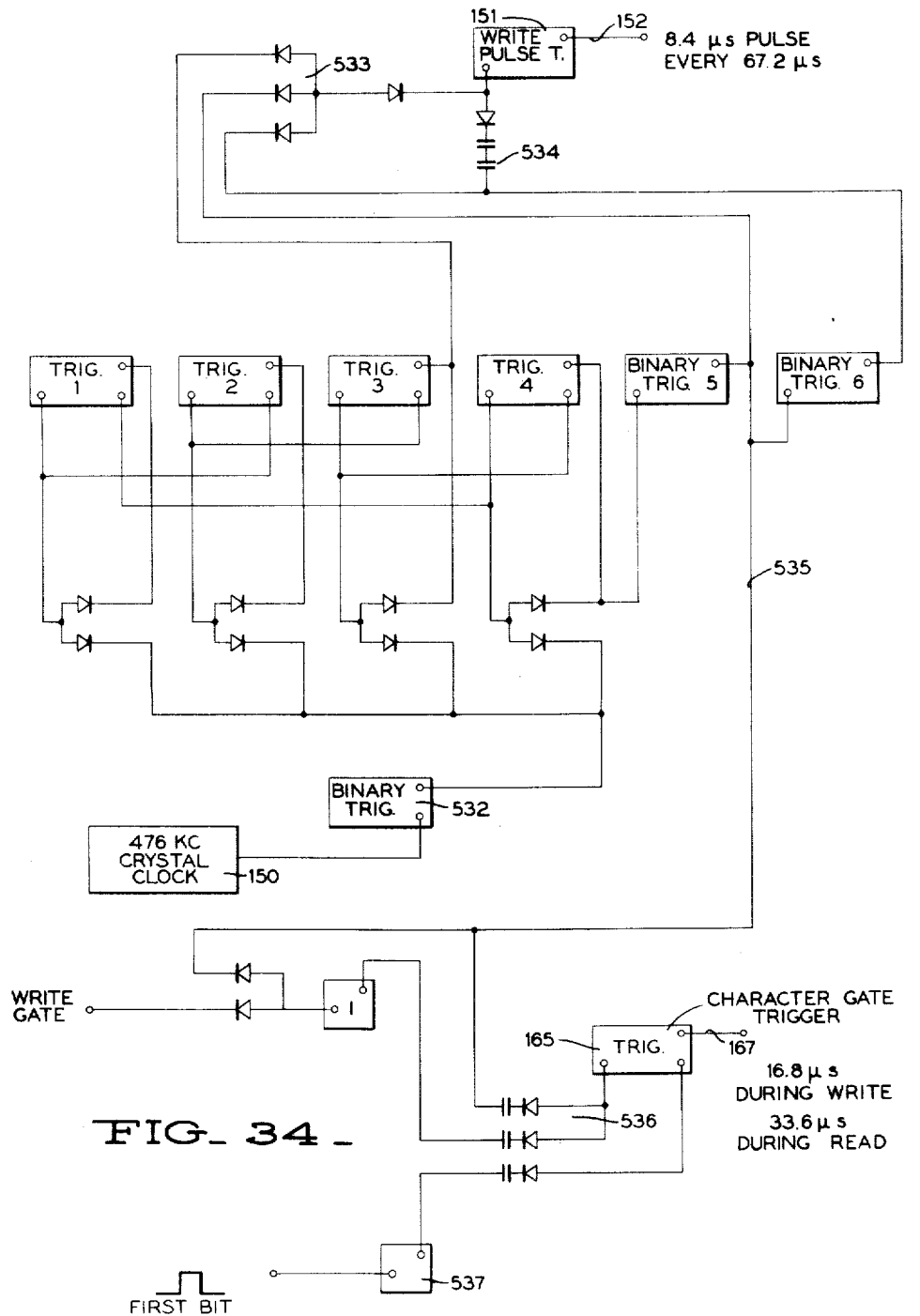

United States Patent Office 2,872,666
Patented Feb. 3, 1959

2,872,666

DATA TRANSFER AND TRANSLATING SYSTEM

Roger C. Greenhalgh, Vestal, N. Y., assignor to International Business Machines Corporation, New York, N. Y., a corporation of New York Application December 21, 1955, Serial No. 554,583

52 Claims. (Cl. 340—174)

The invention relates to data processing systems and more particularly to data processing systems in which data words are selectively transmitted from one location to another under the direction of a control digit. This is a continuation-in-part of my application, Serial No. 523,059, filed July 19, 1955.

In some data processing machines numeric data is stored with one digit position for each digit, while alphabetic data requires more than one digit position to store each character. It is an object of the invention to enable such a machine to be switched from one type of storage to the other in response to signals originating from control characters associated with the data.

A further object associated with the above is to enable the machine to be switched word by word in transferring a group of data words.

It is another object of the invention to provide a data processing system with a group of data words in which separate words in the group may be selectively transmitted from one location to another under the direction of a control digit formed as part of the word group.

It is still another object of the invention to transmit groups of words in a data processing system under the direction of a control word which forms a part of each word group.

It is still another object of the invention to selectively transmit a group of words in either an alphabetic or numeric mode.

It is another object of the invention to transfer selectively both alphabetic and numeric data from a storage device with a minimum of external instructions.

It is yet another object of the invention to provide a data processing system for groups of words having both alphabetic and numeric data therein which is transferred from one location to another under the direction of a control word formed as part of the word group.

It is still another object of the invention to provide a transfer for a group of words having a plurality of digit positions embodying both alphabetic and numeric data in which an alphabetic word includes more than one numeric character representation for each character.

It is another object of the invention to provide a data translating system involving a group of words divided into a plurality of character bearing digits which are selectively translated from one to a plurality of digits per character or from a plurality of digits to one digit per character.

It is another object of the invention to provide a storage device for a group of data words including a control word divided into a plurality of digits which are selectively interrogated to detect the presence of an alphabetic character in the related data word and to modify the translation of the character representations therein to one character per digit or one character for each pair of digits.

The transfer of data from one location to another, both internally and externally, by a calculator or computer in groups of data words, each having a plurality of digit positions wherein numeric character representations are stored is quite common. However, this transfer poses a greater problem in the data transfer when alphabetic data is combined in the groups of words. Heretofore it has been necessary for the programmer to determine which words in the group of words embody alphabetic or special data and to program selectively each individual word after the delivery of the preceding word. This consumes a large quantity of programming space and requires the stopping of the calculator after the delivery of each word to reinstruct and provide the interpretation of the next word. While this means may be utilized to accomplish the transfer of blocks or groups of data when individual words are to be divided or treated in a different manner than the others, it consumes a large amount of the programmer's time and may materially reduce the productive time of the calculator.

In the improved data handling means, both alphabetic and numeric data may be included in each word group. In the particular example to be given, the data processing system is designed for ten words, eleven digits each, blocks or groups of words or multiples thereof. Therefore, the data storage or other utilization devices are preferably provided with this capacity so that when the data is transferred from one location to another, the entire blocks or groups of words may be readily transferred, if desired, without overflow and other problems. Since each word group is divided into ten words each including a possible total of eleven digit positions, ten data plus a sign, a possible total of one hundred ten digits is provided for each word group. A lesser number of digits may be provided in some of the storage devices.

By way of example, one of the storage means includes a magnetic core buffer storage matrix in which each digit position is coded in biquinary code to provide a two-out-of seven bit representation for each numeric character representation. A second storage means utilizes a modified binary 1—2—4—8 code and includes parallel A, B and C zone positions to provide space for alphabetic character representations and a check bit.

During operation, if purely numeric data is to be transferred from the storage device to a second location, a single calculator instruction in the program register may cause the entire group or groups of data words to be removed parallel by bit and serial by digit and word. This transfer may occur automatically with no further instruction from the program register. However, if under certain conditions it is desired to include alphabetic data in the group or groups of words to be transmitted, the programmer utilizes one word of the ten words in each group as a control word along with nine of the digits therein as control digits, one each for the remaining nine data words. In each data word of the group where an alphabetic character appears, the associated control digit is assigned a common numeric character representation by the programmer. The data words in the group not bearing alphabetic data are assigned any other numeric character representations at their respective control digits. Thus the programmer predetermines the numeric and alphabetic translating modes of each word in an alphabetic word group.

Due to the fact each digit position in the core storage is only capable of storing numeric character representations, 0 through 9, and it is desired to store alphabetic data therein, it is necessary to assign two digit positions for each alphabetic character. In the example given, this involves a pair of adjacent even and odd digit positions in the word which, when combined in a suitable translating device, are capable of producing the desired coded alphabetic character in a single digit position in another processing device or in some other suitable coded representation. Since each word in which an alphabetic character appears must of necessity include a pair of digits, any numeric characters appearing in the same word must be assigned two digit positions each. This is necessary because during data transfer or translating in the alphabetic mode, two digits in each data word must be scanned and combined to form a single digit or a second code character representation output. Thus a ten digit alphabetic word actually has only five real characters per word. Under the above circumstances should a data word in any group of words not contain an alphabetic character, all ten digit positions are utilized for storing numeric data, including the sign for that particular word and the data transfer occurs digit for digit.

From the above it can be seen that alphabetic and numeric words can be combined as a unit in any word group and that the means for determining whether any particular word in the group contains alphabetic, a combination of alphabetic and numeric, or all numeric data is determined by interrogating or checking the condition of the particular control digit for that word.

With intermixed word grouping of this type, the programmer determines the presence or absence of an alphabetic character or characters in each word and sets up the proper value in the control digit for that word. After this determination has been made and it is desired to transmit the data from the calculator to the second storage device or tape, for example, the entire group of words, including the control word, may be transferred or set up in the core storage matrix in any suitable manner. With this data now setting in the storage matrix, all that is required by the programmer is to initiate an instruction through the program register in the calculator. After this instruction, the calculator proceeds to its next step or operation and further specific instructions for the data transfer are not required.

If a Write Numeric instruction is given, the transfer occurs digit by digit to the desired location for the entire group or groups of words. However, if a Write Alphanumeric operation is initiated, various controls set the data transfer in operation which proceeds in the following manner:

First, the numeric control word in the storage matrix is read and transmitted digit by digit through a write translator wherein it may be recoded to binary form or gated in some manner for writing in the second storage device digit for digit. At the end of the control word delivery, the delivery of the next or first data word is blocked until its related control digit in the control word is interrogated to determine the presence or absence of alphabetic data in that word. Should the word be entirely numeric, the interrogation device sets up mechanism to translate each numeric character representation digit position to some other form parallel by bit and serial by digit. Thus one numeric character representation appears for each digit in the storage matrix and may include a means for inserting the sign of the word over the units position.

As the delivery of the first data word is completed, the delivery of the second data word is likewise blocked until its controlling digit in the control word is interrogated to determine the presence or absence of an alphabetic character or characters therein. Should this or any of the data words include alphabetic data, the controls for the write translator are now switched and as the delivery of that word occurs, parallel by bit and serial by digit, related pairs of character forming digits are combined in the translator to set up the same alphabetic character representation in a different form. Under these conditions, the A and B zones in the storage track are used in combination with the binary tracks to set up the alphabetic character. Since each numeric character appearing in the alphabetic word now includes a pair of digits forming the same numeric character representation, one of the digit positions for each numeric character is assigned a common numeric character which is gated as it moves into the write translator so that only the actual numeric character representation in the other digit position is translated to the second code. Thus the original ten digit data word matrix appears as a five digit word in the second storage device.

The succeeding words are each transmitted in a like manner until the entire group of words has been read from the storage device. During this entire data transfer operation, all data remains in the core storage for further reference and until checking has been completed. More important, this entire transfer, control word interrogation, proper translation, and disposition of each data word occurs without interrupting the calculator operation and consumes no further instruction time from the calculator program.

In order to read data from the second storage device and the like and insert the same into the core buffer storage matrix for later transfer to the calculator or other location, the operation is substantially the same, except the programmer initiates either a Read Numeric or a Read Alphanumeric instruction to the storage control unit.

Should a Read Numeric instruction be received, purely numeric data is involved. Therefore, the group transfer from the second storage device occurs through a read translator and is inserted in the core storage matrix parallel by bit, serial by digit and word. However, if the programmer indicates an Alphanumeric transfer, the control word for that group of words is placed in the storage device and then interrogated therefrom digit by digit in a manner similar to that previously described to determine whether its associated data word is to be translated in the alphabetic or numeric mode. Should one of the data words in the group be entirely numeric, the transferred data appears in the proper storage matrix position digit for digit. However, if an alphabetic character or characters appears in the next word to be transferred, each digit position for the five characters is sensed or scanned twice; once for the zone line bits which are translated into numeric character representations and placed in the appropriate even digit position in the core storage and a second time for the binary line bits, at which time the different numeric character representations are placed in the next odd digit position to set up the proper pair of digits, thereby to represent the same character or alphabetic value.

Under the above conditions since all numeric values appearing in any of the five digit positions of the alphabetic word lack a spot in the zone position, a common character is automatically placed in the even digit position next to the odd digit position which actually stores the numeric character representation for future use. Thus the transfer of intermixed alphabetic and numeric data for an entire group of words may be accomplished from a second storage device to a storage matrix by a single instruction from the programmer through the program register.

In both of the above outlined transfers involving alphabetic data, the control word for each group becomes an integral part of that group. Other uses for transferring data incorporating a control word will be hereinafter explained.

Other objects of the invention will be pointed out in the following description and claims and illustrated in the accompanying drawings, which disclose, by way of examples, the principle of the invention and the best mode, which has been contemplated, of applying that principle.

In the drawings:

Fig. 1 is a diagrammatic block representation of one modification of a data processing system to which the improved data transfer means is applicable.

Figs. 2a and 2b, with Fig. 2b placed to the right of Fig. 2a, show an expanded block diagram in which the various units including the improved alphabetic and numeric transfer means are disclosed in greater detail.

Fig. 7 is a diagrammatic representation of a numeric group of words along with the sign in which hypothetical numeric characters are inserted in each position for transfer to a utilization device and includes the biquinary bit representation over each character.

Fig. 8 is a representation, similar to Fig. 7, showing a numeric control word and a plurality of data words which include both numeric and alphabetic data along with the sign thereof, all of which are stored in the form of numeric character representations that may be either transferred direct or in a modified form to various data utilization devices.

Fig. 10 is a chart showing a comparison between the various codes and their character representations for both numeric and alphabetic data.

Fig. 11 shows the biquinary notation for the ten numeric characters with the two-out-of-seven bit values indicated as ones in the appropriate positions.

Figs. 12a to 12m disclose a diagrammatic representation of portions of the various control circuitry including the digit and word rings for driving the core storage matrix to feed data to and from the translators for delivery to other data processing locations.

Figure 8:
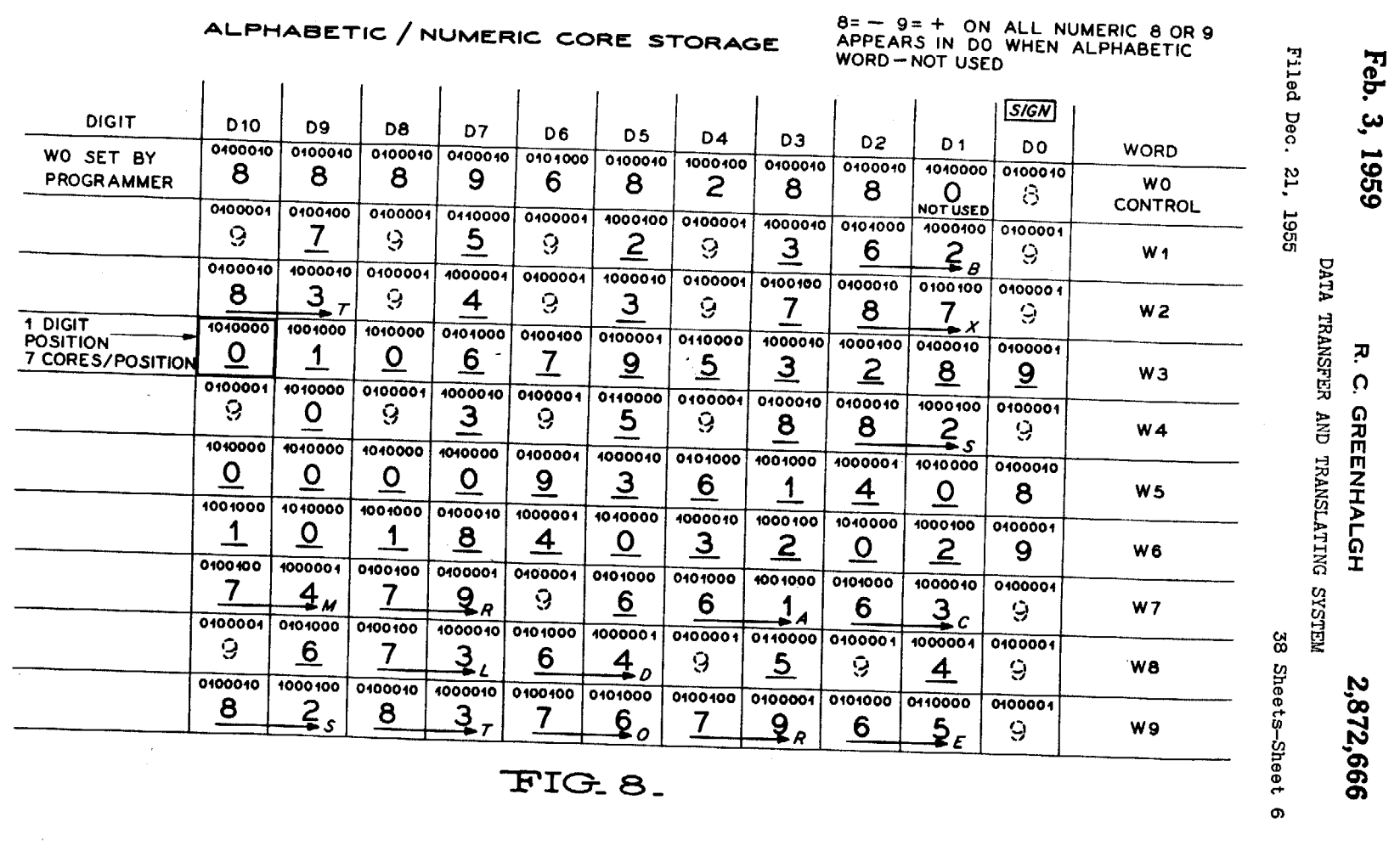
Figure 9:
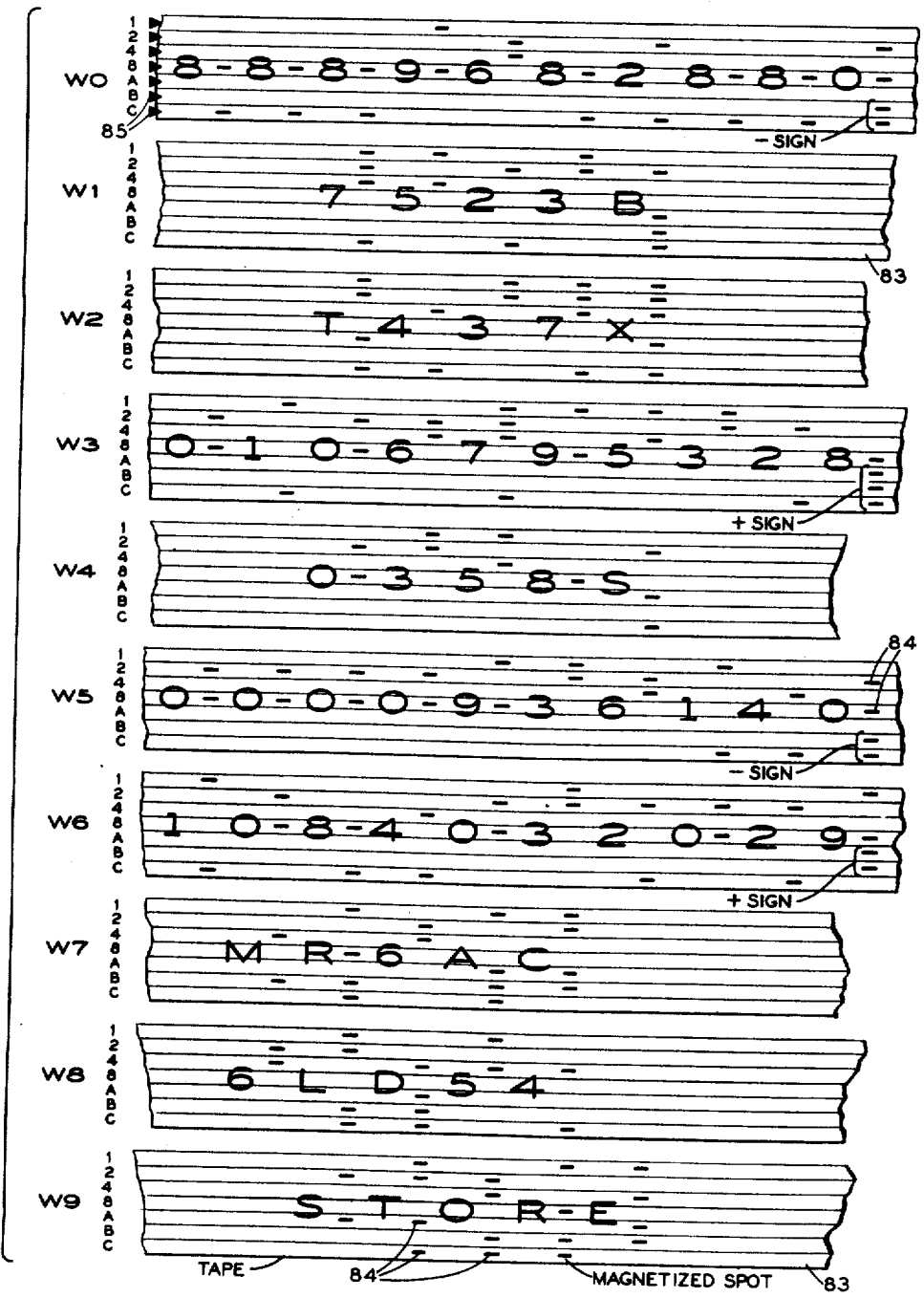
Fig. 9 is a diagrammatic representation of the data appearing in the core storage unit of Fig. 8 as it appears in the modified binary tape unit code and includes both the numeric and alphabetic character representations as spots following each character.

Figs. 13a to 13d disclose a means for translating the tape code, shown in Fig. 9, to biquinary code, shown in Figs. 7 and 8, and includes the means for inserting a 9 adjacent each numeric digit position and the sign in the alphabetic words.

Figure 14C:
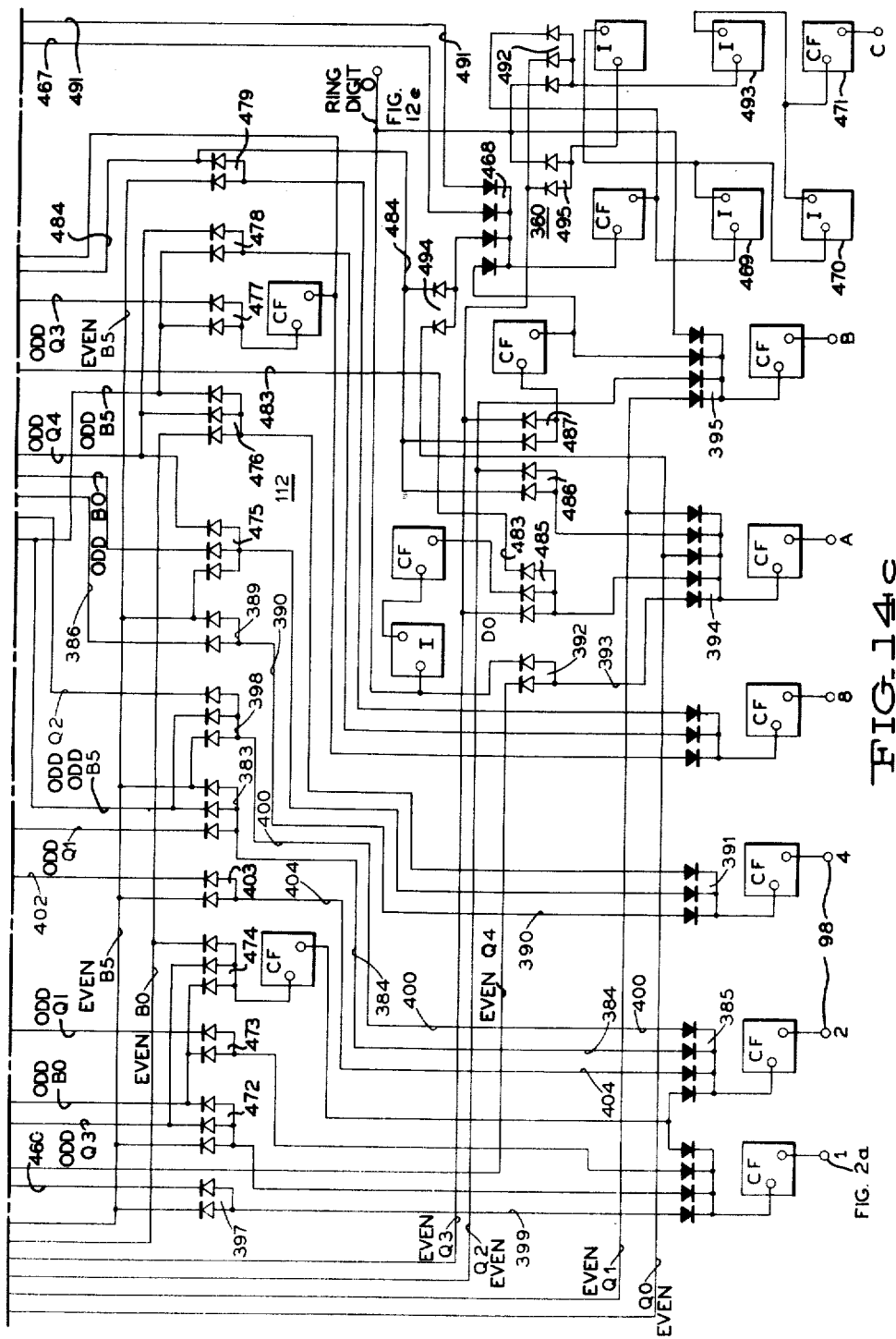

Figs. 14a to 14c disclose a means for translating numeric and alphabetic data from biquinary code as shown in Figs. 7 and 8 to the tape code shown in Fig. 9 including bit check along with the insertion of the sign under the units position for each numeric word.

Figs. 15 to 17, inclusive, show the sheet arrangement for Figs. 12a to 12m, 13a to 13d and 14a to 14c, respectively.

Figs. 18 to 21, inclusive, are timing charts representing portions of some of the control pulses for operating and timing the flow of data through the disclosed portions of the data processing systems.

Figs. 22a and 22b to 24a and 24b, inclusive, diagrammatically represent the various diode switches or "and" circuits and mixes or "or" circuits used in the control circuitry.

Figs. 25a and 25b to 28a and 28b diagrammatically represent some of the tubes in transmitting and controlling of the data transferring pulses; and Figs. 29a and 29b to Fig. 34 diagrammatically represent various pulse generating circuits and triggers utilized to control the data transferring operation.

TUBES AND CONTROL SWITCHES

In each of the drawings of the various control devices, the individual components or units making up that device are indicated merely as a box or block. The detailed circuitry of the more common of such blocks will only be generally described as applied to various typical forms of tubes and diode circuits which are shown diagrammatically in Figs. 22 to 34.

Figure 22A:
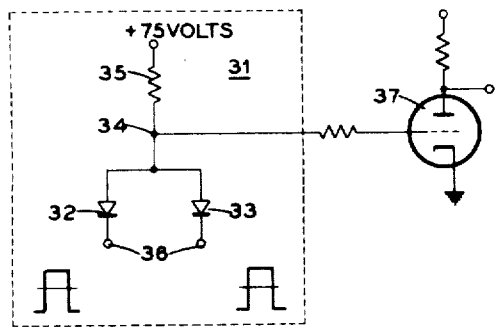

In Fig. 22a, for example, there is shown a typical coincidence switch, otherwise shown as a logical "and" circuit or diode switch 31 comprising a pair of germanium crystal diodes 32 and 33. A common terminal 34 of the diodes 32 and 33 is connected through a voltage-dropping resistance 35 to a positive 75 volt source (not shown). The diodes 32 and 33 each include an individual input terminal 36, both of which are normally biased negatively so that the common terminal 34 is normally at a negative potential with respect to ground. If coincident positive pulses are applied to both input terminals 36, the potential of the terminal 34 is raised. However, if only one of the input terminals is pulsed positively, the potential of the common terminal 34 is not raised appreciably. A voltage responsive device, such as a suitable electron tube amplifier 37, is controlled by the potential of the terminal 34 to furnish a usable output voltage pulse whenever a coincidence of positive input pulses is detected.

Figure 22B:
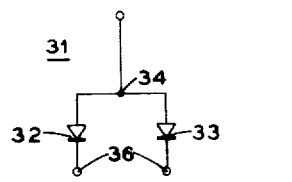

For simplicity in the drawings, the portion of the coincidence switch shown in the broken line rectangle 31 in Fig. 22a is generally represented as shown in Fig. 22b. This representation omits the dropping resistor 35 and the connection to the positive voltage source. While in the diagram only two germanium crystal diodes and input terminals 36 are shown, it is to be understood there are frequently more than two diodes incorporated in the diode switch. With any suitable number, the switch operation is identical when positive coincidence occurs at each input terminal.

Figure 23A:
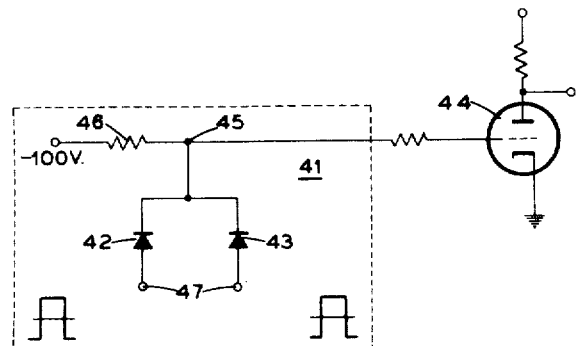

In Fig. 23a there is shown a typical mixer, otherwise known as a logical "or" circuit or diode mix 41, comprising a pair of germanium crystal diodes 42 and 43. The diodes which are employed in mixers are shaded and the direction reversed in the present drawings to distinguish them from the diodes which are employed in the switches. A voltage responsive device, represented by an electron tube amplifier 44, is controlled by the potential of a common output terminal 45 of the diodes 42 and 43, which terminal is connected by a suitable resistor 46 to a negative 100 volt source (not shown) to normally maintain a negative bias in the grid of the tube 44. Each diode is connected to an individual terminal 47 which in turn are connected in the electrical circuit. If either one (or both) of the diode input terminals 47 is pulsed positively, the potential of the terminal 45 is raised which permits the tube associated therewith to conduct.

Figure 23B:
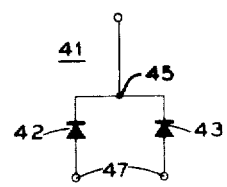

For convenience, the portion of the diode mix or "or" circuit shown in the broken line rectangle 41 in Fig. 23a is generally represented in the drawings as shown in Fig. 23b. This representation omits the resistor 46 and the connection to the negative voltage source. As in the diode switch diagram, it is to be understood the diagram representation of the diode mix 41 may involve more than the two diodes and input terminals 47 and that each additional input terminal 47 will be provided with an additional diode, such as the diodes, 42 and 43 of Fig. 23a and that the cathode of each of these additional diodes will be connected to the common terminal 45.

Figure 24A:
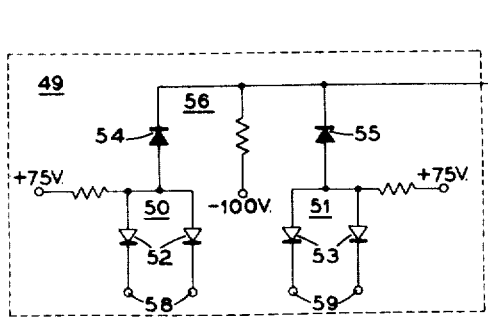
Figure 24B:
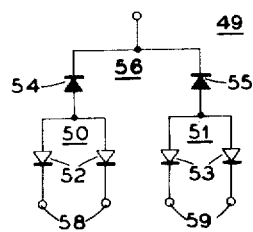

In Fig. 24a there is shown a typical circuit arrangement 49 wherein a pair of separate diode switches 50 and 51, respectively, each comprising a pair of germanium crystal diode switches or "and" circuits 52 and 53, respectively, feed through their respective diode mixer diodes 54 and 55 forming part of a diode mix circuit 56 to the voltage responsive device represented by the electronic amplifier 57. A coincidence of positive voltage pulses at input terminals 58, or at input terminals 59 causes the grid voltage of the tube 57 to rise to permit the tube to conduct. Fig. 24b illustrates the simplified showing of the diode network as used in the drawings. As in the previous diode arrangements, any number of diodes in both the diode switches or diode mixes may be incorporated in the switching circuit.

Figure 12D:
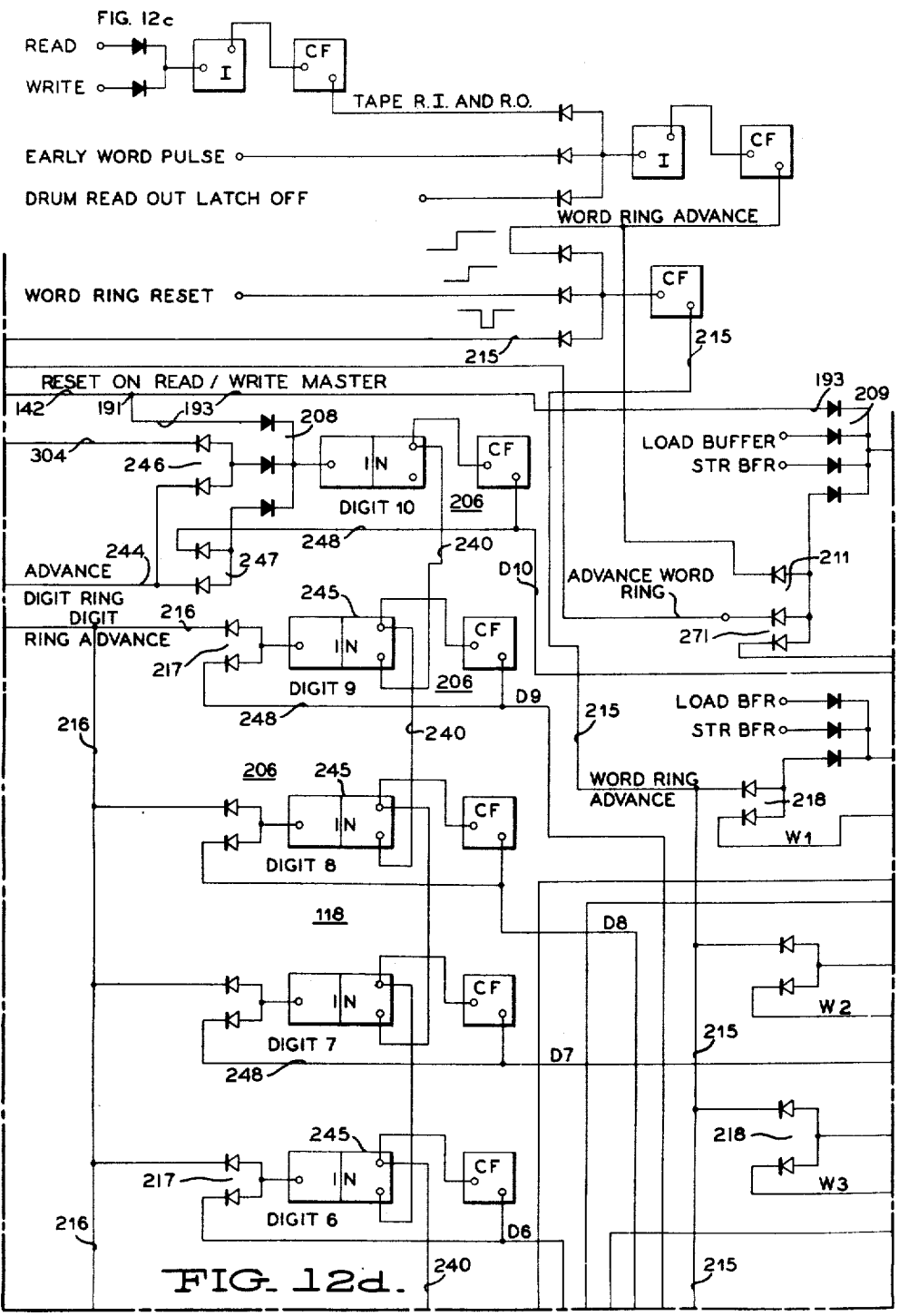
Figure 12F:
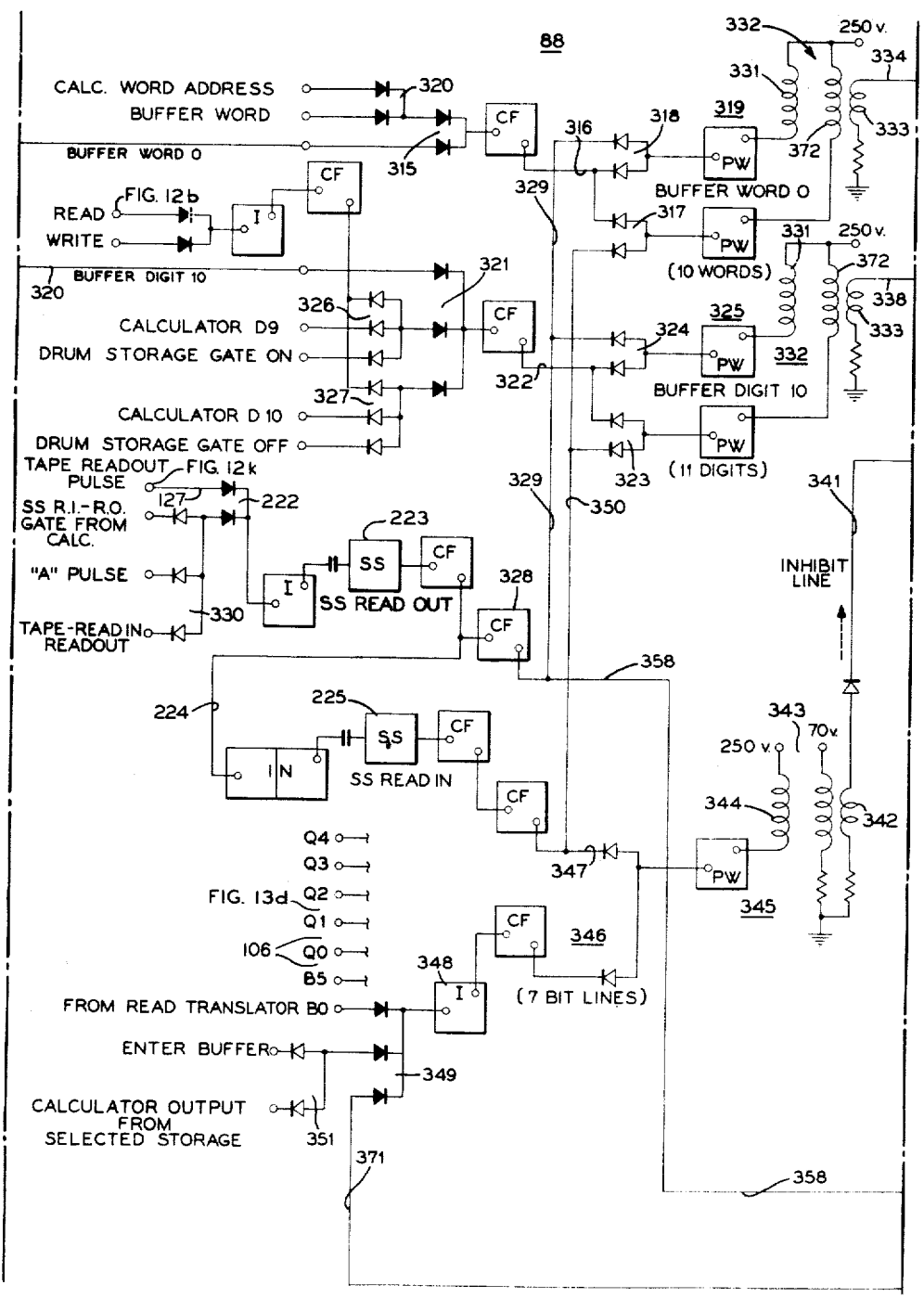
Figure 12J:
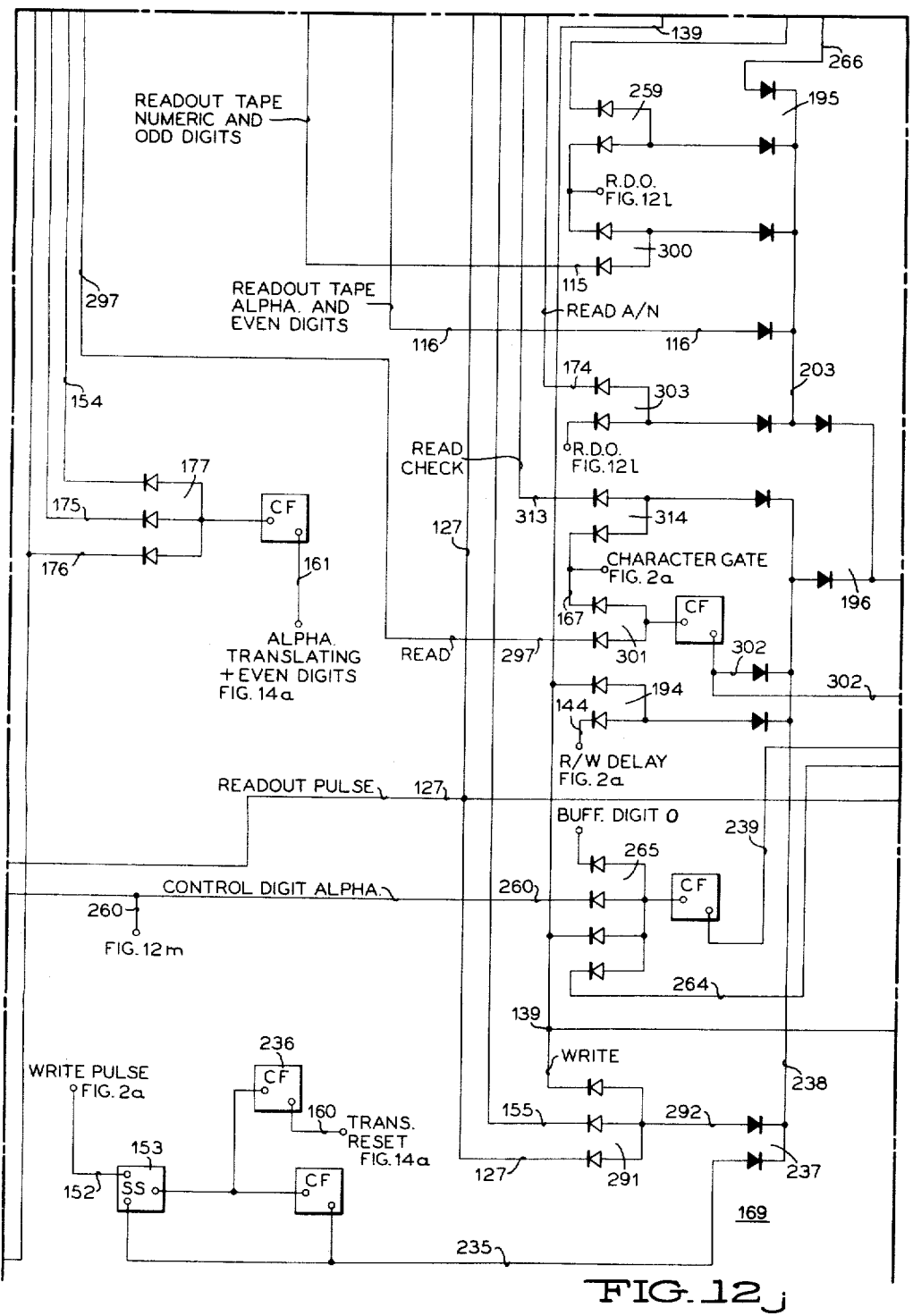
Figure 12:
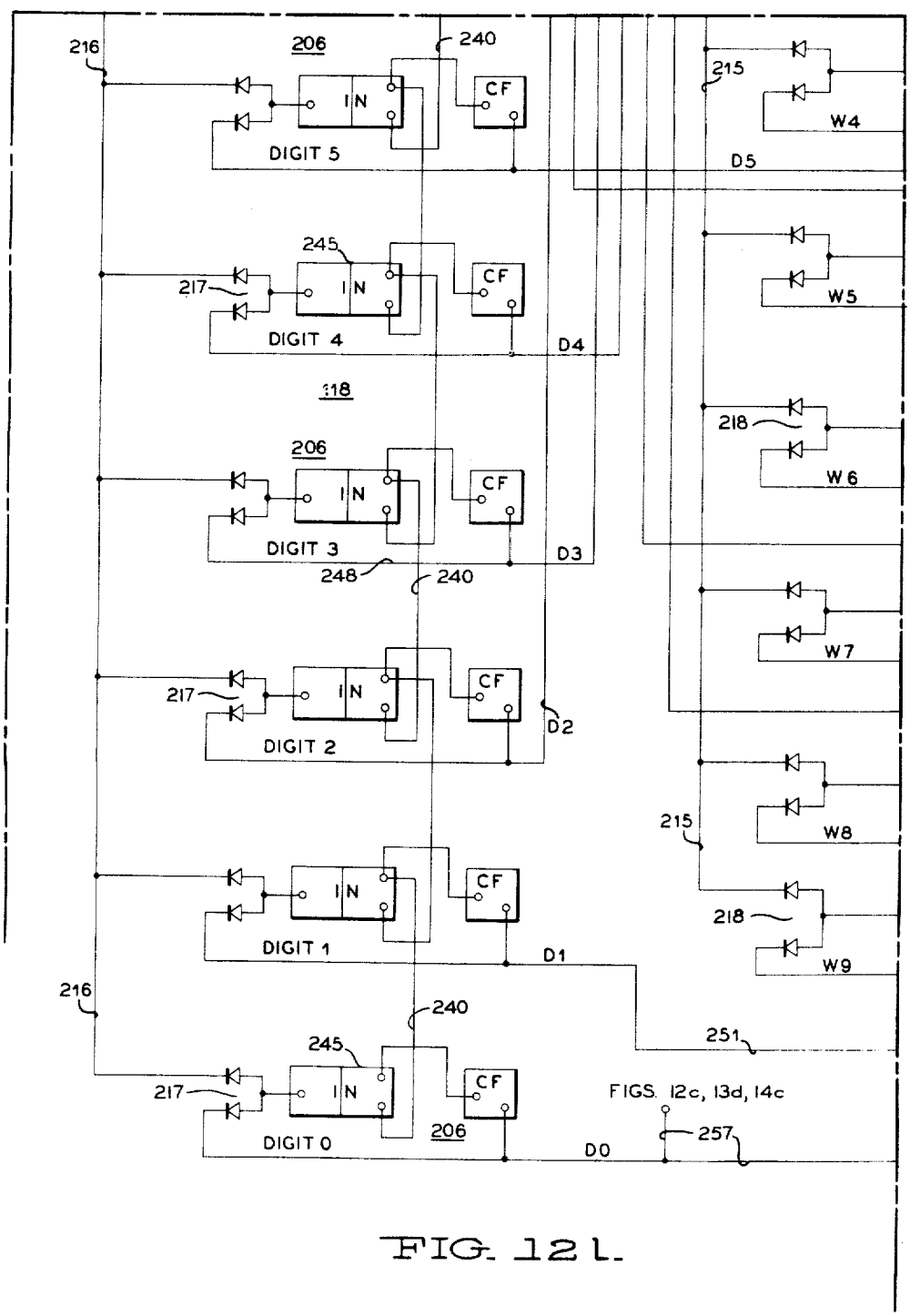

Referring momentarily to Figs. 12 to 14, inclusive, which represent diagrams of the control circuits, each of the component blocks or units, comprising a particular tube circuit, is labeled with a letter or combination of letters. By referring to Figs. 25a to 28a, inclusive, the respective general or objective circuitry of most of the component blocks may be determined by identifying the letter-number block designation. Each particular letter combination in the component block, in addition to acting as a reference designation, also denotes the function of the component. Thus, for example, a typical cathode follower is shown in Figs. 25a and 25b and is accordingly labeled with the prefix letters CF; the unit shown in Figs. 26a and 26b is a power unit or inverter and is labeled with the prefix letter I; the unit shown in Figs. 27a and 27b is an inverter follower unit or double inverter and is labeled with the prefix letters In; and the unit shown in Figs. 28a and 28b is a power amplifier unit and is accordingly labeled with the prefix letters PW.

Before proceeding with a description of the various control circuits or devices for the translating control circuitry, a brief description of representative ones of the detailed circuit units or components, Figs. 25a to 28a, utilized in those control circuits will be given. In each of the unit diagrams and other circuit diagrams, the values of the various resistors utilized therein are not given, neither are the values of the various capacitors. These would generally vary in different locations. Hereinafter, in this specification wherein a conductor or a circuit terminal or the like is referred to as being shifted positive or negative in potential, this does not necessarily mean that the point in question is positive or negative in an absolute sense, but only more positive or more negative, relative to its previous state. This principle also applies to any description wherein positive and negative pulses are mentioned or referred to as up or down or raised or lowered.

Referring now to Fig. 25a, the unit CF comprises a triode vacuum tube 60 whose grid may or may not be connected to a negative voltage supply through a resistor. The cathode of the triode is generally connected through a resistor 61 to a negative 50 volt supply and the anode or plate of the triode section is connected to a positive 150 volt supply. The grid of the triode is also connected through a resistor 62 to an input terminal 63. The output of the triode is taken from a terminal 64 connected to the cathode side of the resistor 61. The input terminal 63 is generally connected to a switching potential, which is maintained at a positive potential. With the upper positive potential on the terminal 63, the associated grid is maintained at such a potential that the tube current is at a maximum and accordingly the cathode terminal 64 is at a maximum positive potential. With the lower positive potential on terminal 63, the associated grid is maintained at such a potential that the tube current is at a minimum and accordingly the cathode terminal 64 is at a minimum negative potential. Thus a shift of potential on the terminal 63 effects a corresponding inphase shift of potential of the output terminal 64. This well-known type of tube action is referred to as cathode follower action.

It will be noted that the cathode resistor of the triode is of relatively low value. As a result, the cathode output terminal serves as a low impedance signal source and may be "loaded" appreciably without substantially affecting the magnitude of the signal supplied therefrom. This is the main purpose of a cathode follower unit. Also the cathode follower rapidly follows the voltage shift of the input terminal 63 to the grid so that the resultant shift in potential of cathode terminal 64 does not appreciably lag the input voltage. While only a simplified cathode follower is shown, it is to be understood that various types may be utilized in different locations and the circuits may involve various resistance values and capacity couplings to produce the desired outputs. Since the particular cathode followers used are not part of the invention, a detailed description of each possible type is not deemed necessary.

Referring now to Figs. 26a and 26b, an inverter or amplifier unit I comprises a triode 65 having its cathode connected to ground. An inverter, as its name implies, is adapted to invert simply a signal. Thus if the grid terminal 66 shifts positive, the triode conducts more heavily and the associated plate output terminal 67 shifts negative. Similarly, if the grid terminal 66 shifts negative, the terminal 67 shifts positive.

Fig. 27a discloses a typical inverter follower or double inverter 68 which is indicated as In in Fig. 27b. In this instance a dual triode is arranged so that the grid on the left-hand triode 69 is connected to a variable voltage source at the terminal 70 and the grid on the right-hand triode 71 is biased positive by the left-hand plate voltage. Thus with the right side conducting the plate voltage at the output terminal 72 is low while the voltage at the terminal 73 connected to the left-hand plate is high. When a positive potential is received at the left-hand grid over the terminal 70, that side of the tube conducts, which by dropping its plate voltage cuts off the right-hand side 71 of the tube. Upon cutoff, the voltage at the terminal 72 rises while the voltage on the conducting side of the dual triode drops. Thus it can be seen that the terminal 72 on the right-hand triode directly follows the potential of the left-hand grid voltage, while the voltage at the terminal 73 is inverted. When these double inverters are incorporated in latch circuits, a positive potential is applied to the terminal 74 to cause the right-hand tube 71 to conduct and thus drop the voltage at the terminal 72.

Power amplifiers or units PW effect 180° signal inversion of an applied signal so that they may also be classified as inverters. However, they differ from the inverter units, which are primarily voltage devices, in that they can supply considerable power to the circuits to which they are connected. In Figs. 28a and 28b, a PW unit comprises a triode tube 48 wherein the application of a positive signal to the grid input terminal 75 through the related resistors results in heavy conduction from a positive 250 volt source through the plate circuit and series connected coil 76 to induce a magnetic flux therein for purposes to be hereinafter described.

Fig. 29a discloses a capacity coupled cathode follower 501 whose input circuit to the grid has been modified to include a 39 micro-microfarad condenser 502 and a biasing network 503. Thus when a positive pulse is applied to the input terminal 504, the condenser 502 momentarily drives the grid positive and provides a positive-going spike pulse over the output terminal 505 in the normal manner. The 150 K resistor acts to return the grid circuit to its negative cutoff value independent of the positive value on the input terminal. Fig. 29b diagrammatically indicates this capacity coupled cathode follower which is used in several of the latch circuits, Figs. 12c and 12i, to be hereinafter described.

Referring now to Fig. 30a, a trigger unit 506 is shown which is conventional in construction and comprises two retroactively coupled triode sections 507 and 508, respectively. By proper selection of circuit components, the unit is so arranged that only one of the triode sections is conductive at a time in accordance with a well-known trigger operation. With the right-hand triode 507 conducting, the trigger is defined as being in an Off position. With the trigger Off, the plate terminal 8 and tap terminal 7 of the right-hand triode 507 are at some potential below the supply positive potential of 150 volts due to the current being drawn through the right-hand triode. As a result, voltage sensitive circuits which may be connected to terminals 8 and 7 are accordingly controlled. With the trigger Off, as assumed, the plate of the nonconducting left-hand triode 508 is approximately at the positive supply potential of 150 volts.

If a negative-going waveform or pulse is applied to input terminal 3, the grid of the right-hand triode 507 starts to shift negative by action of the series connected condenser 509. As a result, this triode is rendered less conductive. The resultant positive shifting of its plate is applied through a suitable condenser 510 to the grid of the left-hand triode 508 and renders this triode conductive. The resultant negative shifting of the plate of the left-hand triode is then applied through its associated condenser 511 to the grid of the right-hand triode 507 and renders it less conductive. With the right-hand triode less conductive, the left-hand triode is rendered more conductive. This retroactive action between the left and right-hand triodes continues until the left-hand triode 508 is fully conductive and the right-hand triode 507 is nonconductive. This retroactive action is very rapid so that in effect the application of the negative shift to the terminal 3 almost instantaneously initiates the "flipping" of conduction from the right to the left-hand triode. With the left-hand triode 508 conducting, the trigger is defined as being in an On condition. With the trigger On, the plate of the left-hand triode 508, along with its output terminals, are at a low potential, while the plate terminals 8 and 7 of the right-hand triode are at approximately a positive 150 volts. With the shift of potential of terminal 8 and 7, associated circuits are accordingly controlled.

The trigger is "flipped" from its On to its Off position by applying a negative voltage shift to grid input terminal 6 of the left-hand triode. The trigger unit is insensitive to positive voltage shifts applied to the terminals 6 and 3. Thus if the trigger is On, it cannot be shifted Off by positively pulsing the grid of the right-hand or nonconductive triode 507 but only by negatively pulsing the grid of the left-hand or conductive triode 62. This selective response to only negative pulses is effected by proper choice of bias potential. Fig. 30b diagrammatically indicates triggers of this type which may be incorporated in a circuit shown in Fig. 34.

The trigger 512 shown in Fig. 31a is substantially identical to that shown in Fig. 30a, with the exception that a positive-going input is provided at the terminals 3 and 6 to flip the trigger from its Off to its On position and vice versa. In this instance, the condensers 509 between the input terminal and the control grids are eliminated and diodes 513 are connected in lieu thereof. The plate side of these diodes are commoned so that the positive input is applied to both diodes. Assuming the right-hand triode 507 is conducting, its grid potential is at a positive value and the positive pulse applied over the terminal 3 has no influence on the right-hand triode. This positive value, however, passes through the diode 513 on the left-hand side of the circuit, is impressed on the related grid and causes the left-hand triode to conduct. In so doing the right-hand triode cuts off and provides a positive output over the right-hand terminals 7 and 8, while a negative output appears over the left-hand terminals 4 and 5. This trigger action is identical to the other and the only difference relates to the type of input pulse which triggers the triodes.

Referring to Fig. 32a, there is shown one type of single shot generating device which is used in portions of the circuitry to be hereinafter described. In this particular arrangement a normally conducting triode 514 has a connection 515 from its plate circuit to the grid of a cathode follower 516 to normally maintain the same nonconducting. This provides a negative value at the output terminal 517 and at the same time an associated conductor 518 leading to the grid of a triode 519 holds the same nonconducting. Since triode 519 is nonconducting, point 520 in the plate circuit is at 150 volts. Point 520 connects to one side of a 68 micro-microfarad condenser 521 whose other side is connected to ground through a diode and 20 K resistor combination 522.

In the operation of the single shot, a pulse is applied to an input terminal 523 leading to the grid of an inverter triode 524. As this tube conducts, its plate potential drops which reacts through a 68 micro-microfarad condenser 525 to cut off the inverter triode 514. Cutoff of this tube raises its plate potential which is reflected over the conductor 515 and resistor to the grid of the cathode follower 516 and this tube conducts. Conduction of this tube provides a positive output over the terminal 517 and at the same time reacts through the conductor 518 leading to the grid of the triode 519 and turns the same On. As triode 519 turns On, the plate circuit drops and reacts on the condenser 521 in a negative direction to hold tube 514 Off. The condenser 521 holds triode 514 cutoff until it discharges through the resistor 522. When the condenser 521 discharges sufficiently, the triode 514 conducts and cuts off the cathode follower 516 which in turn drops the grid of the triode 519 to cut off the same. The duration or timing of this single shot output is dependent upon the value of the condenser 521 and resistor 522. By varying these, the time constant may be modified to provide a 6, 8 or 2 micro-second single shot as desired for proper timing of the various control circuits. Of course, any suitable apparatus may be utilized to obtain the desired timed pulses.

Fig. 32b diagrammatically illustrates in block form the single shots which may be of any desired duration.

Referring now to Fig. 33a, there is shown a similar type single shot 526 which provides the read-write delay in the control circuit, thereby to permit the apparatus to come up in speed. In this instance a negative-going input applied to the terminal 527 reacts through condensers C4 and C1 to drop the potential on the grid of the right-hand triode 528 to cut off the same Off. In so doing the right-hand plate potential increases and reacts through resistor R6 and condenser C3 to raise the left-hand grid circuit and turn the left-hand triode 529 On. As this occurs, the output over the terminal 530 on the right-hand side of the circuit increases in potential while that extending over the left-hand terminal 531 decreases. In this manner both a positive and negative-going value may be obtained from the single shot circuit and both may be utilized as desired. The time required to return this circuit to its original position with the right-hand triode 528 conducting and the potential on the terminals 530 and 531 reversed is dependent upon the values of the resistor R9 and the condenser C1. By selectively modifying these two, the time constant is modified, for example, in this modification in order to obtain a 4 millisecond read delay, resistor R9 has a value of 1.3 megohms, while condenser C1 has a rating of .002 micro-farad. To obtain a write delay of 10 milliseconds, a second single shot device is provided with an identical circuit including the 1.3 megohm resistor, however, in this instance, the capacity of the condenser C1 has been changed to .01 micro-farad. This change in the condenser value provides the difference in time of response between the read delay and the write delay as will be hereinafter described.

The above single shots are one of many types capable of forming desired timed pulses and form no part of the invention other than as a pulse generating device.

Referring now to Fig. 34, there is shown a means for developing the write pulse and the character gate pulse used in the control circuitry for initiating operation of the single shots and the various triggers to perform the reading and writing operations. The crystal clock 150 is a standard crystal capable of providing pulses at 476 kilocycles. The output of this clock feeds through a binary trigger 532 to divide the clock output by two and the output from the binary trigger feeds to a plurality of parallel connected diode switches, each of which connects to an independent trigger dividing circuit. The first pulse from the binary trigger turns trigger 1 Off, which acts to turn On trigger 2, which in turn feeds to trigger 3. The output from the third trigger conditions one side of a diode switch 533 and operates trigger 4 whose output in turn actuates binary trigger 5 to provide an output to another element of the diode switch 533 and raises binary trigger 6. This action is repeated and when the outputs from the triggers 3, 5 and 6 are applied to the switch 533, the write pulse trigger 151 is turned On to provide a pulse over a line 152 to initiate the various operations as will be hereinafter described. The fall of the trigger 6 acts through a condenser 534 and diode to turn the write pulse trigger Off and drop the potential on the line 152. The triggers are so arranged as to divide the output from the crystal clock to provide an 8.4 micro-second pulse every 67.2 micro-seconds.

The output from trigger 5 is also connected by means of a conductor 535 to a capacitor coupled diode switch 536 which is operative to turn the character gate trigger 165 to its On position during a write operation. The first bit delivered to the inverter 537 is effective to provide a negative-going pulse to the character gate trigger 165 to turn the same On and as the binary trigger 5 goes Off, this is effective to turn the trigger to its Off position. During a write operation, the output pulse from the terminal has a duration of 16.8 micro-seconds and during read the pulse duration is 33.6 micro-seconds.

Here again the circuitry diagrammatically disclosed involves triggers which are flipped with negative-going pulses, however, other and similar type circuitry is applicable to provide the proper pulses to perform the necessary control operations.

GENERAL DESCRIPTION

Figure 1:
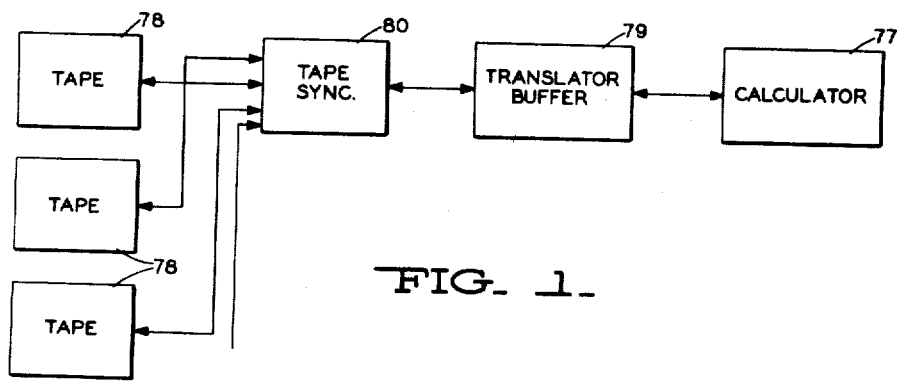
Figure 3:
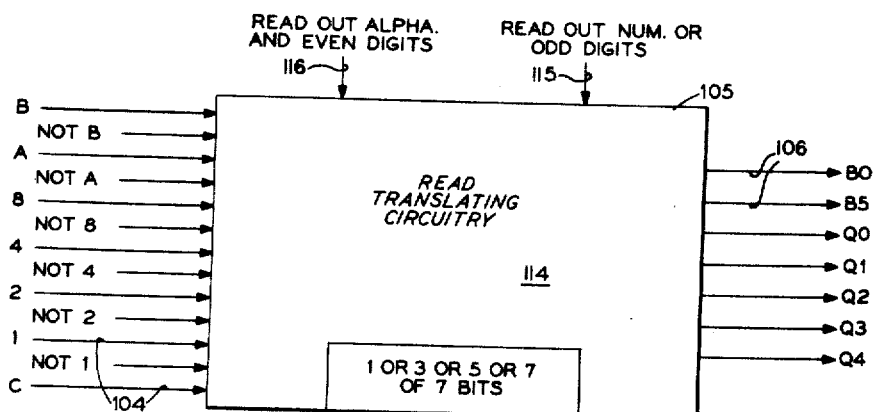
Fig. 3 is a block diagram of the read translator, shown in Figs. 2b and 14a to 14c, for automatically converting alphabetic and numeric data from one code to a second code.

Referring now to Fig. 1 for one embodiment for utilizing the invention, there is shown a block diagram of a data processing system for transferring data between a suitable calculator or data processing means 77, which may be of the type disclosed in F. E. Hamilton et al. applications, Serial Nos. 398,922 and 544,520, filed December 18, 1953 and November 2, 1955, respectively, to one of a plurality of tape units or data storage devices 78, one type of which may be similar to that disclosed in W. S. Buslik et al. application, Serial No. 468,832, filed November 15, 1954, both of which are assigned to the assignee of the present invention.

The means for transferring the data includes a translator buffer storage and control combination 79 which is selectively operated under the control of the calculator 77 and a tape synchronization control unit or means 80. With this arrangement groups of words of data may be freely transferred from the calculator 77 to one of the tape storage units or the like 78 and vice versa under the direction of the program control circuitry in the calculator which has been previously established by the program.

Figure 2A:
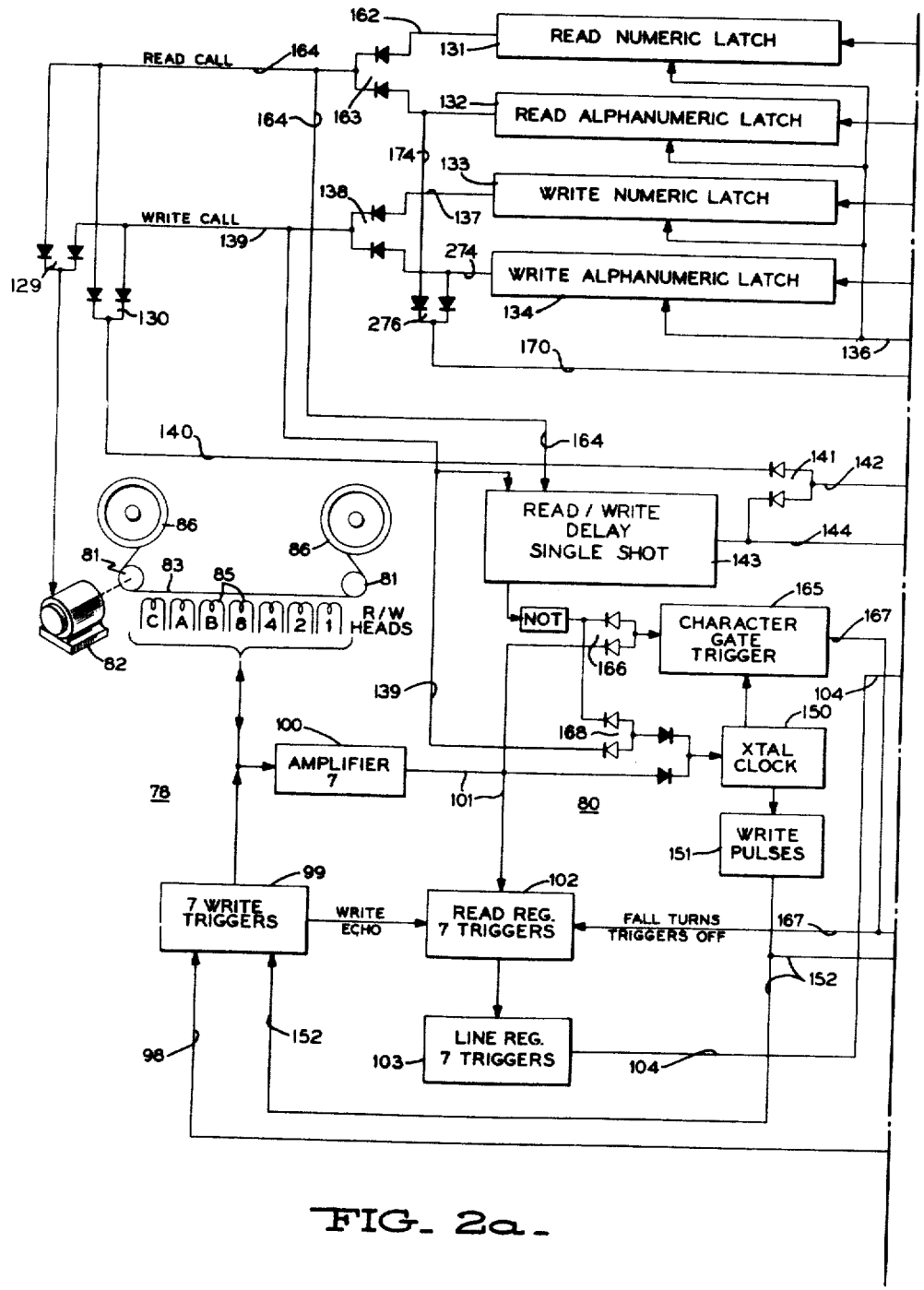
Figure 2B:
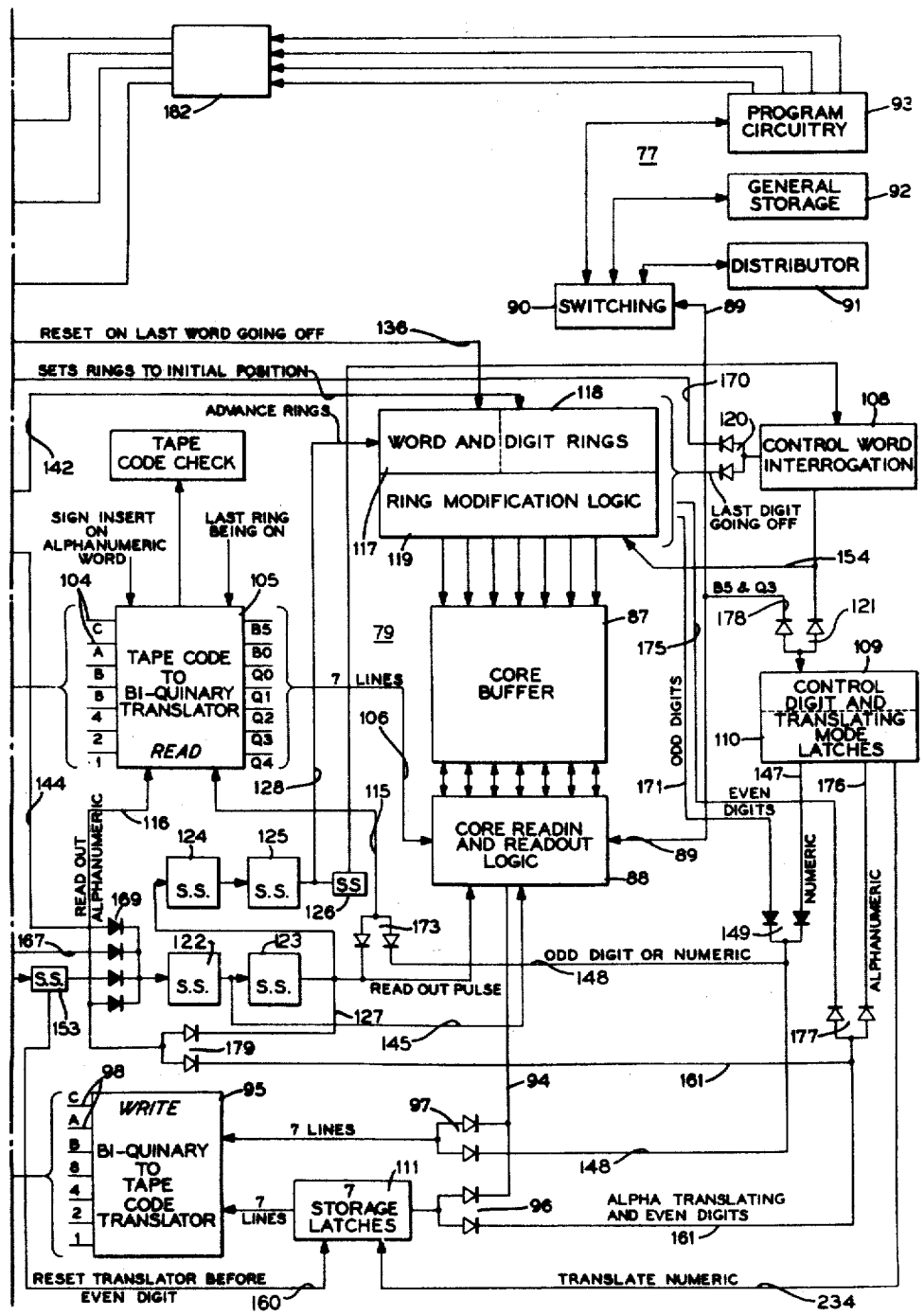

Referring now to Figs. 2a and 2b, a portion of one of the tape units 78 is diagrammatically shown, Fig. 2a, as comprising a pair of capstans 81 driven by reversible motors 82 (only one of which is shown) for feeding a tape 83, having magnetized spots 84 thereon, as shown in Fig. 9, past a plurality of parallel read and write magnet heads or coils 85. The tape 83 is wound on a pair of reversibly rotatable reels 86 driven in any suitable manner, not shown. The means for starting a writing or reading operation extends from the program circuitry from the calculator 77, Fig. 2b, through a portion of the tape control synchronizer 80, Fig. 2a, to the capstan and reel drive motors.

Associated with the tape control unit or synchronizer 80 are various electronic control switches, triggers, and the like which are capable of generating and delivering pulses of various durations and amplitudes for effecting data transfer, as will be hereinafter explained.

The translator buffer and control mechanisms 79 disclosed in Fig. 2b include, by way of example, a data buffer storage device or magnetic core matrix 87 in which is stored biquinary coded alphanumeric character representations. This particular matrix is divided to provide a group of ten parallel rows of words, W0 to W9, Figs. 7 and 8, and each word is subdivided into eleven digit positions, D0 to D10, arranged in vertical columns. In this manner each word is capable of storing ten numeric data carrying digits, plus a numeric sign carried in the digit D0 position. In order to read out of the core matrix 87, Fig. 2b, it is necessary to transfer the stored bits of information to a suitable read-in-readout circuitry 88, from which point the data may be selectively directed over a set of biquinary lines 89 to suitable switching 90 in the calculator 77 which in turn selectively directs the data being transferred to a distributor 91, general storage 92 or to the program circuitry 93 as predetermined by the programmer.

This same data may be transmitted over lines 94, parallel by bit and serial by digit and by word, to a write translator or the like 95 which is capable of translating automatically the data in either the numeric or alphabetic mode, as determined by the Alphanumeric and Numeric switches 96 and 97, for delivery over a group of modified binary code lines 98 to energize selectively write triggers 99, Fig. 2a, carried in the tape unit. These write triggers provide the magnetic pulse to the read-write heads 85 to record the data in two or more of the selected binary 1—2—4—8 and A, B, and C coded tracks on the tape, as shown in Fig. 9.

On the tape reading operation, the same heads 85, Fig. 2a, may be utilized to impulse related amplifiers 100 in the tape unit which in turn feed the amplified data pulses over lines 101 to a read register 102. This read register feeds the data through a line register 103 and over lines 104 to a read translator or the like 105, Fig. 2b. The read translator translates the binary tape code to biquinary form and delivers the data over biquinary lines 106 to the read-in and readout switching 88 to set up and store any numeric word digit for digit, while any alphabetic word stored in the matrix 87 occupies two adjacent even and odd digit positions per character.

While Figs. 2a and 2b show and the decription mentions but single lines extending between the various components, it is to be understood more than one line may be necessary to accomplish the desired data transfer or control thereof.

Functional operation of apparatus

Before proceeding with the description of the additional detailed control circuitry, a discussion of Figs. 7, 8 and 9 will aid in a better understanding of the invention.

Referring first to Fig. 7, a numeric word group is shown as comprising ten words, W0 to W9, arranged in rows which are divided into columns of digits, D0 to D10. Each digit position is representative of a single data buffer storage position and each data position includes, in this example, a two-out-of-seven bit numeric character representation as shown in Fig. 11 and by the equivalent biquinary bit values, indicated as "1's," located above each numeric character. A typical single bit core storage device 107 is diagrammatically shown in Fig. 4.

A numeric value carried in any digit position is represented by a group of seven cores disposed in the biquinary B0, B5, Q0, Q1, Q2, Q3 and Q4 positions. Thus, for example, a numeric 9 in biquinary code is represented in any digit position by driving and setting the magnetism of the cores in the B5 and Q4 positions in the direction selected to indicate a 1 bit in each, while the magnetism of cores in the remaining biquinary positions stay in their opposite state or 0 bit value positions. The particular energization for each numeric character representation is set forth above each numeric value shown in Figs. 7, 8 and 11 and two of which read as follows: 0100001 indicating a B5 and Q4, represents a numeric 9; and a numeric 0 is indicated as a 1010000 (B0, Q0). A review of all of the other numeric values shown in this core storage matrix will disclose combinations of two 1 and five 0 bits at each position and these "1's" indicate which two of the seven cores at each particular digit position have been transferred or hold data.

When the entire group of words includes solely numeric data, as indicated in Fig. 7, the digit D0 position of each word indicates a plus or minus sign for that particular word. In this example a 9 in the digit D0 position indicates a positive or plus value for the associated numeric word and an 8 in digit D0 position indicates a negative or minus value for its related word. The means for translating this sign and placing it over the units position in the tape 83 will be hereinafter more fully described. Under the above conditions when a data transfer is initiated, the entire word group may be transferred by a single instruction, parallel by bit, serial by digit and by word.

Referring to Fig. 8 there is shown a similar group of ten words having a hypothetical list of numeric character representations in each of the eleven digit positions of the core matrix 87. However, in this instance, some of the words of the group have alphabetic characters occurring therein, therefore, this word group must be considered as an alphanumeric word group. Under these circumstances, word W0 becomes a control word and is so established by the programmer and to agree with the particular control circuitry of this embodiment. The remaining words W1 to W9 became data words. It is to be understood, of course, that any other word in the group may be established as the control word.

As will be noted, the control word W0 is filled with numeric characters. Digit positions D2 to D10, inclusive, in the control word are assigned as control digits for the remaining data words W1 through W9, respectively. While digit positions D1 and D0 in the control word have numeric character representations stored therein, these digit positions form no part of the control operation in this embodiment and may be ignored. However, these digit positions may be utilized for initiating selective data transfer under other operating conditions.

In order to store or process alphabetic data in the biquinary code, two digit positions, one even and one odd in this instance, are necessary for each alphabetic character. Generally, the even digit positions contain what corresponds to the zone part of an alphabetic character. This is shown more clearly in Fig. 10 wherein the numeric character representation for the even and odd digit positions are shown in the biquinary code for each of the characters to be processed. For example, the alphabetic character B is stored as a biquinary 6 (B5, Q1) in the even digit position and a biquinary 2 (B0, Q2) in the odd digit position. In Fig. 8 the letter B is shown standing in D2 and D1 digit positions in word 1.

A review of the cord chart, Fig. 10, and the alphabetic word group in Fig. 8 shows various combinations of double digit biquinary representations at the various locations of the words carrying alphabetic data. The hypothetical values in the alphanumeric group of words disclose that alphabetic data appears in words W1, W2, W4, W7, W8 and W9. The particular digital location and numeric representation of the respective alphabetic data and the proper combination of the pair of even and odd digits is underlined by an arrowed line, which in turn points to the alphabetic character of each particular combination represented. Thus in word W2, the 8 and 3 appearing in digits D10 and D9 represent a T, shown in D9, and the combination of 8 and 7 at digits D2 and D1 represents an X. Likewise, in word W7, the 7 and 4 in the digit D10 and D9 locations represent an M. This same combination of various digits can be readily seen in the remaining words.

Since words W1, W2, W4, W7, W8 and W9 are alphabetic with one or more alphabetic characters appearing therein, a numeric 8 is inserted at their respective control digits D2, D3, D5, D8, D9 and D10. Under these conditions, all digit positions in each of the above words must be translated in the alphabetic mode, even though numeric values may be included therein as shown. Thus it is necessary to assign each numeric character in each alphabetic word two digit positions, one even and an adjacent odd digit. In this modification, each odd digit position of each pair carries the actual numeric character included in the alphabetic word, while the even digit for each pair is represented by a 9, which is shown as dotted. The even digit 9's are delivered to the write translator 95, Fig. 2b, at the time of the word transfer and are combined with the odd digit values so that each 10 digit alphabetic word translated eventually appears on the tape or other device with a total of five character representations per word.

While the numeric characters appear in digit D0 of the above alphabetic words and is shown as a dotted 9, the character is ignored or eliminated when the word is translated in the alphabetic mode, as will be described hereinafter. However, the digit D0 in word W0 is translated and appears on the tape as a sign over the units position because word W0 is a numeric word and is translated in the numeric mode.

The dotted numeric characters appearing in Fig. 8 are actually present as the character represented in the buffer storage unit 87, however, these characters are eliminated by the write translator 95 during the transfer of the data from the core buffer storage unit to the tape 83, Fig. 2a, and reinserted by the read translator 105, Fig. 2b, when transferring from the tape to the core buffer 87.

In the above example, it is seen that words W3, W5 and W6 are entirely numeric and include a numeric sign value of 9, 8 and 9 in their respective digit D0 positions. Since no alphabetic characters appear in these words, the programmer may insert any numeric value but 8 in their related control digits D4, D6 and D7 in word 0. The absence of an 8 in a control digit indicates that the word controlled thereby is all numeric. Thus, when this word is transferred to the write translator 95, the transfer occurs parallel by bit and serial by digit for the entire word. Therefore, ten characters are placed on the tape 83 corresponding to the ten characters in the core buffer. The numeric sign in the numeric word at D0 is translated and placed over or in parallel with the units character on the tape as shown in Fig. 9.

Thus the biquinary numeric characters shown in Fig. 8 eventually appear in the tape as shown in Fig. 9. Word W0 is the same as W0 in the core buffer 87 digit by digit, except that the character representation now appears in binary 1—2—4—8 code and the sign of the numeric word is inserted in one or both of the A and B zone tracks in the tape. With respect to word W1, only five of the original ten characters appear on the tape, i. e., numeric 7, 5, 2 and 3 which were in the buffer odd digit positions and a B which occupied the combined digits D2 and D1 positions in the core.

The particular coded position of each character in the tape is shown following the printed character. It is to be noted tape binary coded decimal 1—2—4—8 tracks also include three additional tracks A, B and C. The A and B zone tracks enable the placing of alphabetic data on the tape along with a numeric sign notation and the C track is included to provide a means for developing an even bit check. For example, in word W1 a 7 appears as binary bits, 1, 2 and 4, thus a bit is placed in the C track in parallel with the three bits to provide the even bit check. Numeric 5, 2 and 3 each have two bits, thus nothing appears in the C track. Since a B is represented by a bit in the binary code 2 track and a bit each in the A and B tracks, this represents a total of three bits. Therefore, a bit is inserted in the C track to again provide the even bit check.

In words W2, W4, W7, W8 and W9 the entire word comprises five characters each because an alphabetic character representation appears in at least one of their digit positions.

The words W3, W5 and W6, however, are numeric words. Therefore, each word contains ten characters each in the binary coded positions corresponding to the exact location of the characters in the core. In both locations the digit D10 appears in the high even digit position. The numeric representation of the sign appearing in the core digit D0 of each numeric word must be recorded in the tape. This is done by so timing the reading and translating of digits D1 and D0, so that the digit D1 appears in the proper position in the binary code tracks and the sign of the word is impressed over the units position to appear as a bit each on the A and B tracks if the sign of the word is plus, or on the B track alone if the sign of the word is negative. Thus in the example given, words W3 and W6 will have bits appearing in the A and B tracks, while in word W5, a bit is placed in the B track alone. In words W0, W3 and W5, however, a bit must be placed in the C track in order to obtain the desired even bit count check. If other numeric data were placed in the units position to provide an even bit check, the C bits would not be necessary.

In the above alphanumeric example, with alphabetic transfer taking place after the delivery of the first or control word W0 to the tape 83 for writing or recording thereon, the delivery of the second word is blocked by interrogation switching 108, Fig. 2b, and in so doing the control digit D2 of word W0 is sampled or interrogated to detect the presence or absence of an 8 in that digit. Since the control digit indicates an 8, it signifies that word W1, when delivered, must be transferred and translated in the alphabetic mode. This is accomplished by control digit and translating switching 109 and 110 leading to the write translator 95 to intercept the numeric value in the first even digit D10 and store the same in write translator latches 111, Figs. 2b, 6 and 14a, after which the odd digit is delivered to the write translator. Both digits are mixed in a combination of switching logic 112, Figs. 6 and 14c, and the proper output binary lines 98 are energized to operate the appropriate write triggers 99, Fig. 2a, and apply write pulses at the heads 85 to place the proper bit values in the tape 83 in the selected tracks.

Each pair of digits in the data word W1 are selectively compared and the appropriate translation performed until the last digit is disposed of. At this time the interrogation switching 108 is operated to block the delivery of word W2 until digit D3 of word W0 has been interrogated for an indication of an alphabetic or numeric word. In this example, the 8 in digit D3 indicates an alphabetic word, therefore, it is released and translated in the same manner as word W1.

Figure 6:
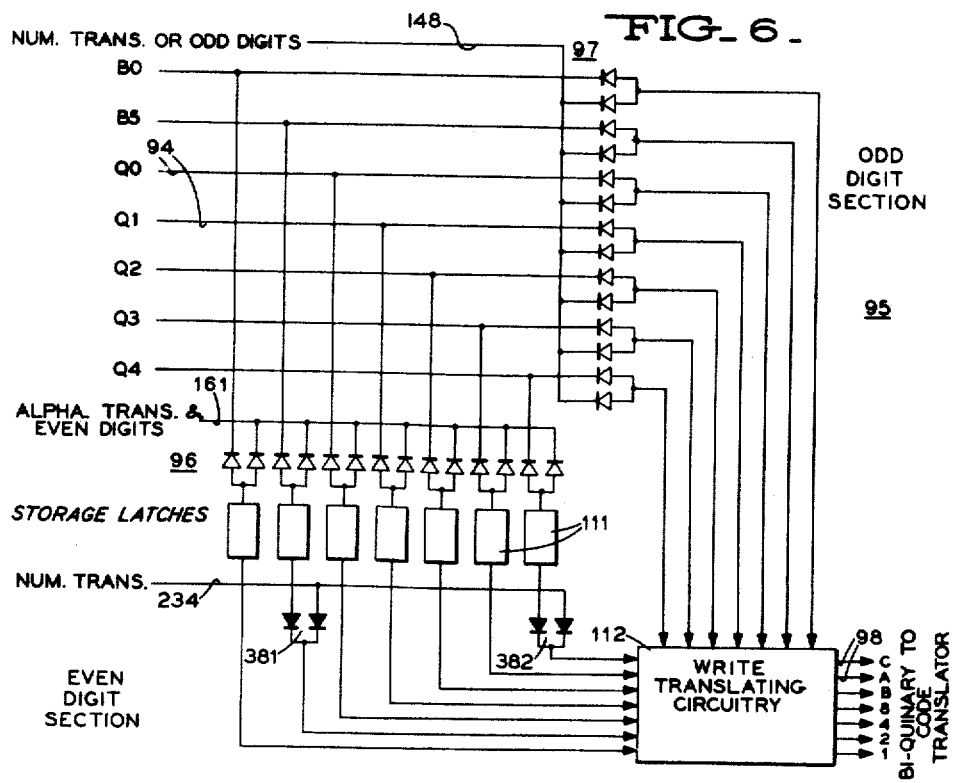
Fig. 6 is a block diagram of the write translator, shown in Figs. 2b and 13a to 13d, for automatically converting alphabetic and numeric data from the second code to the first.

As word W3 comes up for delivery, it likewise is blocked and digit D4 is interrogated. Since an 8 is not present, it indicates that word W3, when transmitted, is to be translated in the numeric mode, digit for digit to the tape. Under these conditions, the even digit side of the write translator 95, Fig. 6, is blocked and all digits pass through the normally odd digit side of the write translator, with one exception, that is, when digit D1 is switched so that the sign value in digit D0 is forced into the even digit side of the translator prior to the delivery of the odd digit D1. When this occurs, both the bits for the units position and sign for the word are simultaneously placed on the tape for parallel reading.

From the above, it can be seen that during the transferring of any group of ten words which involve alphabetic data in any one of the digit positions of any of the words, the entire group of words must be transferred under alphabetic conditions. Thus word W0 must be designated as a control word and each digit of the control word must be consecutively interrogated before the delivery of the related data word to detect the presence of an alphabetic character therein. The interrogation determines the translating mode as numeric or alphabetic. If numeric, the transmitted word will have all ten characters of numeric data, if alphabetic, the ten digits in the word in the storage device will eventually reach its designation as a five character word, even though only one of the digit positions involves an alphabetic character.

This entire data transfer operation will occur automatically without further instruction from the calculator program circuitry, assuming, of course, it is so desired. During this transfer the control word W0 remains in the core storage along with the data words until checking and the like are completed and such time as a cancelation instruction is received by the core operating controls. The entire group of words may be transferred as a block from place to place in the manner as predetermined by the programmer.

Assuming now the data stored in the tape 83, Fig. 2a, is requested for delivery to some other location and it is desired to transfer the data to that location through the core buffer storage 87, Fig. 2b. All that is required is for the programmer to initiate the proper instruction to the tape buffer storage controls, after which the transfer from the tape to the core buffer is automatically accomplished.

If merely a numeric block or group of words appear in the storage device, the data is transmitted parallel by bit, serial by digit and by word through the read translator 105 and placed in similar or like positions in the core buffer storage 87. The exception to this is that the sign carried over the units position is translated from the zone code to a numeric value and placed in the digit D0 position for the related word by reading the last tape digit twice, first in the alphabetic mode to read the bits in the A and B zone tracks and a second time in the numeric mode to read the bits in the binary track.

Assuming now that the group of ten words shown in Fig. 9 is to be transferred to the core buffer 87. The programmer initiates the proper instruction through an appropriate operation or OP code. After a suitable delay to permit the tape unit to reach the proper speed, the tape unit 78 reads word W0, Fig. 9, in the numeric mode parallel by bit and serial by digit and directs the same through the read translator 105 wherein a translation from binary coded decimal to biquinary code takes place and the numeric character representations will be placed in word W0 of the core in the order as indicated in Fig. 8.

Since this transfer is taking place under alphanumeric conditions, the delivery of word W1 to the core storage is blocked until digit D2 of the control word W0, now in the core, has been interrogated. Because an 8 appears in the digit D2 position, word W1 must be translated in the alphabetic mode. The first character 7 in word W1 is represented by the binary bits 4, 2 and 1, which bit values are transferred to the read translator. Since the core storage is in the even digit position, D10, and the numeric values are to be stored in the odd digit position, it is necessary to block the delivery of the numeric 7 and insert a 9 in the even digit position as will be hereinafter fully described. At the odd digit time, the binary 7 is transferred to a biquinary 7 (B5 and Q2) and is inserted in the D9 position of word W1. The numeric characters 5, 2 and 3 are transferred and translated in like manner and are placed in D7, D5 and D3 digit positions. Digit positions D8, D6 and D4 are provided with a numeric 9.

As character B is read from the tape, the binary 2 line and the A and B lines provide pulses or bits to be translated. With the core drive in the digit D2 position, the zone tracks A and B are sampled in combination with others to detect the presence of any bits therein. In this example with bits in both zone tracks, the read translator 105 is operative to place a biquinary 6 (B5, Q1) in the even digit position in the core. This same bit information is again sampled, however, the mode of translation changes and with the binary 2 line raised, this is translated as a biquinary 2 (B0, Q2) and a 2 appears in the odd digit position D1. The 6 and 2 in their respective digit positions are indicative of the alphabetic character B.

Since a sign value is not carried by an alphabetic word, a 9 is automatically inserted in the digit D0 position to complete or fill the entire word with numeric data.

After the delivery of word W1, word W2 is blocked until digit D3 is interrogated in a like manner, after which the proper switching is completed to translate in the mode determined by the particular control digit. The remaining words are translated parallel by bit and serial by digit with an interrogation of the control word W0 before the delivery of the next succeeding data word in the manner as described for either word W0 or word W1.

*Description of block diagram*

Referring again to Figs. 2a and 2b, the biquinary coded information is stored in the high speed storage buffer 87 in word groups having ten words of eleven digits each. Information is stored on the tape 83, Fig. 2a, in a modified binary coded decimal in blocks of ten words having a maximum of ten digits each, with the sign placed over the units position. The tape code contains enough combinations to represent all of the desired alphabetic, numeric and special characters.

The write translator 95 which translates from biquinary code into the modified binary code includes the seven data storage latches 111 on the even digit side of the translator, as well as the diode and tube logical switching circuits 112, Figs. 14b and 14c, respectively. The check bit appearing in the C track is arrived at through switching logic or translation means 113, Fig. 14b, and not by counting so that it is still valid in checking the number of bits in the generated tape code character. When translating numeric information, the seven storage latches 111, Fig. 6, are not used. When translating alphabetic information, the even digit is read out of the buffer storage 87 into the seven translator latches 111, then the odd digit is read out of the buffer, transmitted over the odd digit side of the translator and the two outputs are combined at the switching 112 to form the desired character in the tape code.

The read translator 105 for translating from the tape code, Fig. 9, into biquinary code, Figs. 7 and 8, consists of diode and tube logical switching circuits 114, Figs. 13a to 13d. It uses as a storage device the line registers 103 in the synchronizer 80, Fig. 2a, which are set up as a result of readings by the heads 85. For translating numeric information, the lines 104 leading from the line registers 103 are sampled by a pulse supplied over a readout numeric line 115 to condition selected switching of the read translator 105. For translating alphabetic information, the output of the line registers is sampled by a pulse applied over a readout alphanumeric line 116 leading to certain other switching in the read translator to produce the even digit value and then again by the readout numeric line 115 switching to produce the odd digit value for the storage matrix 87.

The control word interrogation latch 108, Fig. 2b, is associated with a word ring 117 and a digit ring 118 which function to set up the read-in and readout circuitry 88 for the core buffer storage 87. Included with the word and digit rings is ring modification switching 119 which is operated between words during an alphanumeric data transfer. When transferring an alphanumeric word group, it is necessary to return to the control word and interrogate the controlling digit for the following data word in order to determine its translating mode. Thus the control word interrogation latch 108 goes On when the digit ring 118 shifts over from digit D0 to D10 by means of the switch 120. It is turned off after the appropriate digit in the control word has been read into the control digit latch 109.

The control digit latch 109 is turned On under the control of a switch 121 extending from the control word interrogation latch 108, if there is an 8 stored in the interrogated digit of the control word. It is turned Off by a capacitor coupled shot when the control word interrogation latch 108 goes On. Operation of the control digit latch 109 is used to control the translating mode latch 110. Switching the translating mode latch 110 controls whether the translators 95 and 105 treat the information being transferred from one unit to the other as a alphabetic or numeric.

The translating mode latch 110 is turned On whenever the information being transferred is to be translated as alphabetic. For all other conditions the translating mode latch is reset to the numeric translating position. When handling a numeric word, the translatnig mode latch is turned On for buffer digit 0 in order to translate digits D0 and D1 together as an alphabetic character. When the control digit latch 109 is on numeric, the outputs of digit D1 and D0 are reversed in order to store digit D0 in the translator latches 111 as an even digit prior to the delivery of digit D1 to obtain the sign over the units position in the tape code.

The outputs of the digit word ring 118 are modified by the control word interrogation latch 108 and the control digit latch 109. When the control word interrogation latch is On, all word ring outputs are held down and the buffer word 0 is brought up. Whatever word is On causes its controlling digit to come On.

Since the tape unit 78, Fig. 2a, runs asynchronously to the synchronizer unit 80, it is necessary to generate timing pulses, some of which are shown in Figs. 18 to 21. Various signals from the synchronizer unit coupled with conditions in the translating chassis govern the initiation of the timing pulses.

The timing pulses are generated by a seires of single shot multivibrators 122, 123, 124, 125 and 126, Fig. 2b, similar to that shown in Fig. 31 or any other suitable type. These single shots are designed to operate on the fall of a pulse. Each succeeding single shot generally is initiated by the fall of the pulse from the preceding single shot. Basically, the timing conditions for the single shots are as follows:

Upon the fall of a control pulse, a 6 micro-second single shot at 122 is initiated. This single shot is used for a timed delay. The fall of this 6 micro-second single shot triggers the following 8 micro-second single shot device 123. The 8 micro-second single shot generates a readout pulse over the readout pulse line 127 which is directed to the translator 105 and the core read-in and readout logic 88. The fall of the latter readout pulse initiates a 2 micro-second delay single shot at 124 and the fall of this delay single triggers a 2 micro-second single shot at 125 which generates a ring advance pulse over the ring advance line 128. This pulse is used to advance the word and digit rings 117 and 118 to the next position.

The fall of the ring advance pulse initiates another 2 micro-second delay single shot at 126. This delay single shot is necessary because the readout pulse under alphabetic conditions reinitiates the train of single shots. Thus it is possible for two of the single shots to be On at the same time.

When reading from the tape 83, Fig. 2a, the information read by the heads 85 is placed into the read registers 102 and then the line registers 103. The output on the line register is sampled by a vertical redundancy check circuit (not shown) and an output appears if there is an odd number of bits present.

When writing from the core buffer 87 into the tape unit, a write echo pulse is generated in the tape drive unit when the information is written on the tape. The output of this pulse over the lines eventually sets up the line registers 103 with the tape information, which is also sampled to test for an odd number of bits. Thus the tape code is given a vertical redundancy check on both reading and writing. Since the checking circuits form no part of the invention, a further detailed description is not deemed necessary.

There are five master latches, 131, 132, 133, 134 and 135, one for each of the operation codes involving translation or data transfer. These latches are designated: Read Numeric, Read Alphanumeric, Write Numeric and Write Alphanumeric, respectively. The Read Check latch 135 is shown in Fig. 12b. These latches are turned On by an appropriate signal from the operation register 93, Fig. 2b, and they are turned Off by the fall of word W9 in the word ring 117 at the end of the transfer operation.

In operation, a Start Numeric signal initiated in the operation register 93 in the calculator 77 picks up the Write Numeric latch 133, Fig. 2a. The Write Numeric latch remains up for the duration of the operation and is reset by a signal over conductor 136 when word W9 goes Off. The Write Numeric latch output extends over a line 137, through a diode mix 138 and initiates a write call signal over a line 139 to the synchronizer 80. This line is also connected to a diode mix 130 whose output extends over a line 140 for conditioning a diode switch 141 associated with a reset on read-write master line 142.

The write call signal on the line 139 feeds through a diode mix 129 to start the tape drive unit 78, including the capstan motor 82. This signal is also fed to a read-write single shot delay device 143 to provide a negative-going pulse over a read-write delay line 144 and operates from the diode switch 141 and the reset master line 142 to reset the rings 117 and 118, Fig. 26, to their word W0 and digit D10 positions. The positive value on the read-write delay line 144 is up for a length of time sufficient to allow the tape drive to come up to speed and its fall initiates the single shot operation in the single shot device 122, Fig. 2b.

The output of the single shot 122 is used to reset the buffer latches in the box 88 over the line 145. The fall of this line triggers the following single shot 123 which generates an 8 micro-second pulse over the readout line 127. This pulse initiates the drive to the buffer storage 87 to read out the information in word W0, digit D10 for storage in the buffer or sense latches 146, Fig. 12h, which are disposed in the box 88, Fig. 2b.

As the translating mode latch 110 is turned to numeric translation, the numeric translating line 147 leading through a diode mix 149 to the numeric translating or odd digits line 148 allows the write translator 95 to translate the output of the buffer latches 146 extending over the lines 94 into the tape code in a numeric translation.

At the end of the read-write delay a timing clock 150, Fig. 2a, in the synchronizer 80 starts to run. This clock is a crystal controlled ring which is started by an operation of a diode switch 168 and runs continuously during a write operation and operates by tape information during a read operation. This feeds to a write pulse generator 151 to apply a write pulse over the write pulse line 152 and provides a twelve micro-second pulse every sixty-seven micro-seconds. The write pulse samples the output of the translator 95 at the write triggers 99 and causes the heads 85 to write on the tape 83. At the end of the write pulse, the bits written give write echo pulses which set up the triggers in the read register 102 corresponding to the bits written. The read register triggers are reset by the clock 150 in any suitable manner and are up for a duration of sixteen micro-seconds. When the read register 102 is reset, it turns On corresponding triggers in the line register 103. The line register triggers are On for approximately sixty micro-seconds, and the outputs are given a vertical redundancy check.

The fall of the write pulse over the write pulse line 152 fires a 2 micro-second single shot 153, Fig. 2b, whose fall causes the triggering of the 6 micro-second single shot 122. The output pulse of this single shot also extends over a line 160 to reset the translator latches 111 and condition the same for new information to be read in from the storage device 87. The fall of single shot 123 initiates a readout pulse over the line 127 and causes the buffer storage 87 to read out the next character. The end of the readout pulse initiates operation of the 2 micro-second delay single shot 124 whose fall in turn initiates, through the single shot 125, a 2 micro-second pulse over the ring advance line 128 which is switched with a control word interrogation Off line 154 to provide a pulse to advance the digit ring 118.

The information read out of the core buffer 87 by the readout pulse passes through the write translator 95 and the information is presented for recording on the tape 83 Fig. 2a, at the next write pulse time. This same operation repeats each time the write pulse comes up.

A start Write Alphanumeric pulse from the calculator sets the master latch 134 and starts the tape unit in the same manner as Write Numeric. On a Write Alphanumeric operation the first word is handled as a numeric word as explained in the above Write Numeric operation.

Figure 5:
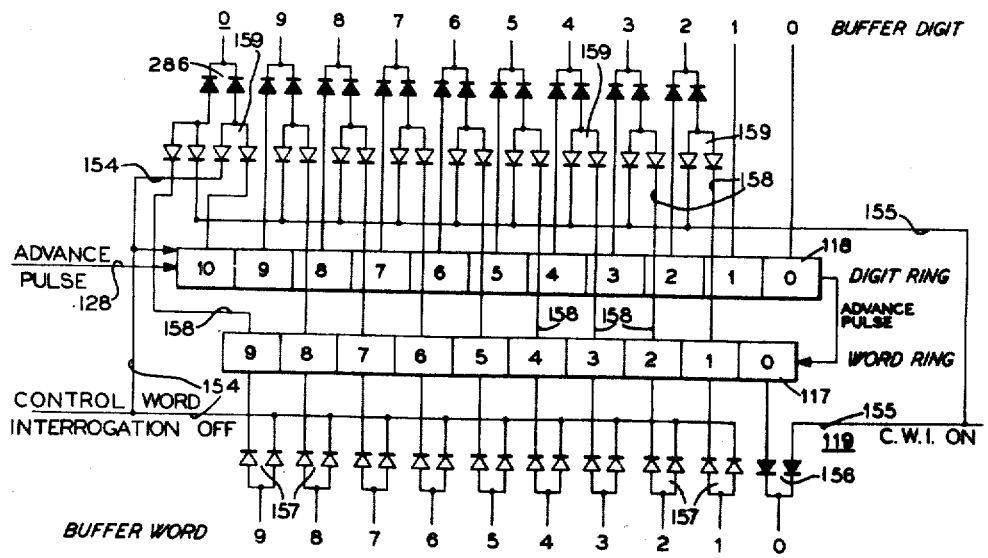
Fig. 5 is a block diagram of the digit and word rings, shown in Figs. 2a and Figs. 12d, 12e, 12l, and 12m, for driving the core storage matrix with the improved control word interrogation means applied thereto.

Referring now to Fig. 5, at the end of word W1 the next ring advance pulse advances the word ring 117 and turns On digit 10 of the digit ring 118. When buffer digit 10 goes On, it combines with the Write Alphanumeric lines 170 at the switch 120, Fig. 2b, and turns the control word interrogation latch On to raise the line 155 and drop the line 154. Control word interrogation On line 155 mixes with word ring W0 at the diode mix 156 and brings up buffer word W0. Because the control word interrogation Off side of the latch 108 is down, it blanks out or cuts off all other buffer word lines at the diode switches 157. Whatever word ring position is On extends over a related line 158, switches with control word interrogation On line 155 and brings up the buffer control digit number corresponding to the related word ring. Thus if we are about to write word 3, digit D4 of word W0 is interrogated by means of a related conductor 158 and switch 159 to determine the mode of translation for that word.

The next write pulse over the line 152, Fig. 2a, will start the single shots operating as previously described. The readout pulse will cause the appropriate digit in a control word to read out and, if the proper values appear, the control digit latch 109 turns On. The fall of the readout pulse will trigger the advance ring single shots. However, since the control word interrogation latch 108 is On, the ring advance pulse blocks the digit ring advance. The fall of the readout pulse also switches with the write and control word interrogation latch to reinitiate the single shots. If the control digit latch 109 was not turned On, the next word is treated in the numeric mode. If the control digit latch was turned On, it in turn will switch the translating mode latch 110 to alphanumeric translating. Thus the information read out of the buffer storage even digit positions will be conducted over the lines 94 and entered into the translator latches 111 through the switch 96 because the alphanumeric translating and even digits line 161 is now up.

Next the odd digits in the buffer will be read out over the lines 94 by the readout pulse extended through the proper diode switches 97 and mixed with the even digits stored in the write translator latches 111. The translator output will be written on the tape 83, Fig. 2a, by the next write pulse extending over the line 152 to the write triggers 99. The remainder of the alphabetic word will be translated in a similar manner with the even digits being stored in the translator latches 111 and the odd digits mixing with the stored even digits to produce the modified alphabetic character.

A start Read Numeric pulse from the calculator turns On the Read Numeric latch 131. The output of the Read Numeric latch extends over a line 162 and mixes at 163 to raise a read call line 164. The read call line 164 starts the tape unit running and energizes the read-write delay mechanism 143. The read-write delay pulse on the line 144 is used as before to reset the rings 117 and 118 to word 0, digit D10. As the bits on the tape are read, they turn On the read register triggers 102 over the lines 101. The first bits read act through a diode switch 166 start a character gate generator 165 running to provide a thirty-three micro-second pulse over the character gate line 167. When the character gate falls, the read register 102 triggers are turned Off which in turn causes the corresponding line register triggers 103 to come On. The character gate is switched to the single short 122, Fig. 2b, at the diode mix generally indicated at 169 and its fall starts the single shot running. As before, the 6 micro-second delay single shot fall initiates a readout pulse over the line 127.

Because the word ring is on word W0, the translating mode latch 110 is on numeric translation. The readout pulse switches with the odd digit or numeric line 148 in a diode switch 173 to apply a readout tape numeric pulse over the line 115. This pulse enters the read translator 105 and conditions it to translate the information in the line registers 103 in a numeric mode. The fall of the readout pulse initiates the single shots which cause the digit ring 118 to advance. This same operation will proceed until digit D0 is turned On. Buffer digit D0 turns the translating mode latch 110 to alphatranslating. The next readout pulse will cause the line register information to be read out in an alphabetic mode. The even digit and alphanumeric translating lines 175 and 176, respectively, switch at the diode switch 177 to raise the even digit and alphanumeric line 161, which switches with the readout pulse at the diode switch 179 to provide a readout alphanumeric translating pulse over the line 116 to the read translator. When the readout pulse falls, the single shots are retriggered and during the 6 micro-second delay, the digit ring 118 is advanced and the next readout pulse causes the line registers 103, Fig. 2a, to be sampled by a numeric translation. All following words are considered numeric and are translated the same as the control word into the high speed buffer storage 87.

On a Read Alphanumeric operation the start Read Alphanumeric pulse from the calculator turns On the Read Alphanumeric latch 132. The output of this latch extends over line 174 and brings up the read call line 164, in the previously-described manner to initiate the transfer operation.

As before, the first word off the tape is the control word and is translated in the numeric mode. At the end of word W1, the last character off the tape is broken into digits D0 and D1 for the biquinary code. Thus the last character is read out twice. With buffer digit D0 On, the readout pulse and read line are switched and combined with the buffer digit D0 to cause the single shot operation to repeat for the third time, as will be hereinafter more fully described. During the 6 micro-second pulse, the ring advance pulse will drive the digit ring from digit D0 to digit D10 and will turn On the control word interrogation latch 108, Fig. 2b. Control word interrogation On will block the word and digit ring outputs and force buffer word W0 to come On and the controlling digit for the next word to be interrogated.

The next readout pulse will cause the control information to be read through the connections 178 and switch 121 into the control digit latch 109, turning it On if an 8 is present in the control digit position.

If the control digit latch 109 is turned On, the output of the control digit alphabetic will turn On the translating mode latch 110 and drive the alphatranslating line 176 up. The alphabetic word will be read off the tape with each character being read out twice to generate two biquinary digits and the ring will run from digit D10 to digit D1 with digit D0 being ignored.

A read check operation is used to give the information previously written on the tape a vertical redundancy check. This assures that the bits, that were put on the tape in a write operation, are actually recorded. The core buffer is not used on this operation. A start read check pulse from the calculator turns On the read check latch 135, Fig. 12b, which in turn initiates a read call signal over the line 164 to start the tape unit. The operation proceeds as a normal read operation using the character gate 165 to run the timing single shots. However, no information is put into the cores.

Detail circuitry—control means

The foregoing generally outlines the basic elements and operation of the apparatus to perform the various transfer and translating operations. The means or various control circuitry for accomplishing the desired operation is shown in more detail in Figs. 12a to 12m, 13a to 13d and 14a to 14c.

Referring first to Figs. 12a to 12m, there is shown the master latches 131 to 135, inclusive, Fig. 12b, indicated as Read Numeric, Read Alphanumeric, Write Numeric, Write Alphanumeric and Read Check, respectively, which are selectively turned On by a program instruction from the program register 93, Fig. 2b. These instructions are selectively applied over the operation register biquinary units lines Q0 to Q4, Fig. 12a, biquinary tens lines B5 to B0, and the units lines B5 and B0, along with a heat operation value applied to the terminal 181. These biquinary terminals are connected to like terminals appearing in Fig. 13p of the above F. E. Hamilton et al. application, Serial No. 544,520. The calculator instruction is timed by a heat operation pulse which is up for the half cycle when operated and down when the calculator is looking for the next instruction. The heat operation terminal 181 is electrically connected to the On side of latch 372, shown in Fig. 13h of the above F. E. Hamilton et al. application.

The above operation codes for the master latches are selectively applied in biquinary code to the above terminals and are interpreted as a 50, 51, 52, 53 or 58 operation code. The particular combination of biquinary values are selectively wired to the groups of switches or "and" circuits generally indicated at 182. Four of these switches are utilized to operate load and store latches (not shown) for transferring data from the calculator into the storage device. The output of five of the switches are selectively connected to the input side of one of the above-mentioned master latches. Each of these master latches, Fig. 12b, includes a diode mix or "or" circuit 183, a double inverter 184 and a cathode follower 185.

In operation, if any one of the input lines is pulsed positive, this positive pulse extends through its related mix 183 to the double inverter 184 which applies a positive value to the cathode follower 185, the positive output of which is applied back to the diode mix 183 over the conductor 186 to maintain the latch On or conducting. This condition remains until the latch is turned Off or to its nonconducting state by a positive reset pulse applied either from the calculator over a terminal 187 or by the fall of buffer word W9 in the word ring 117, Fig. 12e. The fall of buffer word W9 drives through an inverter 188 to raise the line 136. Both connections feed through a diode mix 180, Fig. 12b, to a double inverter 189 to apply a positive value over a common reset line 190, parallel connected to the master latch double inverters.

Write numeric

Assuming a Write Numeric operation has been transmitted from the program register circuitry 93, Fig. 2b, this is applied over the biquinary lines as operation code 52, Fig. 12a, and turns the Write Numeric latch 133 On, Fig. 12b. The positive output from the cathode follower extends over the Write Numeric line 137 through the mix 138 and related cathode follower to raise the write call line 139. As this occurs, the positive value is transmitted through the mix 130 and cathode follower and sends a positive signal over the conductor 140, Fig. 12c, and from the restart calculator terminal 192 to the mix 385 in Fig. 13h of the above F. E. Hamilton application to permit the calculator to start its next operation.

With the read-write delay line 144 up, Figs. 2a, and 2b, the now conditioned ring reset switch 141, Fig. 12c, goes positive. This value passes through a related cathode follower and extends over the reset on read-write master line 142 to a terminal 191, Fig. 12d, which divides over a line 193. One side of this line extends to a diode mix 208 leading to digit latch D10 in the digit ring 118 and the other side leads to a diode mix 209 connected by means of a conductor 207 to the input of a double inverter 210 formed as part of the latch circuit for word W0, Figs. 12d and 12e. This sets up the output for buffer word W0 and at the same time turns the word W0 latch On through a diode switch 211 in a manner to be hereinafter described.

At the same time, an inverter 212, Fig. 12c, connected to the line 142 drives the output of its related cathode follower down which opens associated diode switches 213 and 214 leading to the word ring advance and reset, and digit ring advance and reset conductors or lines 215 and 216, respectively. When the inverter 212 is conducting to cut off the switches 213 and 214, a relatively long negative pulse is applied over both lines to parallel diode ring digit and word switches 217 and 218, respectively, Figs. 12d, 12e, 12l and 12m, to reset both the word and digit rings 117 and 118 to their respective W0 and D10 positions. The write line 139 also conditions, among others, one point each in diode switches 194, Fig. 12j, 219 and 221, Fig. 12b, associated with the timing circuitry.

The positive signal appearing on the write call line 139 initiates operation of the read-write delay single shot 143, Fig. 2a, and extends through the diode mix 129 to initiate operation of the capstan motor 82 in the proper direction. In this application, the read-write delay 143 is so constructed as to hold positive, for approximately ten milliseconds, the line 144 leading to a diode switch 194, Fig. 12j, which is in series with mixes 237 and 196 connected in series by a conductor 238 to the input side of a double inverter 197, Fig. 12k, in the timing circuit. This read-write delay pulse is up for a time sufficient to allow the tape drive to come up for speed.

At the end of a predetermined time delay, the read-write delay line 144 falls and acts through the condenser 200 to initiate the single shots beginning at the 6 microsecond unit 122. The double inverter 197 and the condenser 200 placed ahead of the 6 micro-second single shot 122 assures that the duration of the output is independent of the amplitude of the input pulse from mix 196, Fig. 12j. The output of the 6 micro-second single shot 122, Fig. 12k, passes through a cathode follower over the line 145 to a second series cathode follower 204 leading to a diode switch 198 which is now conditioned by the positive write line 139. Thus the single shot pulse is reflected over a connected reset buffer latch line 199 having an output terminal 201 connected to a reset buffer latch conductor 202, Fig. 12h, which drives through a diode mix 205 to reset the buffer or sense latches 146 at the output side of the core storage 87, Fig. 12g, as will be hereinafter described.

The fall of the 6 micro-second single shot 122, Fig. 12k, generates an 8 micro-second readout pulse which extends from the output of the single shot 123 over the readout pulse line 127. This readout pulse line extends to various parts of the control circuitry including a diode mix 222, Fig. 12f, for initiating operation of a 2 micro-second readout single shot assembly 223. This latter readout pulse is applied over a conductor 224 and through a cathode follower 328 and a readout line 329 to buffer word W0 read-in and buffer digit D10, to cause readout into the sense latches 146, Fig. 12h, as will be hereinafter described. The fall of this latter readout pulse on the line 224 initiates a second 2 micro-second single shot 225, causing a read-in pulse. This pulse puts the digit now in the sense latches 146, Fig. 12h, back into the core storage 87.

Since the Write Numeric line 137 is positive, this positive value passes through a diode mix 226, Fig. 12i, to a diode switch 227 whose other side has been conditioned by a positive value applied to the buffer digit D10 terminal from the buffer digit D10 terminal, Fig. 12e. With positive coincidence at the switch 227, a positive value is applied through the diode mix 228 to a single inverter 220, passes from the related cathode follower as a negative pulse to drive the alphatranslating line 176 negative and to a diode mix 229 and inverter 230 which applies a positive value to the numeric translating line 147. Such action switches the double latch, which comprises the translating mode latch 110, to its On or numeric translating position. The positive value on the numeric translating line 147 extends to and conditions one point of a diode switch 233, Fig. 14a, associated with the translate numeric information line 234 in the write translator 95, as will be hereinafter explained.

At the end of the read-write delay, the timing clock 150, Fig. 2a, in the synchronizer starts to run and drives the write pulse device 151 to generate and deliver an 8.4 micro-second write pulse every sixty-seven micro-seconds over the line 152. This write pulse samples the output of the write translator 95 at the write triggers 99 and causes the writing of the data on the tape 83. The fall of the write pulse applied to the write pulse line 152, Fig. 12j, causes the triggering of the 2 micro-second single shot 153 which extends over a line 235 through the diode mix 237, line 238 and the mix 196 to the input of the double inverter 197, Fig. 12k, to cause the firing of the 6 micro-second single shot 122 when single shot 153, Fig. 12j, falls. The output from this single shot pulses the line 199 and resets the buffer latches 146, Fig. 12h, to allow new information to be read in. Also the single shot 153, Fig. 12j applies a pulse through the cathode follower 236 to the translator reset line 160 which is commoned with the even digit latches 111, Figs. 14a and 14b, in the write translator.

The fall of the 6 micro-second single shot 122, Fig. 12k, over line 145 initiates a readout pulse in the 8 micro-second single shot 123 whose output is applied over the readout pulse conductor 127 and diode mix leading to the single shot 223, Fig. 12f, in the core storage read-in and readout circuitry 88. The readout pulse on the line 127 also drives through a double inverter 231 and condenser 232 to initiate the 2 micro-second delay in the single shot 124, Fig. 12k, and its output drives over a conductor 239 to the second 2 micro-second single shot device 125 to apply a pulse over the ring advance line 123. This ring advance line leads to a diode switch 242, Fig. 12c, and when coincidence occurs with the word interrogation Off line 154, a pulse passes through a diode mix 243, inverter and cathode follower combination 241 to drive the advance digit ring line 244 negative. This negative-going pulse is applied over the line 244 to turn Off the digit latch D10, Fig. 12d, when either of the connected diode switches 246 and 247 are conditioned. Also this negative pulse operates through the diode switch 214, Fig. 12c, line 216 and switches 217 to advance the digit ring 118, Figs. 12d and 12l, through the digit ring latches 206 from digit to digit.

The means for initiating the advance of the digit ring latches 206 includes a conductor 240 which is connected between adjacent double inverters 245. Thus as the first latch turns Off, a negative-going pulse is directed over its related conductor 240 to turn On the next latch by raising its associated feed-back line 248 which is connected between the related diode switch 217 and output of its cathode follower. Thus as the short negative-going pulse turns Off the On digit latch, the negative pulse over the associated line 240 turns On the next latch and is so timed as to have the related feed-back line 248 up when the digit ring advance line 216 returns positive. This is standard latch operation. Both the digit and word rings 118 and 117, respectively, are identical in construction and are advanced in the same manner. However, the word ring latches 250 are advanced by the word ring advance pulses applied over the conductor 215.

As the digit ring latches 206 are advanced, the information is read out of the core buffer storage 87, Fig. 12g, under the control of the readout pulses, passes through the write translator 95, Fig. 2b, in a manner to be hereinafter described, and is presented to the triggers 99, Fig. 2a, which record this data on the tape 83 at the next write pulse time.

This same operation repeats each time the write pulse comes up on the line 152. Thus the digit ring 118 will advance from D10, Fig. 12d, for each digit ring advance and write pulse until digit ring D1 comes On, Fig. 12l.

Since the control digit latch 109, Fig. 12i, is normally resting with its control digit numeric line 249 On, this positive value extends over the line through the diode mix 226 to the switch 256. In addition, the positive value on the line 249 joins with the ring digit D1 line 251 at the diode switch 252, Fig. 12m. This results in a positive pulse applied through a diode mix 253 to bring up buffer digit line or terminal D0. As buffer digit D0 comes up, this positive pulse is applied to the buffer digit D0 terminal 254, Fig. 12i, and extends over the line 255 to a diode switch 256 to drive through the related diode mix 229. This positive value is effective to turn or reverse switch the translating mode latch 110 from its normal numeric translating to the alphatranslating position. Thus the alphatranslating line 176 goes positive and the numeric line 147 negative and is held in that condition by cross-connecting the line outputs through the diode mix inputs 228 and 229 in the usual manner.

When the next write pulse is applied to the timing means, it starts the output of the 6 micro-second single shot 122, Fig. 12k, through the use of the single shot 153, Fig. 12j, and the output at line 145 switches with the write line 139 through the diode switch 198 and cathode follower to reset the buffer or sense latches 146, Fig. 12h.

As the write pulse falls, it causes the 2 micro-second single shot 153, Fig. 12j, to drive over the line 160 and reset the translator latches 111, Fig. 14a. With buffer digit line D0 up, Fig. 12m, and the translating mode latch 110, Fig. 12i, in the alphatranslating mode, coincidence positive values are applied to the diode switch 177, Fig. 12j, because the alphatranslating, control word interrogation Off and the even digit lines 176, 154 and 175, respectively, are up. This drives to raise the alphatranslating and even digits line 161, Fig. 14a, and conditions the common side of the diode switches 96 leading to the input side of the latches 111. As the 8 micro-second single shot 123, Fig. 12k, delivers its readout pulse over the line 127 to the readout diode mix 222, Fig. 12f, it starts a readout core operation. The data coming from the high speed core storage buffer 87, Fig. 12g, by the readout pulse is applied to the appropriate biquinary terminals, Fig. 12h, to the similarly marked terminals, Fig. 14a, passes through the proper switches 96 and is stored in the translator latches 111.

The readout pulse is also applied over the readout pulse line 127 to the diode switch 219, Fig. 12b, which is now conditioned with the positive write and odd digit lines 139 and 148, respectively, to produce an output over the line 258 extending to a second diode switch 259, Fig. 12j. This switch is conditioned by ring digit D0 being On and its output passes through the diode mixes 195 and 196, Fig. 12j, to again retrigger the 6 micro-second single shot 122, Fig. 12k.

Figure 12M:
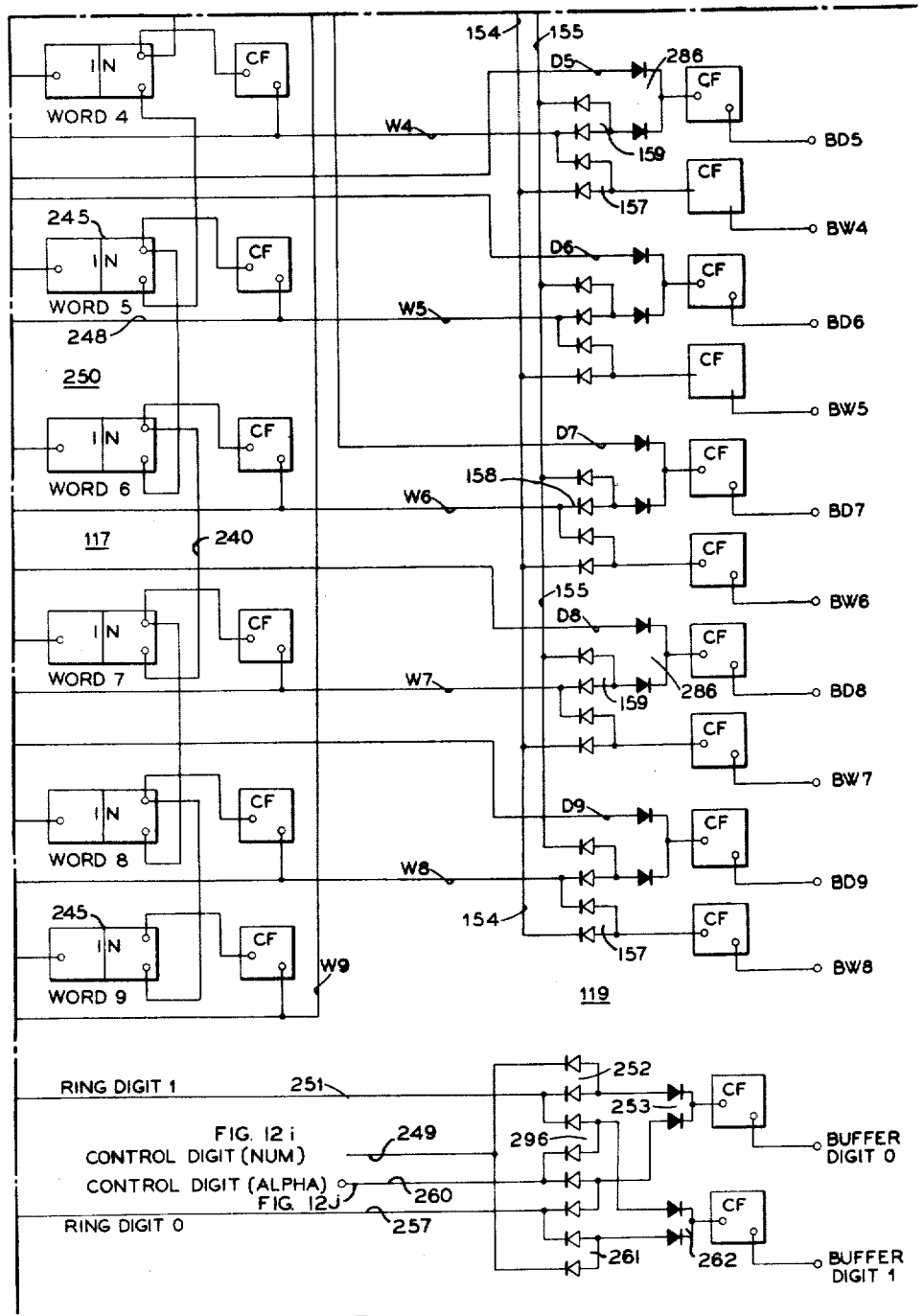

While the above single shot is still up, the buffer latches 146, Fig. 12h, are again reset over the conductor 199 and a 2 micro-second single shot advances over the line 128, switch 242, Fig. 12c, line 244, switch 214 and line 216 to shift the ring to its digit D0 position, Fig. 12l, and bring up buffer digit D1, Fig. 12m. This is accomplished by switching the ring digit D0, line 257 with the control digit alphaline 260 at the diode switch 261 whose output passes through a diode mix 262 to raise the buffer digit D1 line. This ring advance pulse originates at the 2 micro-second single shot 125, Fig. 12k, which value is directed over the conductor 264 to the diode switch 265, Fig. 12j, now conditioned by the buffer digit D0, control digit alphalines and write lines. The output from this switch 265 extends over the conductor 239 leading to the single shot 125.

When buffer digit D1 comes up, this pulse is applied to a diode switch 263, Fig. 12i, which has been conditioned by the Write Numeric lines 137 passing through the diode mix 226. The resultant pulse passes thorugh the diode mix 228 to reset the translating mode latch 110 to numeric translation by driving the numeric translating line 147 positive and the alpha translating line 176 negative. This again conditions the numeric translating line 147 which feeds through the mix 149, Fig. 12a, and cathode follower to the numeric translating and odd digit line 148. This line conditions the odd digit side of the translator 95 at the diode switches 97, Fig. 14h, so that the data is now gated therethrough. The two digits, even and odd, supplied to the write translator are stored and translated for writing on the tape 83 in the modified binary code as will be hereinafter described.

Following the second readout pulse after a 2 microsecond delay, the ring advance single shot 125, Fig. 12k, will be again triggered through the 2 micro-second single shot to advance the digit ring 118 from digit D0, Fig. 121, to digit D10, Fig. 12d, and advance the word ring 117, Fig. 12c, to the next word. The advancing of the word ring 117 occurs by applying the positive pulse from the digit D0 line 257, Fig. 12l, to a double inverter 268, Fig. 12c, and condenser in series with a 2 microsecond delay single shot 269, the output of which is connected to the advance word ring line 271 and applies a negative-going pulse to provide the ring word advance, Figs. 12d and 12e, in the same manner as the digit ring 118 was advanced. The word ring advance and reset line 215, connected with words W1 to W9 is negatively pulsed at the switch 213, Fig. 12c.

There is shown in Fig. 12a a plurality of odd buffer digit terminals 1, 3, 5, 7 and 9. These are connected to the similarly marked buffer digit terminals in Fig. 12e and 12m. Lines extending from the above odd buffer digit terminals pass through a diode mix 272, Fig. 12a, and cathode follower leading to the odd digit line 171 which is up on each odd digit to feed through the diode mix 149 along with the numeric translating line 147 to establish the previously-mentioned numeric translating and odd digit line 148. In addition the odd digit line 171 feeds to an inverter 273 to provide the even digit line 175 which is driven up when the odd digit line 171 is down.

*Write alphanumeric operation*

A start Write Alphanumeric pulse occurring as an operation code 53 over one of the switches 182, Fig. 12a, turns on the Write Alphanumeric latch 134, Fig. 12b, and brings up the Write Alphanumeric line 274 along with the write line 139 which is connected thereto through the diode mix 138. On a Write Alphanumeric operation, the first word is handled as a numeric word, as previously explained.

At the end of word W0, the next ring advance pulse applied over the line 271 advances the word ring 117, Figs. 12d and 12e, and turns On ring digit D10 of the digit ring 118. When buffer digit D10 goes On, this positive value is applied to the diode switch 120, Fig. 12c, along with the positive Write Alphanumeric value applied over the Write Alphanumeric line 274 through the diode mix 276 and turns the control word interrogation latch 108 On by means of a capacity coupled cathode follower 277 having a line 278 connected to the input of an inverter and cathode follower combination 279 which drops the Off control word interrogation line 154 and brings up the On control word interrogation line 155 by means of cross-connecting with a diode mix 281, inverter and cathode follower combination 282.

The fall of the Off interrogation line 154 is reflected over an inverter 270, Fig. 121, leading to a capacity coupled cathode follower 275, which directs a positive-going pulse through the diode mix 280 and inverter 290 to turn the control digit latch 109 Off. That is, the control digit alphaline 260 is driven negative while the control digit numeric line 249 is driven positive.

The now positive On control word interrogation line 155 mixes with word ring W0 and brings up the buffer word W0 line at the diode mix 156, Fig. 12e. Because the Off control word interrogation line 154 of the latch is down and is connected to one side of alternate pairs of the diode switches 157 formed as part of the ring modification means 119 for words W1 to W9, it blocks out all other buffer words shown in Figs. 12e and 12m.

As shown, whatever word ring position is turned On, it switches with the On control word interrogation line 155 and the remaining diode switches 159 and brings up the particular control buffer digit number or line for the related word ring as set forth in Fig. 5. Thus, for example, assuming word W1 has been transferred to the translator 95, before writing the next word W2, digit D3 of word W0 must be interrogated to determine the mode of translation for the word.

This is accomplished at the time of the word ring advance by driving the buffer word line W0 positive at the mix 156, Fig. 12c, by the On control word interrogation line 155. With word W2 latch 250 now turned On, this switches with the positive value on the On control word interrogation line 155 at the related switch 159 passes through the associated diode mix 286 and drives buffer digit D3 positive. Thus buffer word W0 and buffer digit D3 are ready for interrogation, and their outputs directed over their respective lines to read out the translation mode stored in their related core positions which is transferred to the sense latches 146, Fig. 12h, as will be hereinafter described.

As the next write pulse is delivered to the single shots, Fig. 12k, the readout pulse will cause the appropriate digit in the control word to read out. If biquinary digits B5 and Q3 come up, the diode switch 121, Fig. 12i, which is also connected to the On control word interrogation line 155, results in conduction through a diode mix 287, inverter and cathode follower combination 288 to switch the control digit latch 109 to its control digit alphaposition and apply a positive value over the control digit alphabetic line 260. The ring advance pulse on the line 128 to the advance ring digit line 244 is blocked at the switch 242, Fig. 12c, because the Off control word interrogation line 154 is down. The fall of the readout pulse on the line 127 is switched in a diode switch 291, Fig. 12j, with the write and On control word interrogation lines 139 and 155, respectively, which directs a negative-going pulse over a line 292 and diode mixes 237 and 196 to the double inverter 197, Fig. 12k, to restart the signal shots.

If the control digit latch 109, Fig. 12i, remained Off, the next word is treated in the numeric mode. If, however, the control digit latch was turned On, it drives over the control digit alphaline 260 and diode mix 229 and will switch the translating mode latch 110, to bring up the alphatranslating line 176. This means that information read out of the core 87 into the translator 95 on even digit positions is gated into the latches 111, Fig. 14a, due to the alphatranslating and even digits line 161 being up. The output of the diode switch 221, Fig. 12b, associated with the alphatranslating, even digit, write and readout pulse lines 176, 175, 139 and 127, respectively, initiates the single shot over the line 266 and diode mixes 195 and 196, Fig. 12j, in a similar manner. The 6 micro-second delay pulse will reset the buffer latches 146, Fig. 12h, after each operation. The odd digits in the buffer will now be read out by the readout pulse and mixed with the even digits stored in the translator 95 and written on the tape as hereinafter described.

The control word interrogation latch 108, Fig. 12c, is turned Off by the 2 micro-second single shot 126, Fig. 12k, applied over the line 264 to a diode switch 294 whose other side is connected to the reset buffer latch line 199. This switch 294 feeds over a conductor 295 through the diode mix 281, Fig. 12c, to the inverter 282 to raise the interrogation Off line 155. Since the word is being translated in the alphabetic mode, each pair of digits will be handled in a similar manner with the even digits being stored in the translator latches 111, Fig. 14a, and the odd digits mixing with the stored digits in the switching 112, Fig. 14c, to produce a modified binary code output. In alphabetic translating when the digit ring 118, Fig. 12l, advances to digit D1, the control digit alphabetic line 260 is switched at the switch 296, Fig. 12m, with the ring digit D1 line 251 and this action feeds through the diode mix 262 to automatically advance to buffer digit D1, by-passing buffer digit D0. This is because the sign in the high speed core appearing in digit D0 position is disregarded in an alphabetic translation.

As ring digit D0 turns Off and advances the word ring, after a 2 micro-second delay, the digit ring D10 is reset and the delivery of the On word ring is blocked by the Off interrogation line 154, at the switching 157, Figs. 12e and 12m, until the controlling digit for that word is interrogated by operation of the associated switching 159. Upon the determination of the presence or absence of a biquinary 8 in the controlling digit, the next word is translated in the alphabetic or numeric mode. The skip of ring digit D0 is provided by coincidence of the buffer D0, write, control digit alphalines 139 and 260, respectively, along with the pulse from the single shot 126 over the line 264, Fig. 12k, which is applied to the skip ring switch 265, Fig. 25j. This acts over the line 239 to start a second pulse through the single shot 125.

*Read numeric operations*

A start read operation delivered from the calculator as an operation 50 code switches at 182, Fig. 12a, to turn On the Read Numeric latch 131, Fig. 12b. This brings up the Read Numeric line 162 which continues through the diode mix 163 to send out a read call over the line 164 to start the tape unit 78 and at the same time it continues through a diode mix 298 over a read line 297 and the mix 130 to direct a positive value over the terminal 192, Fig. 12c, to restart the calculator.

The output from the mix 130 also provides a positive value to the switch 141, Fig. 12c, leading to the reset on read-write master terminal 191, Fig. 12d, to reset the word and digit rings 117 and 118, Figs. 12d, 12e, 12l and 12m, to their respective digit D10 and word W0 positions in the previously-described manner. The read call pulse on the line 164 is directed to start the tape capstan motor 82, Fig. 2a, and initiate operation in the read-write delay switching 143. After a 4 millisecond delay, the tape 83 is up to its proper speed and the bits thereon are read therefrom pass through the amplifier 100 and turn On the appropriate read register triggers 102.

The first bit read in the tape passes through a diode switch 166 and starts the character gate trigger mechanism 165 which provides a positive pulse over the character gate line 167, lasting for approximately thirty-three micro-seconds. When the character gate line 167 falls, the read register triggers 102 are turned Off, which in turn causes the corresponding line register triggers 103 to turn On.

In this instance, the first word off the tape 83 is treated as a numeric word. The character gate and read lines 167 and 297 lead to a diode switch 301, Fig. 12j, and the fall of the character gate line 167 provides a negative-going pulse over the line 302 leading to the series "or" circuits or mixes 195 and 196 which are connected to the input of the double inverter 197 leading to the 6 micro-second single shot 122, Fig. 12k. This starts the single shot operation as before. The fall of the 6 micro-second delay single shot initiates the readout pulses over the line 127 which are repetitively applied to the other single shots in the circuit to pulse the ring advance line 128 to advance the rigit ring 118, Figs. 12d and 12l, digit by digit.

Because the word ring is on word W0, the translating mode latch 110, Fig. 12i, is on numeric translation, that is, the numeric translating line 147, connected to the diode mix 149, Fig. 12a, is up and the alphatranslating line 176 is down. The readout pulse passing over the line 127 switches at the diode switch 173, Fig. 12b, with read, Off control word interrogation and odd digit or numeric translating lines 297, 154 and 148, respectively, to cause a readout tape numeric pulse over the line 115. This pulse enters the read translator, Fig. 13c, on the line 115 and conditions it to translate the information in the line registers 103 in a numeric mode when delivered over the binary coded decimal lines 104, Fig. 13a. The fall of the readout pulse initiates the single shots to advance the digit ring over the digit advance pulse line 128, Fig. 12c, and this same operation proceeds until digit ring D1 is turned On.

As digit ring D1 turns On, this positive pulse isapplied through the diode switch 252, Fig. 12m, to the buffer digit D0 terminal 254, Fig. 12i, and line 255 of the diode switch 256 and continues therethrough because the Read Numeric line 162 at the mix 226 is up. This positive-going pulse flips the translating mode latch 110 into its alphatranslating position and brings the alphatranslating line 176 to its positive condition. The next readout pulse will cause the line register information to be read out of the read translator binary lines 106, Fig. 13d, in an alphabetic mode and placed in the buffer digit D0 position because readout pulse is also switched at the diode switch 179, Fig. 12b, with the read, even digit and alphatranslating lines 297, 175 and 176, respectively, to condition the readout tape alphatranslating line 116 leading to the read translator 105, Fig. 13c. When the readout pulse falls, the single shots are retriggered and during the 6 micro-second delay, the digit ring 118 is advanced to digit ring D0 to raise buffer digit D1 through the switch 261, Fig. 12m, which drives through the diode switch 263, Fig. 12i, to return the translating mode latch 110 to its numeric translating mode by raising the line 147. At the same time the readout tape numeric line 115 and digit ring D0 line 257 drive through a diode switch 300, Fig. 12j, to reinitiate the single shots through the diode switches 195 and 196. The next readout pulse causes the information in the binary coded decimal lines 104 to be again sampled by a numeric translation provided by the now positive line 115, Fig. 13c, which is conditioned by the switch 173, Fig. 12b. All following words in the group are considered numeric and are translated the same as the control word into the core storage or buffer device 87, Fig. 12g.

Read alphanumeric operation

On a Read Alphanumeric operation a biquinary 51 operation code is delivered to the switch array 182, Fig. 12a, which turns the Read Alphanumeric latch 132 On, Fig. 12b, and brings up the Read Alphanumeric and read lines 174 and 297, respectively. The calculator is restarted in the manner previously described. After the 4 millisecond delay, the first word is translated and placed in the core storage in the numeric mode as enumerated above.

At the end of word W0, the last character off the tape is scanned twice while it is on the binary input lines 104 in the read translator 105, Figs. 13a and 13b, and broken into digit D0 and D1 for the biquinary code. That is, the last character is read out twice because the digit ring and the Read Alphanumeric lines D0 and 174, respectively, condition the switch 303, Fig. 12j, which feeds through diode mixes 195 and 196 to cause the single shot operation to restart for the third time. At the same time buffer digit 0, and Read Alphanumeric line 162 combine at the switch 256, Fig. 12i, to flip the translating mode latch 110 to bring up the alphatranslating line 176. This raises the alphareadout line 116 in the read translator 105 through the switch 179, Fig. 12b, and the next pulse trips the translating mode latches 110, Fig. 12e, to bring up the readout numeric line 115 through the switch 173, Fig. 12j. During the pulse that resets the buffer latches 146, Fig. 12h, the ring advance pulse on the line 128, Fig. 12c, will advance the digit ring 118 from digit D0 to digit D10 by means of single shot 269, Fig. 12c, acting over a conductor 304 leading to the diode switch 246, Fig. 12d, associated with digit ring latch D10.

At the same time coincidence occurs between the buffer digit D0 and control digit alphalines D0 and 260, respectively, which is applied to a diode switch 283, Fig. 12a, the output from which passes through a diode mix 284, inverter 285 and conductor 289 to drop the readout tape alphaline 116 at the switch 177, Fig. 12b, for the automatic insertion of 9's in the digit D0 positions. During this interval the pulses over the line 127 and 145 pass through a diode mix 299, Fig. 12k, and the conductor 305 leading to the diode switch 306. This switch is effective to turn on the On control interrogation word line 155 by the coincident pulses applied from the single shots 122, 123 and 126 and the switch 265, Fig. 12j, which results in raising the line 307 leading to the mix 281, Fig. 12c, and the inverter 282. This action drops the Off interrogation line 155 leading from the latch 108. As before, the Off control word interrogation line 154 being down will block the word and digit ring outputs at the switches 159, Figs. 12e and 12m, and force buffer word W0 up, along with the digit corresponding to the next word to be translated. The next readout pulse will cause the control information to be read into the control digit latch 109, Fig. 12i, through the switch 121 to turn the latch On if an 8 is present in the control digit being interrogated.

If the control digit latch 109 is turned On, the output of the control digit alphabetic line 260 will turn On on the translating mode latch 110 through the mix 229 and cause the alphatranslating line 176 to come up. The ring advance pulse will be blocked at the switch 242, Fig. 12c, because Off control word interrogation line 154 is down. Thus the digit ring 118, Fig. 12d, will not advance. The control word interrogation latch 108 will be turned to bring up the Off line 154 by the 2 microsecond single shot on the next ring advance pulse applied to the diode switch 294, Fig. 12k.

The alphabetic word will be read off the tape with each character being read out twice at the read translator, Fig. 13a to 13b, to generate two biquinary digits, one even and one odd, which is applied from the biquinary output lines, Fig. 13d, to the similarly marked terminals, Fig. 12f, leading to the core storage 87, Fig. 12g. The ring will run from digit D10 to digit D1 with digit D0 being ignored. At this time, buffer digit D0, the read and readout pulse lines and control digit alphalines 254, 297, 127 and 260, respectively, condition the switch 308, Fig. 12i, to provide coincident pulses at the terminals 309 and 310, which are connected to the respective terminals 311 and 312, Fig. 13d, to insert a biquinary 9 (B5, Q4) on the output lines 106 leading to the core.

Read check operation

A Read Check operation is used to give the information previously written on the tape a vertical redundancy check. This assures that the bits, which were put on the tape in a write operation, are actually recorded. The core buffer 87 is not used on this operation.

A start Read Check pulse arriving as an operation code 58 from the calculator turns On the Read Check latch 135, Fig. 12b, which in turn raises line 313 and initiates a read call over the line 164 to start the tape unit. The operation proceeds as a normal read operation using the character gate output over the 167 and the Read Check line 313 at the diode switch 314, Fig. 12j, to run the timing single shots. During this operation, however, no information is put in the cores.

Buffer storage readout read-in

Referring now more particularly to Figs. 12c to 12h, 12l and 12m, with the word ring latch W0, Fig. 12e, and digit ring D10, Fig. 12d, On, assuming all other conditions are in order, a positive value is applied over the buffer word line W0 through the diode mix 156 and cathode follower to a second diode mix 315, Fig. 12f, which leads over the line 316 to buffer word read-in and readout diode switches 317 and 318, respectively, formed as part of a word driver 319. Digit ring line D10, Fig. 12e, connects to its related diode switch 159 which also connects with the Off control word interrogation line 154. When the Off control word interrogation line is driven positive by the read-write delay pulse delivered to the interrogation latch 108, Fig. 12c, the diode switch 159, Fig. 12e, in the ring modification circuit continues through the related diode mix 286 and drives the buffer digit D10 line 320 positive, extends through the diode mix 321, Fig. 12f, related cathode follower and over the line 322 to the buffer digit D10 read-in and readout diode switches 323 and 324, respectively, formed as part of a core digit driver 325.

With both the buffer word W0 and buffer digit D10 lines up, the read out pulse over the line 127 passes through the diode mix 222 to the inverter and condenser in series to initiate the 2 micro-second readout single shot 223. The output from this single shot passes through a related cathode follower and over the line 224 to the 2 micro-second read-in single shot 225, and to a second cathode follower 328 to apply readout pulses over the readout line 329 leading to both the buffer word W0 and buffer diode D10 readout switches 318 and 324, respectively. Operation of these switches causes their respective power tubes PW to conduct through their related primaries 331 in the transformers 332 and induce a current flow in their respective secondaries 333, each of which has one end connected to ground. The word W0 secondary has its other end connected to a conductor 334 which leads to the word W0 line in the core matrix and the digit 10 secondary is connected to a conductor 338 leading to the digit 10 line in the same matrix. With the readout power tubes PW conducting, a current is induced over both the core word W0 and digit D10 lines in the direction shown by the solid arrows.

Figure 4:
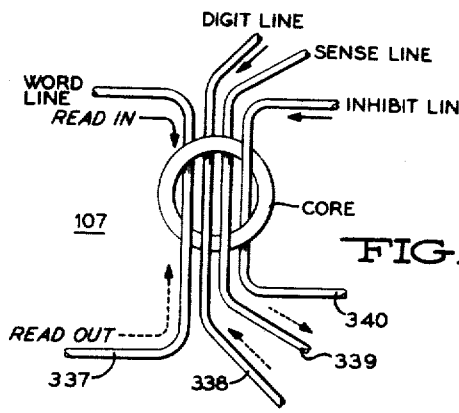
Fig. 4 is a diagrammatic view of one of the cores used in the core storage matrix which forms one bit storage position for one digit position along with one means of wiring the same.

Referring to Fig. 12g, in this particular modification, the high speed magnetic core buffer storage device 87 comprises groups 335 of individual cores 107, as shown in Fig. 4, mounted in suitable frames 336, each of which has a matrix of eleven rows and ten columns of cores therein. One column in each group of cores when wired in series as indicated by the conductor 337, represents a word of data. Thus a total of ten words, W0 to W9 are represented. One row for each group 335 when wired in series horizontally as indicated by the conductor 338, represents a digit of data. A total of eleven digits, digits D0 to D10, are thereby represented. Since the data stored in the cores 107 is in biquinary code B0, B5, Q0 to Q4, the seven stacks or groups 335 of cores are necessary. Other codes using more or less groups may, of course, be adapted to provide a suitable storage device.

As diagrammatically shown, the word W0 line is vertically threaded through all of the cores in the first column in all seven groups with the one side connected to the secondary 333 of the word W0 readout transformer and the other end is commoned with all of the word lines and grounded. Thus as the readout current flows over the W0 line, it passes through all seventy-seven of the word W0 cores and supplies approximately one half of the current required to flip any bit value stored in the word W0 cores.

The digit D10 line 338 is diagrammatically shown as being horizontally threaded through each core in the top rows of each group 335, indicating the digit D10 position of each word and has its opposite end connected to ground along with all other digit lines. The digit lines are threaded through their respective cores so that the current flow through both the digit and word lines is in the same direction. These digit lines also supply approximately one half of the current required to flip or cancel any bit value stored in their associated cores.

In the above example, since both the lines W0 and D10 are considered conducting in the same direction, all cores where coincidence occurs, namely, the upper left-hand core in each group, will be supplied with a total current supply sufficient to cancel any bit value stored in any of the two biquinary code positions.

In addition to the word and digit lines, each group 335 of cores is threaded with an individual inhibited line 339 and a sense line 340. In these two cases, seven sense and inhibit lines are utilized, one of each being threaded through the cores in each group 336 to provide a total of two pairs of seven lines, one pair for each of the binary code B0, B5, Q0 to Q4 positions.

One end of each inhibit line 339 B0 to Q4 is grounded and the other ends of each are provided with an inhibit line 341, each of which is connected to individual secondaries 342 of related transformers 343, Fig. 12f, only one of which is shown. The primary 344 of each is connected to a positive 250 volt supply and the plate of a related inhibit line power tube PW. This combination forms the inhibit line driver 345. The input to the tube is driven from a diode switch 346, one element of which is connected over a line 347 to the cathode follower output side of the read-in 2 micro-second single shot 225. The other element of the switch 346 is under the control of an inverter and cathode follower combination 348 driven through a diode mix 349, one element of which is connected to the B0 terminal having an electrical connection with the B0 terminal of the read translator shown in Fig. 13d.

While only the buffer word W0 and buffer digit D10 circuitry is shown, this is duplicated for each word and digit. Thus there are ten similar buffer word read-in and readout drivers 319, one each connected between the buffer word terminals W0 to W9, Figs. 12e and 12m, and the word line terminals W0 to W9 shown extending vertically at the back of the core matrix, Fig. 12g. The operation of each is identical. Likewise, there are provided eleven digit line drivers 325 identical to that shown for digit D10. Each driver is selectively connected to the buffer digit terminals D10 to D0 as indicated in Figs. 12e and 12m and to the like marked terminals D10 to D1 extending horizontally from the left-hand side of the core array 87, Fig. 12g.

A total of seven inhibit line drivers 345 are utilized, one each for each of the biquinary bit inhibit lines 341 extending through each word and digit core of its assigned location. The input to the driver selectively extends from the terminals listed in biquinary code, all of which are connected to like terminals leading from the read translator, Fig. 13d. Each biquinary inhibit line terminal B0 to Q4 extends through a mix which also connects with the output of a diode switch 351 whose terminals lead to portions of the above-mentioned F. E. Hamilton et al. application, through which data may be selectively transmitted during read-in operation from the calculator. Likewise, data may be selectively entered into the core from the calculator by operating through the diode mix 320, and the diode switches 326, 327 and 330. Since the particular means for inserting data from the calculator forms no part of the invention a further detailed description is not deemed necessary.

As shown, Fig. 12g, the B0 portion of the core array has one sense line 340 series threaded therethrough. Thus a total of seven sense lines B0 through Q4 are provided, one for each biquinary bit position, and the ends of each line are connected to opposite sides of an individual primary coil 352, only one of which is shown. This coil forms part of a full wave rectifier 353 whose output line 354 leads to a double inverter and cathode follower combination 355, Fig. 12h, which in turn leads over a conductor or sense line 356 to one terminal of a sense or buffer latch operating diode switch 357 to condition the same. The sense line 356 is also under the influence of a readout sample line 358 which is connected to the readout line 329 extending from the output side of the 2 micro-second single shot 224, Fig. 12f. An inverter 359, Fig. 12g, and cathode follower are disposed in the readout sample line 358 to drive the sense line 356 negative at read-in time and block the operation of the related sense or buffer latch 146 at the switch 357.

Disposed on the plate side of the sense latch diode switch 357 is an inverter 361 and a related cathode follower whose output line 362 is divided. One portion of the line leads to a second inverter and cathode follower combination 363 whose output is directed over a conductor 364 back to the input side of the diode switch 357 to provide the latching means. The other portion of the latch circuit extends from conductor 362 through a cathode follower 365 and over a conductor 366 to one terminal of a readout diode switch 367. This switch is also driven from a diode mix 368 when the write line 139, Fig. 12b, is up or by one of two readout signals delivered from the calculator. The readout switch 367 operates a cathode follower whose output conductor 369 connects with three conductors. One leads to the B0 write translator terminal which is connected to the similarly marked terminal in the write translator 95, Fig. 14a, the other B0 calculator terminal leads to the switching appearing in Figs. 13a to 13c and 13f of the above-mentioned F. E. Hamilton et al. application and a regeneration line 371 which extends to the diode mix 349, Fig. 14f. The output from the mix 349 extends through the inhibit line inverter 348 and switches at 346 with the 2 microsecond read-in single shot over the inhibit line 347 to drive the inhibit power tube PW. This completes the general core array arrangement and drive routes for both read-in and readout of the core storage 87.

As mentioned previously, assuming coincidence drives over the buffer word W0 and digit D10 lines, the current flow in each line combines and produces a resultant flux of sufficient magnitude to flip any "1" bit value stored in the cores in the W0, D10 position, upper left-hand column of each group, and set all seven of the cores to their zero bit value positions in the standard manner. Those cores in which zeros were resting remain in the zero position. Reversing the current flow through the above lines reverses the flux and flips the cores to their opposite magnetized state to their "1" bit position. Since all cores operate identically, the two possible combinations of one core will be described.

Just before the readout pulse is applied over the line 329 to the readout diode switches 318 and 324, Fig. 12f, the reset buffer latch line 199, Fig. 12k, was driven positive to raise the line 202, Fig. 12h. This positive value extends through the diode mix 205 to the sense latch line 364 which joins with the sense line 356 at the diode switch 357 to bring up the input side the inverter 361. Thus the output from the related cathode follower and connecting line 362 goes negative. This acts through the second inverter cathode follower 363 to apply a continuous positive condition over the sense line 364 to the input of the sense latch switch 357. As a result, a continuous negative condition appears on the lines 362 and 366 and at the readout diode switch 367, even though a write operation is being called over the line 139. Thus a negative or "0" bit value appears at the write translator terminal B0. At the same time, this negative value extends over the regeneration line 371 and is applied to the inhibit line input at the diode mix 349, Fig. 12f, and acts through the inverter 348 to condition one side of the inhibit line switch 346.

Assuming first that a 0 bit value appears in one particular core 107, Fig. 12g, at the time of readout, the combined current flow in both word and digit lines merely supplies a flux in the same direction as that already established in the core and no substantial flux change occurs thereat. Under these circumstances, the sense line 340 threaded through the core remains nonconducting, the coil 352 produces no flux, line 354 is positive and the output from the sense cathode follower maintains a substantial constant positive value over the sense line 356, Fig. 12h, leading to the diode switch 357. Since the output line 366 remains negative because the core did not change its condition, the buffer or sense latch 146 remains Off. Thus the output line 369 is down indicating a 0 bit and the down regeneration line 371, acting through the inverter 348, Fig. 12f, conditions the inhibit switch 346.

Now assuming a 1 bit value was stored in the abovementioned core. When the coincidence readout current flows over the word and digit lines, the combined flux generated acts in opposition to the magnetized condition of the core and drives or flips the same to its 0 bit condition. In so doing, a current is induced to flow in the sense wire 340 and the coil 352, Fig. 12g, which induces a voltage in the full-wave rectifier 353. The resultant potential output over the line 354 leading to the double inverter 355, Fig. 12h, produces a negative-going pulse to the sense switch 357. This negative pulse is applied to the switch because the readout sample line 358 is driven negative by the inverter 359 as the readout pulse is applied thereover. Thus a negative value appears as the sense latch input and the inverter 361 drives the line 362 positive which in turn results in a negative value on the latch line 364 to hold the sense latch On. At the same time the positive value on the line 362 extends through the readout diode switch 367 because the write line 139 is up. This 1 bit positive value is applied to the related binary output terminal and delivers the same to a similarly marked terminal in the write translator or other utilization device.

Since the connecting regeneration line 371 is now positive, this value passes through the mix 349 and inverter 348, Fig. 12f, and drives the inhibit switch 346 negative to block the same when the single shot read-in pulse is simultaneously applied over the line 347 to the switch 346 and the read-in line 350 leading to the read-in diode switches 317 and 323 for word W0 and digit D10.

As noted about the 1 bit value stored in the core is destroyed at readout time and is stored in the sense latch 146. Since it is necessary to hold any data as a group, the 1 bit must be placed back in the core array in the same position at read-in time. With a 1 bit value stored in the sense latch 146 and with the inhibit diode switch 346 down, the inhibit power tube remains nonconductive at the time the read-in line 350 causes the related power tubes and thus the word and digit lines to conduct. In this instance, however, the conduction in the lines 334 and 338 is reversed as indicated by the dotted arrows because the read-in power tubes PW are fired and conduct through their related oppositely wound primaries 372.

With conduction taking place in the reverse direction, the combined flux acts against that in the core and it is flipped to its original 1 bit value storing position and so remains until destroyed at a later time by a readout.

Now if a 0 bit value were stored in the core, the sense latch 146, Fig. 12h, remains Off and this negative value is applied to the diode mix 349 and inverter 348, Fig. 12f, to apply a positive value to the inhibit switch 346. Thus when the read-in single shot 225 is applied to the switches 317, 323 and 346 at read-in time to the word, digit and inhibit lines, all three lines 334, 338 and 341 leading to the core conduct, as shown by the dotted arrows. However, since the current flow through the inhibit line is arranged to flow in the reverse direction through the core, this inhibit flux opposes the combined word and digit line flux and prevents the flipping of the core to a 1 bit value condition. The result is that the inhibit line cancelation flux prevents shifting of the core and it remains in its 0 bit value condition.

A read-in from the read translator 105 appears at the biquinary lines 106, Fig. 12f, which is applied to their inhibit line mixes 349. During this operation, when core readout appears, the values are passed to the sense latches 146, Fig. 12h, but it does not extend beyond this point because the write line 139 is down. Thus the core regeneration lines 371 remain down. At read-in time, the data from the read translator is applied to the mix 349 to operate the inhibit lines to either permit or block the storing of a bit value as the case may be. The driving of the word and digit lines is under the control of the word and digit rings, Figs. 12c, 12d, 12l and 12m, which is timed with the delivery of the data from the timing means for the remainder of the circuit. Just prior to the delivery of each readout to the cores, the reset buffer latch line 202 delivers a positive pulse over the latch line 364, Fig. 12h, to the switch 357 to turn the latch Off and make it available for the data delivered at readout time. The sense latch may be selectively operated from the calculator by means of a switch 370 whose output feeds through the diode mix 205.

Write translator

Referring now to Figs. 6 and 14a to 14c, there is shown the write translator 95 for translating biquinary data delivered thereto over the biquinary lines B0, B5, Q0 to Q4 to a modified binary 1—2—4—8, A, B and C code which data is transmitted over similarly marked output lines 98 to a storage unit such as the tape unit 78 shown in Fig. 2a.

Since this translator must be capable of translating both the numeric and alphabetic data stored in the core storage in either one or two digit positions and only single input lines are provided, the means for determining when the incoming data is to be translated in the alphabetic and numeric mode is predetermined by the previously-described master latch switching. This switching is operated from the control circuitry in accordance with the initial instruction received from the program circuitry in the calculator.

Assuming first that a numeric translation has been indicated by the calculator, the Write Numeric latch 133, Fig. 12b, is turned On, the buffer word W0 and digit D10 lines are up and the read-write delay 143, Fig. 2a, has initiated operation of the single shot device 122, Fig. 12k, through the switch 194, Fig. 12j, to provide operation of the timing circuit. At the proper time in the cycle, a write pulse appears over the line 152 to operate the single shot 153, Fig. 12j. The output from this single shot applies a pulse over the translator reset line 160, Fig. 14a, to reset the On even digit latches 111 to Off. At the same time a switch 373, Fig. 12k, is conditioned by the reset buffer latch line 199, buffer word W0 and buffer digit D10 lines which drive over a line 374 and diode mix 375 to turn On a core regeneration latch 376 in the standard manner. The core regeneration On line 378 leads to the diode switch 233, Fig. 14a. This switch also combines the now positive numeric translating line 147 and the positive output from the inverter 380 which is thereby held up when buffer digits D1 and D0 are down. Coincidence at the switch 233 raises the translate numeric line 234. As this occurs, the diode mixes 381, Fig. 14a, and 382, Fig. 14b, disposed in the even digit B5 and Q4 lines, respectively, go positive to bring up these lines on the even digit side of the translator and in effect place fictitious nines at selected terminals of some of the diode switches 112, Fig. 14c. All of the remaining biquinary lines on the even digit side remain down or negative.

Since the translating is in the numeric mode, the alphabetic translating and even digit line 161 extending from Fig. 12j is held down in the previously-described manner which holds open the parallel even digit diode switches 96, Figs. 14a and 14b, leading to their related even digit latches 111. However, the numeric translating and odd digit line 148 extending from Fig. 12a is up so that one side of all of the parallel odd digit diode switches 97, Fig. 14b, are conditioned for transmission upon the arrival of the first or even digit D10.

Assuming the first numeric value delivered over the biquinary lines is a 6, the biquinary B5, Q1 lines are simultaneously raised and this value is impressed on the related now conditioned diode switches 97. This raises the odd B5 and Q1 connecting lines leading to the diode switch 383, Fig. 14c, which has already been conditioned by the even B5 line. Coincidence at the switch 383 drives the line 384 positive which is reflected through the diode mix 385 to raise the output terminal of the binary 2 line. At the same time the absence of a pulse on the odd digit biquinary B0, Q3 and Q4 lines is reflected through a diode mix 377, Fig. 14b, leading to an inverter 379 which is utilized to maintain the output line 386 positive. This line cooperates with the even digit B5 line and operates the diode switch 389, Fig. 14c, to apply a positive value over a line 390 to a diode mix 391 to raise the binary 4 line. At the appropriate time, these two lines trigger their related write triggers 99, Fig. 2a, for writing on the tape in the standard manner. During this interval the remaining switches in the group are, through various circuity, held in their nonconductive state. Thus, the remaining binary lines are down or negative.

The arrival of the next and each succeeding numeric digit is automatically translated from biquinary to binary values by passing through one or more of the translating switching 112, digit by digit.

When digit ring 1 is reached, buffer digit 0 is raised through the previously-described switching 252, Fig. 12m, at the ring drives and this value acting through the diode mix 387 and on the inverter 388, Fig. 14a, removes coincidence at the switch 233 and drives the translating numeric line 234 down thereby to remove the fictitious nines applied on the biquinary even digit B5 and Q4 lines at the mixes 381 and 382, Fig. 14b. At the same time, the alphatranslating and even digit line 161 is raised by operation of the translating mode latch 110, Fig. 12i, to condition the even digit diode switches 96, Figs. 14a and 14b, and the numeric translation and odd digit line 148 is driven down to remove the positive conditioning on the odd digit switches 97, Fig. 14b. At this time the core digit D0 which holds either a biquinary 8 or 9, indicating the sign of the word, is read therefrom and passed through the proper even digit switches 96 to turn On their related even digit latches 111, Fig. 14a.

Assuming a 9, indicating a positive value for the word, arrives over the biquinary B5 and Q4 lines, the related even digit B5 and Q4 line latches 111 are turned On, which in turn brings up the respective even digit B5 and Q4 lines. Upon the switching to buffer digit D1 on the next advance pulse, the alphatranslating line 161 goes down and the numeric translating line 148 comes up. Since the ring digit D0 line is now up, this pulse is applied to the even digit Q4 conditioned switch 392, Fig. 14c, which raises the line 393 and extends over the diode mix 394 to the output A terminal. At the same time the digit ring D0 line drives through the mix 395 to raise the B output line. Thus lines A and B go positive. As the readout pulse is applied to the core, any numeric value in the digit D1 position passes over the odd digit side of the translator, is recoded therein and placed in one or more of the binary 1—2—4—8 lines. At the appropriate time both values are simultaneously impressed on the tape with the sign in the A and B tracks over the character in the units position as shown in Fig. 9, words W3 and W6.

If a minus sign were indicated by the appearance of a numeric 8 in the digit 0 position, the even digit B5 and Q3 lines are raised but, in this particular circuit, they are blocked and a single spot in the B tape track is applied over the character in the units position upon energization of the ring digit D0 line.

The write translating in the alphanumeric mode is somewhat similar to that followed in the insertion of the sign over the units position. In this instance, the alphatranslating and even digit line 161 is alternately raised in timed relation with the numeric translation and odd digit line 148 to condition their respective diode switches 96 and 97 and the numeric values supplied over the biquinary terminals coming from the core storage latches 146, Fig. 12h, in consecutive even and odd digit order.

Assuming word 1, given in the example in Fig. 9, is being delivered, the numeric 9 in the even digit position D10 arrives first and is directed to the biquinary even digit B5, Q4 latches 111, Figs. 14a and 14b, to bring up their respective even B5, Q4 lines. Since this 9 indicates an actual numeric value stored in the next odd digit position, it is used, selectively associated with the switching 112, to aid in the gating of the next numeric value appearing over the odd digit side of the translator at the odd digit time. At odd digit time the switches 97, Fig. 14b, are conditioned and the 7, biquinary B5, Q2, passes over the odd digit side and operates the diode switches 397, 398 and 389, respectively, Fig. 14c, which drive over their respective lines 399, 400 and 390 and diode mixes 396, 385 and 391 to raise the binary 1—2—4 lines.

The switch 397 is operated from the even B5 line and a line 460 connected to an inverter follower combination 461, Fig. 14b, whose output is positive in the absence of a positive value on the Q1, Q3 and Q4 lines which feed to the inverter through a diode mix 462. Conditioning of the switch 398, Fig. 14c, takes place from the even B5 line, the now positive odd B5 and even Q2 lines. The switch 389 is also conditioned by the same even digit B5 line and the positive value on the line 386 supplied from the inverter 379, Fig. 14b, in the absence of a positive value on the B0, Q3 and Q4 lines. Thus the appropriate write triggers are operated and the double digit biquinary numeric 7, B5, Q4 and B5, Q2, appears as a single digit binary numeric 7, 1—2—4.

After the delivery of each odd digit, the translator reset line 160 is pulsed to reset the On latches 111. This same procedure follows for all numeric values which hold two biquinary digit positions in the alphabetic words.

When even digit D2, forming part of the alphabetic character B, arrives as a B5, Q1, the related latches 111, Fig. 14a, are turned On and the even digit B5 and Q1 lines are raised. Upon the arrival of the numeric 2, B0, Q2, in the odd digit position, which forms the second part of the alphabetic character B, it is directed through the appropriate switches 97, Fig. 14b, and over the odd digit side of the translator. Since the odd digit lines B5, Q1 and Q4 are down, an inverter 401 connected thereto through a diode mix 388 raises the line 402 to drive through a diode switch 403, Fig. 14c, which was conditioned by the even digit B5 line. The positive output extends over a line 404 and through the mix 385 to raise the binary 2 line. The A and B lines were raised by the even digit Q1 line which feeds through both diode mixes 394 and 395. In this instance a positive value is supplied to the C track at the switching 113 and 360 to supply an even bit check on the C track. Should any combination of even bits appear on the numeric binary A and B tracks, no bit value would have appeared on the C track. This is utilized for the redundancy bit check.

In order to generate the C bit in the above example to provide the even bit check when the even digit latches B5 and Q1 are operated, the diode mix 382, Fig. 14b, conducts over the even Q1 or Q4 lines and conditions one side of a diode switch 463. At odd digit time the odd B0 and Q2 lines are up and the remaining lines down. In the absence of a positive value on the B5, Q0 and Q3 lines connected to a diode mix 464 leading to an inverter 465, the positive output passes through a diode mix 466 to the conditioned diode switch 463. Extending from this switch is a conductor 467 leading to a diode mix 468, Fig. 14c, which in turn is connected to a cathode follower and an inverter 469 whose output is directed to a second inverter 470 leading to a cathode follower 471 to raise the C line for the added bit to provide the even bit check on the C track in the tape.

The remaining various switches and circuitry in the group 113, Fig. 14b, and 360, Fig. 14c, provide a means for detecting or counting the various generated bit values and this circuitry is capable of always adding a bit value to the C track should the total bit values on the remaining tracks be an odd number or value.

When setup occurs in the write triggers 99, Fig. 2a, the even digit latches 111 are reset by a negative pulse on the reset line 160 as previously explained. The translator is now ready to receive the next even digit for translation from two digit character representations to the single digit character representation for delivery to any utilization device.

In operation, if any one or more of the switches 397, 472 or 473, Fig. 14c, are operated by proper combination of values delivered thereto over their respective lines extending from the odd or even digit sides of the translator, a bit value appears on the binary 1 line, switch 474 applies a bit value on the binary 1 and 2 lines, switches 383, 398 or 403 raise the binary 2 line, switches 389, 475 or 476 raise the binary 4 line and switches 477, 478 or 479 raise the binary 8 lines.

Also certain of the switches are utilized to provide positive values on the A and B lines to complete the proper alphabetic translation or the placing of the sign over the units position when the data is being translated in the numeric mode. For example, a switch 480, Fig. 14b, is operative through a pair of inverters 481 and 482 whose outputs over the lines 483 and 484, respectively, lead to switches 485 and 486 and 487, respectively, Fig. 14c. The output of the first two switches is directed to the A line and the switch 487 to the B line. As shown, the A line is raised when any one of the switches 392, 485 or 486 is operated or even digit Q1, Q2 lines are raised. The B line is raised upon operation of the switch 487 or the raising of the even Q0 or Q2 lines.

The C line may be raised under various operating conditions. While the switches 488 and 489, Fig. 14b, operate through related inverters to their respective switches 463 and 490 to drive their respective lines 467 and 491 positive and act through the mix 468, Fig. 14c, and inverters 469 and 470 to raise the C line, the value may be erased or modified by operation of a diode switch 492 leading to an inverter 493. For example, should conditioning of the switches 487, 494 or 495 or the lines 467 or 491 drive the C line positive, operation of the switch 492 acts to cancel this value by driving the C line negative. This condition would occur when an even bit count is provided on the binary and A and B lines. The diode mix 496, Fig. 14a, connected to the even digit Q2 and Q3 lines has its output connected to one side of the switch 490, Fig. 14b, to condition one side of the same when either of these lines are raised.

Upon the application of various pulses or combinations thereof, the appropriate switching is operative at ring digit D0 time to automatically provide for bit checking or counting and is effective to maintain an even bit check for each output from the translator.

*Read translator*

Referring now to Figs. 13a to 13d, the read translator 105 comprises a means for translating the modified binary coded 1—2—4—8, A and B data utilized in the tape to biquinary B0, B5, Q0 to Q4 data for delivery to the core storage or any other suitable device. In this instance the translator input lines 1—2—4—8, A and B, Fig. 14a, are connected to similar lines 104 extending from the read-write heads 85, Fig. 2a, amplifier 100, read register triggers 102, line register triggers 103, and a simple switching means (not shown) which is connected with each biquinary input line to provide a normally up parallel Not A, Not B, Not 8, Not 4, Not 2, and Not 1 line, Fig. 14a. These lines are so connected that when line 8 is up, the Not 8 line is down and vice versa. This applies to all lines.

The output of the translator is in biquinary code as indicated and the terminals extending therefrom, Fig. 14d, are connected to similarly marked terminals leading to the diode mixes 349, Fig. 12f, only one of which is shown. Each mix 349 is operative to influence its related inhibit line 341 leading to the core storage 87, Fig. 12g. As shown, the plurality of diode switches and mixes, Figs. 13a to 13d, indicated generally at 114 are connected to the input lines 104, Fig. 13a, and the other side of these switches and mixes eventually terminate on one of the seven biquinary lines, Fig. 13d.

The other input lines required to the read translator are the readout tape numeric line 115, which is connected to the terminal on the line 115 in Fig. 12b, the readout tape alphabetic line 116 supplied from the terminal in the line 116 also in Fig. 12b, a digit ring line D0, Fig. 13d, connected to the terminal on digit ring D0 line 257, Fig. 12i, and a pair of terminals 311 and 312, Fig. 13d, connected to the respective terminals 309 and 310 in Fig. 12i. These latter terminals are used to insert a biquinary 9 in the digit D0 position in the core storage for each alphabetic word.

Diode switches 404, Fig. 13c, and 405, Fig. 13d, associated with the ring digit D0 line are utilized to insert a biquinary 8 or 9, indicating a positive or negative value, in the digit D0 position of each numeric word stored in the core as determined by the reading of the sign over the units position arriving with the last or units digit position for each numeric word delivered by the tape. Thus these switches are effective at right digit D0 time, during translation in the numeric mode, to sample the A and B lines for any values resting therein and one or the other switches to provide the proper value. If A and B lines are up, indicating a 9 or positive value, the switch 405 raises the Q4 line, if only the B line is up, indicating an 8 or minus quantity, the switch 404 raises the Q3 line.

As an example, assuming a translation in the alphabetic mode and that the single digit position alphabetic character B has been read from the tape, this value is applied to the read translator 105 and raises the binary 2, A and B lines, Figs. 13a and 13b, which drops their respective Not lines. The timing of the system, as previously explained, is such that the alphabetic line 116, Fig. 13c, for the even digit position in the core is up first. This conditions portions of all of the parallel connected diode switches. The positive and negative pulses appearing on all three binary and Not lines are, of course, applied to all of the related connected lines. However, in this instance the up binary 2 and Not 8 lines operate a diode switch 406, Fig. 13a, which in turn raises a line 407 and the positive value passes through a diode mix 408, Fig. 13c, and over a line 409 to the diode switch 410. Since this switch is also conditioned by the now positive A and B lines and the alphabetic line 116, it operates to raise the line 411 feeding the inverter 412. The negative output from this inverter feeds over a line 413 to a second inverter 415 to raise the Q1 line.

At the same time a conductor 416 extending from the line 407 goes positive and drives through a diode mix 417, Fig. 13d, and a line 418 to the switch 419. This switch is conditioned by the line 116 also and drives the line 420 positive to the inverter 421 whose negative output extends over the line 422 to the inverter 423 to raise the B5 line. Thus a B1 and Q1 indicating a biquinary 6 is read from the zone position of the tape code, and the output biquinary lines provide the data for insertion in the even digit position for the alphabetic character B. This is written in the even digit position in the core in the previously-described manner.

Since the translator input lines are up for a relatively long period of time, the timing mechanism advances to the odd digit position and samples the same data a second time. At this time the previously-described control mechanism drops the readout tape alphabetic line 116 and raises the readout tape numeric line 115. In this instance the leads extending from the Not 8, Not 4, 2 and Not 1 lines to the diode switch 424, Fig. 13a, raises the line 425 which extends through the diode mix 426, Fig. 13c, and cathode follower to drive the Q2 line positive.

At the same time, the up Not 8 and Not 4 lines raise a diode switch 427, Fig. 13b, to raise the line 428 extending to the diode mix 429, Fig. 13d, leading over the line 430 to the diode switch 431. One half of this switch is up because of the now positive readout numeric line 115, therefore, a positive drive is applied over the line 432 to the double inverter combination 433 to raise the B0 line. Thus a B0, Q2, indicating a biquinary 2 is standing in the lines ready for transfer to the odd digit position in core storage. This storing of the biquinary 6 (B5, Q1) and 2 (B0, Q2) completes the translation from the one digit to the two digit representation of the same character.

Since the sign does not appear with the alphabetic word, at 0 digit time, a pulse is applied to both terminals 311 and 312 from the terminals 309 and 310, Fig. 12i, to drive a biquinary 9 on the B5, Q4 lines, which is placed in the digit D0 position of each alphabetic word.

Assuming now the numeric character 6 is included in the alphabetic word. When translating a numeric character in the alphabetic mode, a 9 must be inserted in the related even digit position. Under the above conditions the binary 4 and 2 lines are up and their respective Not lines are down. Thus the up Not 8 line passes through a diode mix 434, Fig. 13b, and over a line 435 to a diode switch 436. This switch is conditioned by the up Not A and Not B lines along with a positive pulse on the readout tape alphabetic line 116. This conditioning in turn raises a line 437 leading to a diode mix 438, Fig. 13d, to raise the biquinary Q4 line. At the same time the conductors leading to the diode switch 406, Fig. 13a, are up. Thus the lines 407 and 416 leading to the mix 417, Fig. 13d, condition the switch 419 which acts over the line 420 and inverters 421 and 423 to place a positive value on the B5 line. With biquinary lines B5, Q4 up, this represents a 9 which is placed in the even digit position in the core.

Upon switching to the readout numeric line at the next readout pulse, the line 116 drops and the same values in the input lines are sampled to fill the odd digit position with the desired numeric character. In this case the lines extending from the 4, 2 and Not 1 lines condition the diode switch 439, Fig. 13a, which in turn raises an extending line 440. This positive value extends through a diode mix 441, Fig. 13c, and a line 442 to apply a positive value to a switch 443 which has also been conditioned by the readout numeric line 115. The output from this switch extends over a line 444 to drive an inverter 445 which is connected to the inverter 415 to raise the Q1 line. Along with this, a line 446 leading from the conductor 440, Fig. 13a, applies the positive pulse to a diode switch 447, Fig. 13d, which acting over the line 448 raises the switch 449 because the other side of the same has been conditioned by the numeric line 115. The switch output extends over the line 450 through the inverters 451 and 423 to raise the B5 line. Thus a biquinary 6 (B0, Q1) is resting on the line ready for read-in to the odd digit position in the core storage.

All other numeric values translated in the alphabetic mode are treated in the same manner.

When translating in the numeric mode for a numeric word, the readout tape numeric line 115 is held up from digit ring D10 to D1 time and each digit value delivered is read only once to thereby supply the translated numeric values digit by digit to the storage device. Since a straight numeric translation follows similar logic through one or more of the switches and mixes 114 tracing of further values is not deemed necessary.

When the last or units digit arrives from the tape, it carries the sign notation of the word on the A and B lines in parallel with the numeric character in the binary lines. Therefore, the translation of this last digit must take place in the alphabtic mode as determined by the described switching and the value in the input lines is sampled or read twice as described above. The presence of an A and B in the input line, with the alphabetic line 116 up, conditions the switch 405, Fig. 13d, along with line 116 and digit ring D0. This switch feeds over the line 452 and the mix 438 to drive the Q4 line positive. If just a B appears, the switch 404, Fig. 13c, acted on by the digit ring D0, readout alphabetic line 116, B and Not A lines, is conditioned and drives the line 453 positive which drives through the diode mix 454 and line 455 to the double inverter 456 to raise the Q3 line. In both cases the biquinary B5 is driven positive by any suitable switching by the switches 114 used in combination with the particular character presented at the time.

Write numeric control pulses

Figs. 18 to 21 disclose the various control pulses which appear over the various lines. Referring first to Fig. 18, wave forms at buffer digit D0 and D1 times are shown, with digit D0 being representative of the other digits. Write pulses C are generated by the continuously running clock 150, Fig. 2a, in the synchronizer and each positive-going pulse indicates a shift to the next digit position. These write pulses sample the translator output and cause the character to be recorded on the tape. At the termination of the write pulse C, the write triggers 99 actually recording send out write echo pulses. These turn On corresponding triggers in the read register 102, the first of which starts the character gate 165 to develop the E pulse. The character gate pulse E is turned Off by the clock 150 sixteen microseconds later, resetting the read register 102. As the read register triggers turn Off, the E pulse turns On corresponding triggers in the line register 103 to bring up the pulse F. The output of the line register is given a vertical redundancy check, to check the character last written, by the next write pulse C. After this the line register is reset by the clock 150.

The fall of the write pulse C starts the single shots. First the 6 micro-second single shot pulse H is up resetting the core buffer latches 146 by the B pulse. The fall of the H pulse causes the 8 micro-second single shot pulse I to come up. This pulse starts readout of the next character from the core buffer. The readout and read-in pulses R are bracketed by the I pulse. The new information is read out and read in to replace it in the cores for regeneration. After a 2 micro-second delay, a 2 micro-second single shot pulse J comes on to advance the digit ring and change the values of the lines K and L.

This process repeats until the digit ring reaches the units position.

After the readout of buffer digit D2, the digit ring is advanced to digit D1. Because this is a numeric word, the ring positions D1 and D0 are reversed to put the sign digit in the translator latches. At this time buffer digit 0 is On and, therefore, the translating mode is set to alphabetic.

The next write pulse C operates as described before and writes digit D1 on the tape. The next readout pulse I places buffer digit D0 into the translator latches at the time the line A is up. When the readout pulse I falls under the above conditions, it starts the pulse H over again. While pulse H is up, the pulse J comes up again advancing the digit rings.

The digit ring advances from D1 to D0, causing buffer digit D1 to come On. This drops the translating mode line N to numeric and brings up odd digit line K. The fall of pulse H develops pulse I, which reads out digit D1 and places it in the buffer latches.

The translator takes the information and forms the proper binary character, which is written by the next write pulse C.

The next pulse J advances the word ring and turns On digit D10 to start the operation over again after the control word interrogation.

Write alphanumeric pulses

Referring now to Fig. 19, there is shown the necessary pulses to complete the Write Alphanumeric operation. At the conclusion of reading out the information for recording sign over units position, the second ring advance pulse J causes the word ring to advance and digit ring D10 to be turned On. Digit D10 coming On turns On control word interrogation latches and modifies the ring outputs to select the proper digit in the control word. When the next write pulse C comes along, it writes the sign over units character. The fall of pulse C starts the single shots and another readout operation. The control digit is read out and if it is a biquinary 8 (B5, Q3) the control digit latch T comes On, turning the translating mode line N to alphatranslating.

When readout pulse I falls, with pulse S, the train of single shots is restarted to bring up line H. Before the next readout pulse I, the line S is turned Off by the reset pulse V. This returns the ring outputs to their normal condition. The ring advance pulse just preceding this is blocked by the On control word interrogation line.

The next readout pulse I places the even digit information into the buffer and translator latches. The fall of pulse I, with even digits L and alphatranslating N pulses starts the single shots again. The ring advance pulses J come through normally. The third pulse I places the odd digit information into the buffer latches and the translator output is sampled by the next write pulse C.

Read numeric pulses

Referring next to Fig. 20, there is shown the read pulses for controlling the translation of the data. On a read operation the bits on the tape set up triggers in the read register 102. The first bit read also starts the character gate to provide the pulse C, which starts the synchronizer clock 150 running. The character gate C is up for thirty-three micro-seconds during which time the bits in the character must finish reading. The fall of pulse C resets the read register 102 and turns On corresponding triggers in the line register 103. Also the fall of C pulse starts the single shot operation. The pulse E is used for a delay and to start the readout pulse F. During pulse F the core readout-read-in cycle pulses L occur to put the translator output into the cores. Two micro-seconds after F falls, the ring advance pulse G moves the rings one digit position.

When digit ring D1 comes On and because the word is numeric, the ring positions D1 and D0 are reversed and buffer digit D0 comes up, turning the translating mode latch to alphabetic. This reversal of digits is necessary only on writing and is done here for convenience only.

The fall of the next character gate pulse C starts the single shots. The readout pulse F places the sign information in the tape character into the digit D9 position of the buffer. Since we have even digits and alphabetic translating, the fall of pulse F restarts pulse E and during that time the digit ring is advanced to D0 before the next pulse F. The next F pulse reads out the numeric portion of the character in the line register into digit D1 of the core buffer.

Read alphanumeric pulses

Referring now to Fig. 21, the operation is similar to the reading of the sign over the units position described above. At the time pulse F falls for the second time, the control digit latch pulse L is on numeric and buffer digit D1 is up. Under these conditions the single shots start again and advance the word ring to set up digit ring D10. Digit D10 coming brings up the control word interrogation latch and the pulse K. Control word interrogation On modifies the ring outputs so that, when pulse E falls and causes pulses F and R, the control digit will be read and closed in the control digit latch L. Immediately following the ring advance pulse G, a pulse N will reset the control word interrogation latch.

Since the control digit indicated an alphabetic word for each tape character there will be two readout pulses F to sample the translator, one at odd and the other at even digits times.

Summary

From the foregoing, it can be seen that an improved means has been provided for transferring groups of words having both alphabetic and numeric data words therein from one location to another in which a translation or modification is required of some of the character representations. Also that an improved control means for a group of words has been provided in which a control word is formed as a part of the group which is interrogated after the delivery of each data word to determine the mode of translation or the disposition of the succeeding word and this complete transfer of data may be accomplished by a single program instruction.

While the above-described modification discloses a group of data words in which one of the words is a control word having a control digit therein for each data word to determine a numeric or alphabetic translating of the word, it is within the possible scope of this invention to use the control word and digits to selectively direct the controlled data word from one location to the next with or without translation.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a data processing system, the combination of a data storage device for an intermixed group of numeric and alphabetic words comprising a plurality of data words, each of said words including a plurality of digit positions for storing data thereat in first preselected coded character representations with a character stored at each digit position or as a character occupying a plurality of related digit positions according to a predetermined notation, each of said data words including a control digit stored with said word to indicate a numeric or alphabetic word, data receiving means for storing data in a second coded character representation, translating means disposed between said data storage device and said data receiving means, means for selectively directing the words of stored data to said data receiving means, means for blocking the delivery of the data from said storage device, and means for interrogating the control digit of each word to detect a numeric or alphabetic word, said last-named means acting on said blocking means to release said blocked word upon a numeric word indication for delivery of the characters through said translating means to said data receiving means for storage digit by digit in said second code representation and upon an alphabetic word indication for combining the related plurality of digit positions in said first code to represent the same character in a second code at a single digit position in said data receiving means.

2. In a data processing system, the combination of a data storage device for an intermixed group of independent numeric and alphabetic words comprising a plurality of data words, each of said words including a plurality of digit positions for storing data thereat in preselected coded character representations with a character stored at each digit position for a numeric word or as a character occupying a plurality of related digit positions for an alphabetic word, each of said data words including a control digit stored with said word to indicate a numeric or alphabetic word, data receiving means, means for selectively directing the words of data between said storage device and said data receiving means in a numeric or an alphabetic mode, means for blocking the transmission of the data, and means for interrogating the control digit of each word to determine the disposition of the same, said last-named means acting on said blocking means to release said blocked word for transmission of all digits in the entire word in the numeric mode or in the alphabetic mode.

3. In a data processing system, the combination of a data storage device for a group of words comprising a control word and a plurality of data words, each of said words including a plurality of digit positions for storing data thereat, said control word having at least one digit position therein associated with the data words to control the same, data processing means, means for selectively transferring the data between said storage device and said data processing means in one of a plurality of modes, means for blocking the transmission of said data words, means for interrogating the controlling digit for the data words, and means dependent upon the condition of the interrogated controlling digit for selecting the mode of transfer for the data words between said storage device and said processing means.

4. In a data processing system, the combination of a data storage device for a group of words comprising a control word and a plurality of data words, each of said words including a plurality of digit positions for storing data thereat as numeric character representations, said control word having at least one digit position therein associated with a related data word to control the same, data processing means, means for selectively transferring the stored data to said data processing means a word at a time in one of a plurality of modes, means for blocking the delivery of each word, means for interrogating the controlling digit for the selected word, and means dependent upon the condition of the interrogated controlling digit for selectively switching the word to said processing means in one of said plurality of modes, said interrogating means for said control word being advanced to the next controlling digit position for the next word after the delivery of each word.

5. In a data processing system, the combination of a data storage device for a group of words comprising a control word and a plurality of data words, each of said words including a plurality of digit positions for storing data thereat in coded character notations, said control word having at least one digit position therein associated with a related data word to control the same, data processing means, means for selectively transferring the data between said storage means and said processing means in one of a plurality of modes, means for initiating a data transfer, means for blocking the transmission of the data, means for interrogating the controlling digit for the selected data to be transferred, and means dependent upon the condition of the controlling digit for selectively switching the word between said storage device and said processing means in one of said plurality of modes, said interrogating means for said control word being advanced to the next controlling digit position for the next word of data after the delivery of each data word.

6. In a data processing system, the combination of a data storage device for a group of words comprising a a control word and a plurality of data words, each of said words including a plurality of digit positions for storing data thereat as numeric character representations, said control word having one digit position therein assigned to a related data word to control the same, data receiving means, means for selectively transferring the stored data between said storage device and said data receiving means serial by digit a word at a time in one of a plurality of modes, means for blocking the delivery of each word, means for interrogating the controlling digit in the control word for the selected word, means dependent upon the predetermined conditioning of the interrogated controlling digit for selectively switching the word between said storage device and said receiving means in one of said plurality of modes, and means operative after the delivery of the data word and by said blocking means for advancing said interrogating means to the next controlling digit position in the control word for interrogation of the same.

7. The combination as claimed in claim 6, including a data processing means, means for programming said processing means to perform data handling operations, and means operative upon a single instruction from said processing means to initiate the transfer of the group of words.

8. The combination as claimed in claim 6, wherein after said data processing means has initiated a data transfer operation, said control word assumes the disposition of the data words.

9. The combination as claimed in claim 5, wherein said control word is retained with said data words and forms an integral part of said word group.

10. In a data processing system for numeric and alphabetic characters, the combination of a data storage device for a group of words comprising a plurality of alphabetic and numeric data words each including a plurality of digit positions, said plurality of data words including a control word having one control digit for each data word assigned to control the interpretation of the other data words as alphabetic or numeric in accordance with a predetermined notation, a data processing device, means for transferring the stored data to said data processing device digit by digit, one word at a time, means at the end of each word delivery for blocking the delivery of the next word, means operative upon operation of said blocking means to interrogate the next control digit in said control word, and means dependent upon the presence of the predetermined notation during interrogation for transferring the related data word to said data processing device as an alphabetic or numeric word.

11. In a data processing system for numeric and alphabetic characters, the combination of a data storage device for a group of words comprising a plurality of alphabetic and numeric data words, each word including a plurality of digit positions, said plurality of data words including a control word having at least one control digit for each data word assigned to control the interpretation of its related data word as alphabetic or numeric in accordance with a predetermined notation, a data processing device, means for selectively transferring the data between said processing and storage devices in numeric and alphabetic modes, means effective at the end of each word delivery for blocking the delivery of the next word, means operative upon operation of said blocking means to interrogate the next control digit in said control word, and means dependent upon the presence of the predetermined notation during interrogation for transferring the related data word in an alphabetic or a numeric mode.

12. In a data processing system for numeric and alphabetic characters, the combination of a data storage device for a group of words comprising a plurality of alphabetic and numeric data words, each word including a plurality of digit positions, said plurality of data words including a control word having one control digit for each data word assigned to control the interpretation of the data words as alphabetic or numeric in accordance with a predetermined notation, a data receiving device, means for transferring the stored data between said storage and receiving devices, serial by digit, one word at a time, switch means operative at the end of each word delivery for blocking the transmission of the next word, means operative upon the conditioning of the next word for interrogating the related control digit in said control word, and means dependent upon the presence of the predetermined notation during interrogation for transferring the related data word as an alphabetic or numeric word.

13. In a data processing system for numeric and alphabetic characters, the combination of a data storage device for a group of words comprising a plurality of alphabetic and numeric data words, each including a plurality of digit positions, said plurality of data words including a control word having at least one control digit for each data word assigned to control the interpretation of the other data words as alphabetic or numeric in accordance with a predetermined notation, a data processing device, means for transferring the data between said storage and processing devices in numeric and alphabetic modes, serial by digit, one word at a time, switch means operative at the end of each word delivery for blocking the transmission of the next data word, said switch means including means for interrogating the controlling digit for said next data word, and second switch means operative upon the presence of the predetermined notation during interrogation for effecting the transfer of the related data word in an alphabetic or a numeric mode.

14. In a data procesing system for alphabetic and numeric information, the combination of a data storage device for a group of words comprising a control word and a plurality of data words each of which includes a plurality of digit positions for storing data thereat as numeric character representations, said numeric character representations in the data words representing a single numeric character at each digit position in the absence of an alphabetic character stored therein and occupying a greater number of digit positions for each character when alphabetic characters are stored in the data word, said control word including at least one digit position therein associated with each data word and having a predetermined notation therein to denote the presence or absence of an alphabetic character in the related data word, data receiving means, means for transferring the stored data between said storage device and said receiving means, means for blocking the delivery of said data words, means for interrogating the controlling digit for the selected word to determine the presence or absence of an alphabetic character therein, and means dependent upon the results of the interrogation to transfer the next delivered word as a numeric word digit by digit when a numeric word is indicated by one condition of said controlling digit and as an alphabetic character representation by combining the digits forming the alphabetic character under another condition of said controlling digit.

15. The combination as claimed in claim 14, wherein said control word remains in said storage means, and means for selectively stepping said interrogation means to the next control digit for interrogation after the delivery of each word.

16. The combination as claimed in claim 14, wherein said control word is retained with said data words and forms an integral part of said word group.

17. The combination as claimed in claim 14, including data processing means, means for programming said processing means to perform preselected data handling operations, and means operative upon a single instruction from said processing means to initiate the transfer of the group of words.

18. The combination as claimed in claim 14, wherein after said data processing means has initiated a data transfer operation, said control word is selectively interrogated for the disposition of the data words.

19. In a data processing system for alphabetic and numeric information, the combination of a data storage device for a group of words comprising a control word and a plurality of data words each of which includes a plurality of digit positions for storing data thereat as numeric character representations, said numeric character representations in each data word representing a single numeric character at each digit position in the absence of an alphabetic character stored therein and occupying a greater number of digit positions for each numeric character when alphabetic characters are stored in the data word, said control word including at least one digit position therein associated with each data word and having a predetermined notation therein to denote the presence or absence of an alphabetic character in the related data word, a data processing device, translating means, means for transmitting said control word between said storage and processing devices through said translating means, means for conditioning one of the data words for transfer, switching means for blocking the delivery of the data word, means including second switching means for interrogating the controlling digit for the selected data word to detect the presence or absence of an alphabetic character therein, and means dependent upon the operation of said last-named means to translate the next delivered word as a numeric word digit by digit when a numeric word is indicated by one condition of said controlling digit or as an alphabetic word by incorporating the digits defining the alphabetic character by another condition of said controlling digit.

20. In a data processing system for alphabetic and numeric data, the combination of a storage matrix arranged to provide a plurality of rows of data words divided into a plurality of columns of digits for storing data therein, a numeric control word including alphabetic and numeric data word instruction notations in at least some of its digit locations and alphabetic or numeric character representations to fill each digit position of each of the remaining words, each of said controlling digits in said control word being associated with an independent data word in said storage matrix, each of said alphabetic and numeric character representations occupying a pair of digit positions in the particular one of the remaining words when one or more alphabetic characters appear therein, a data receiving device, translating means, means for transferring the data stored in said storage matrix through said translating means to said data receiving device serial by digit, one word at a time, means for interrogating a digit in said control word to detect the presence of an alphabetic character representation in the data word to be transferred, means dependent upon the detection of an alphabetic character representation to translate pairs of digit character representations in said translating means as a single character representation for recording in said data receiving device, means after the transfer of the data word for blocking the delivery of the next data word until the related control digit in the control word is interrogated to determine the presence or absence of an alphabetic character representation, and means operative in the absence of an alphabetic character representation to transfer and translate each digit character representation to said receiving device, one digit for each digit appearing in the word being transferred.

21. The combination as claimed in claim 20, including a data processing device, means associated with said processing device for selectively operating the same through a series of operation, and latch means operative from a single instruction from said last-named means for initiating operation of the data transfer, said data transfer being thereafter under the control of said control word through said interrogation means.

22. In a data processing system for alphabetic and numeric data, the combination of a core storage matrix arranged to provide a plurality of rows of data words divided into a plurality of columns of digits for storing data therein in a first code, a numeric control word including alphabetic and numeric data word instruction notations in at least some of its digit locations, each of which is associated with an independent data word in said core storage matrix, said data words having alphabetic or numeric character representations in the first code to fill each digit position therein, each of said alphabetic and numeric character representations occupying a pair of digit positions in the particular one of the data words where one or more alphabetic characters appear therein, a tape unit, translating means for converting data from said first code to a second code, means for transferring the data from said core storage through said translating means to said tape serial by digit, one word at a time, interrogation switch means for interrogating a control digit in said control word to detect the presence of an alphabetic character representation in the data word to be transferred, latch means dependent upon the presence of an alphabetic character instruction to combine and translate pairs of digit character representations in the first code to a single character representation in the second code for recording in said tape, and interrogation latch means operative after the transfer of the data word for blocking the delivery of the next data word, said interrogation switch means being effective to raise the next controlling digit in said control word for interrogation to determine the presence or absence of an alphabetic character indication in its related data word, said first-mentioned latch means being operative in the absence of an alphabetic character instruction to permit translation of each digit character representation to said second code for writing in said tape, one digit for each digit appearing in the data word being transferred.

23. The combination as claimed in claim 22, including data processing means, program control means for operating said processing means in a series of predetermined steps, and means including master latch means operative from a single instruction from said program control for initiating the transfer of said control word, said control word thereafter being operative by consecutive interrogation to determine the mode of translations for the respective data words.

24. In a data processing system for alphabetic and numeric data, the combination of a core storage matrix arranged to provide a plurality of rows of data words divided into a plurality of columns of digits for storing data therein in a first code, a numeric control word including alphabetic and numeric data word instruction notations in at least some of its digit locations, each or which is associated with an independent data word in said core storage matrix, said data words having alphabetic or numeric character representations in the first code to fill each digit position therein, each of said alphabetic and numeric character representations occupying a pair of digit positions in the particular one of the data words where one or more alphabetic characters appear therein, a tape unit for storing data therein in a second code, translating means for converting data from said second code to said first code, means for transferring the data from said tape unit to said core storage serial by digit, one word at a time, means for initiating a data transfer whereby said control word is placed in said core storage in the second code, switch means for blocking the delivery of the next data word, means for interrogating a control digit in the control word in said core storage to detect the presence of an alphabetic character representation in the next data word, and latch means dependent upon the presence of an alphabetic character instruction to translate each digit character representation in said second code to a two digit character representation in said first code for recording in said core storage, said latch means being operative after the delivery of the data word for blocking the delivery of the next data word, said blocking switch means being effective to raise the next controlling digit in said control word for interrogation to determine the presence or absence of an alphabetic character instruction in its related data word, said first-mentioned latch means being operative in the absence of an alphabetic character instruction to permit translation of each digit character representation to said first code for insertion in said core storage, one digit for each digit appearing in the data word being transferred.

25. A data translating device for translating data delivered from a source having data stored therein in one code with one or more bit positions disposed in a single digit location for each character representation to a second code having first and second bit storing digit positions assigned for each of the characters, comprising a plurality of input lines associated with the data source, one each for each of the possible bit positions and over which the bit values are transmitted digit by digit, a plurality of output lines for delivering the modified bit values, a plurality of switches selectively connected to the plurality of input and output lines, a first digit line associated with some of said switches to condition the same and sample said input lines for the bit values resting therein in said one code and generating an output over the appropriate output lines to provide a first digit translation of the bit values to said second code, and a second digit line associated with some of the remaining switches to condition the same and sample the same bit values in said input lines and combine therewith to generate an output over the appropriate output lines to provide a second digit translation of the input bit values in said second code, said pair of translations of the single input bits combining to form the same character representation in the second code.

26. A data translating device for data delivered from a source having both numeric and alphabetic data stored therein in one code having one or more parallel bit positions disposed in a single digit location for each character representation to a second code having even and odd bit storing digit positions assigned for each of the characters, comprising a plurality of input lines associated with the data source, one for each of the possible bit positions and over which the bit values are transmitted parallel by bit and serial by digit, a plural of output lines for transmitting the modified bit values parallel by bit in a second code, a plurality of even and odd digit switches selectively connected to the plurality of input and output lines, an even digit line associated with said even digit switches, means for driving said even digit line to condition its related switches and sample said input lines for the bit values for the characters resting therein in the one code and generating an output over the appropriate output lines to provide an even digit translation of the bit values in said second code, an odd digit line associated with said odd digit switches, and means for removing the conditioning on said even digit line switches and driving said odd digit line to condition said odd digit switches to sample the same bit values on said input lines and generate an output over the appropriate output lines in an odd digit translation of the input bit values in said second code, said pair of independent translations of the single input bits combining to form the same character representation in the second code.

27. A data translating device for translating data delivered from a source having groups of words containing alphabetic and numeric data stored therein in a first code having one or more parallel bit positions disposed in a single digit location for each character representation to a second code having even and odd bit storing digit positions assigned for each of the first code characters for transmission to a data receiving device, comprising a plurality of input lines associated with the data source one each for each possible bit position and over which the parallel bit values in the first code are transmitted digit by digit, a plurality of output lines for delivering the bit values in the second code to said data receiving device, a plurality of switching devices selectively connected to said input lines, an even digit line associated with some of said switches to condition the same and sample the bit values resting in the input lines in said first code and generating an output over the appropriate output lines to provide an even digit translation in said second code, an odd digit line associated with certain of the remaining switches to condition the same and sample the same bit values in said input lines and generate an output over the appropriate output lines to provide an odd digit translation of the same bit values, said pair of translations of the single digit input bit values combining to form the same alphabetic character representation in said second code, and means for inserting a sign value in one of the digit positions of the translated word.

28. A data translating device for translating data delivered from a source having a group of words containing alphabetic and numeric data stored therein in a first code having one or more parallel bit positions disposed in a single digit location for each character representation to a second code having even and odd digit storing positions for the alphabetic words assigned for each of the first coded characters for translation to a data receiving device, comprising a plurality of input lines associated with the data source one for each possible bit position and over which the parallel bit values are transmitted serial by digit, a plurality of output lines for delivering the bit values in a second code to said data receiving device, a plurality of switching devices selectively connected to said input lines, an even digit line associated with some of said switches, means for raising said even digit line to condition the associated switches and sample the bit values resting in the input lines in the first code and generating an output over the appropriate output lines to provide an even digit translation in said second code, an odd digit line associated with certain of the remaining switches, means for lowering the even digit line and raising the odd digit line to condition said certain remaining switches and sample the same bit values in said input lines to provide an odd digit translation of the same bits, said pair of translations of the single digit input bits combining to form the same character representation in said second code, and means associated with said odd digit line to maintain said certain remaining switches conditioned to provide a translation from the first to the second code digit for digit.

29. A data translating device for translating data delivered from a source having groups of words containing alphabetic and numeric data stored therein in a first code having one or more parallel bit positions disposed in a single digit location for each character representation to a second code having even and odd bit storing digit positions assigned for each of the first code characters for transmission to a data receiving device, comprising a plurality of input lines associated with the data source one each for each bit position and over which the parallel bit values are transmitted serial by digit, a plurality of output lines for delivering the parallel bit values in the second code to said data receiving device, a plurality of switching devices selectively connected to said input and output lines, a first line associated with some of said switches, means for operating said first line to condition said associated switches and sample the bit values resting in said input lines in the first code and generate an output over the appropriate output lines to provide an even digit translation in the second code, a second line associated with certain of the remaining switches, means for opening said first line and operating said second line to condition the associated switches to sample the same bit values in the input lines and generate an output over the appropriate output lines to provide an odd digit translation of the same bits in the second code, said pair of translations of the single digit input bits combining to form the same character representation in said second code when translating in the alphabetic mode, and means for continuously operating said second line to condition the associated switches to translate the input bits digit for digit when translating in the numeric mode.

30. The combination as claimed in claim 29, wherein said first code is in binary form and includes binary and zone input lines, switch means associated with said zone lines, and means associated with said switch means to sample said zone lines upon the arrival of the data carried in the units position, when translating in the numeric mode to translate the sign of the data word to the second code for transmission to a single digit position in said data receiving device.

31. The combination as claimed in claim 29, wherein an alphabetic word carried in said first code is delivered without a sign value, control means, and switch means associated with said control means and certain of said output lines, said switch means being operative by said control means for inserting a sign value over the appropriate output lines in the second code for insertion in a single digit position when translating in the alphabetic mode.

32. A data translating device for translating data delivered from a source having data stored therein in a first code having first and second digit positions with bit values disposed in each position for each character representation to a second code having one or more bits located at a single digit position to provide the same character representation for delivery to a data utilization device, comprising a plurality of input lines for receiving the bit values thereover in accordance with the character representations, a plurality of output lines being assigned the second code values connected to the utilization device, said translator having a first digit section and a second digit section, means including first digit switching and second digit switching for selectively gating the bit data through said first and second sections in timed relation with the application of first and second digits to said translator, means for storing said first digit values in said first section, and gate switching disposed between said first and second sections to gate the combined application of said first and second digits over one or more of the output lines as a single character representation.

33. The combination as claimed in claim 32, including means for removing the stored data in said first digit section after the delivery of data through said second digit section.

34. The combination as claimed in claim 32, including means associated with said first and second digit sections for determining the total number of output lines carrying data therein, and bit check switch means associated therewith to raise a parallel bit check line when an odd number of data lines have been operated to thereby provide an even bit check for the output lines.

35. The combination as claimed in claim 32, including means for alternately operating said first and second digit switching for the data delivered under one condition of operation, means for maintaining said first digit switching open and said second switching conditioned to gate all of the input data therethrough serial by digit during another condition of operation, and means associated with said first digit section for conditioning certain of said gate switching to provide a second code output over said output lines digit for digit.

36. A data translating device for translating alphabetic and numeric data as alphabetic and numeric words delivered from a source having data stored therein in a first code including single digit positions for numeric words and first and second digit positions with bit values in each position for alphabetic words for each character representation to a second code having one or more bits located in a single digit position to provide the same character representation for delivery to a data utilization device, comprising a plurality of input lines for receiving the bit values thereover in accordance with the character representations, a plurality of output lines being assigned the second code values connected to said utilization device, said translator having a first digit section and second digit section, means including first digit switching and second digit switching for selectively gating the bit data through the first and the second digit sections in said translator in timed relation with the application of first and second digits to said translator when translating alphabetic data words, gate switching disposed between said first and second digit sections to gate the combined application of the first and second digits over one or more of the output lines as a single character representation, means for conditioning the first digit switching to block the delivery of the first digits through said first digit section, and means for conditioning said second digit switching to gate the first and second digits through said second digit section for translation digit for digit.

37. A data translating device for translating alphabetic and numeric data as alphabetic and numeric words delivered from a source having data stored therein in a first code including single digit positions for numeric words and first and second digit positions with bit values in each position for alphabetic words for each character representation to a second code having one or more bits located in a single digit position to provide the same character representation for delivery to a data utilization device, comprising a plurality of input lines for receiving the bit values thereover in accordance with the character representations, a plurality of output lines being assigned the second code values connected to said utilization device, said translator having an even digit section and an odd digit section, means including even digit switching and odd digit switching for selectively gating the delivered parallel bit data through the even and odd digit sections in timed relation with the application of the data in the even and odd digit positions when translating alphabetic words, latch means for storing the even digit data in the even digit side of said translator, and gate switching disposed between said even and odd digit sections to gate the combined application of the even and odd digits over one or more of the output lines as a single character representation in the second code.

38. The combination as claimed in claim 37, wherein during a numeric word translation said even digit switching is operated to block the delivery of said even digits through said even digit section, means for conditioning said odd digit section switching to gate both the even and odd digits therethrough serial by digit, and means associated with said even digit section for conditioning certain of said gate switches to translate the delivered data from the one code to a second code parallel by bit and digit for digit.

39. The combination as claimed in claim 37, including bit check switching associated with said even and odd digit sections for determining the bit values developed on the output lines, and a bit check line associated with said bit check switching output lines, said bit check switching being operative when the bit values on said output lines total an odd number to raise said bit check line to thereby provide an even bit check.

40. In a data processing system, the combination of a storage device for data stored in groups of words divided into a plurality of digits, one of said words being a control word having control digits therein for the data words, means including a word ring for conditioning a word of data for processing, means including a digit ring for selectively conditioning the digits of the selected word for readout, means for advancing the word ring after each completed digit ring cycle, means for blocking the output of the word ring, means associated with said blocking means for conditioning said control word and the control digit therein of the word being blocked, and means dependent upon the interrogation of the control digit to determine the disposition of the blocked word.

41. In a data processing system, the combination of a storage device for numeric and alphabetic data stored in groups of words divided into a plurality of digits, one of said words being a control word having control digits therein for the data words, means including a word ring for conditioning a word of data for processing, means including a digit ring for selectively conditioning the digits of the selected word for readout, means for advancing the word ring after each completed digit ring cycle, means for blocking the output of the word ring, means associated with said blocking means for conditioning said control word and the control digit therein of the word being blocked, and means dependent upon the interrogation of the control digit to determine the disposition of the blocked word.

42. In a data processing system, the combination of a storage device for numeric and alphabetic data words having a plurality of digits stored in a word group, one of said words being a control word having at least one control digit for each data word, means including a word ring for conditioning a word of data for processing, means including a digit ring for selectively conditioning the digits of the selected word for readout, means for advancing the word ring upon completion of each digit ring cycle, means including switching to block the output of the word advanced in the word ring, said blocking means being operative to condition the control word, control digit switch means associated with said word rings, said conditioned word ring driving the related control digit switch means to drive the associated control digit in said control word for interrogation, and means dependent upon the condition of the associated control digit for determining the disposition of the blocked word, said blocking means being operative after interrogation to remove the drive to the control word and the interrogated control digit and permit continued operation of said digit ring to remove the data from the related data word to said storage device.

43. In a data processing system, the combination of a data storage device for numeric and alphabetic data words stored in a group, each of said words comprising a plurality of digits, one of said words being a control word having control digits therein, means including a word ring for selectively conditioning the words of data for processing, means including a digit ring for consecutively conditioning the digits of the selected word for readout, means for advancing the word ring after each completed digit ring cycle, means including switching for blocking the output of the selected word and for conditioning the control word, means including switching associated with said blocking means and the selected word for operating the related control digit for interrogation, means dependent upon the interrogation of the control digit to determine the disposition of the blocked word, and means operative after the control digit interrogation for permitting readout of the selected word from said data storage device.

44. In a data processing system, the combination of a data storage device for a group of words including a plurality of digit positions for storing characters represented by a plurality of first coded digits, each including a predetermined number of code elements comprising a plurality of data words, each of the words including a plurality of digit positions for storing the characters thereat and a control digit therefor, data receiving means for storing data in a second code having a different number of characters with a different number of code elements, selectively operated data delivery means disposed between said storage device and said data receiving means for transmitting data in accordance with predetermined notations of the control digits, means for interrogating the output from the control digit of each data word prior to delivery to determine the disposition of the same, and means responsive to the output from said interrogation means for selectively directing the related data word between said storage device and said data receiving means to change the number of characters initially represented by said first plurality of coded digits, each comprising a given number of code elements, to a different number of characters, with a different number of code elements.

45. In a data processing system, the combination of a data storage device for a group of words comprising a plurality of data words, each of the data words including a plurality of digit positions for storing characters represented by a plurality of first coded digits, each including a given number of code elements and a control digit stored therewith, data receiving means for storing data in a second code having a different number of code elements, means for selectively directing the data words between said storage device and said data receiving means in accordance with the predetermined settings of the control digit, and means for interrogating the condition of the control digit of each data word prior to delivery to determine the disposition of the same, said last-named means being operative on said selecting means under one condition of the control digit for directing the data word therethrough to change the number of characters initially represented by the first code, to a different number of characters in said second code or to retain the number of code elements the same under another condition of the control digit for the same characters in the word.

46. In a data processing system, the combination of a data storage device for an intermixed group of numeric and alphabetic words comprising a plurality of data words, each of said words including a plurality of digit positions for storing data thereat in preselected coded character representations and a control digit stored therewith to indicate a numeric or alphabetic word, data receiving means, means for selectively transmitting the words of data between said storage device and said data receiving means in a numeric or an alphabetic mode, and means for interrogating the output of the control digit of each data word prior to the delivery of the same to determine the disposition thereof, said last-named means being responsive to the condition of said controlling digit to act on said selecting means to direct the entire related data word for transmission in the numeric mode or in the alphabetic mode.

47. In a data processing device for a group of words comprising a control word and a plurality of data words, each of said words including a plurality of digit positions for storing data thereat with a character represented at each digit position or as a character represented by a plurality of digit positions according to a predetermined notation, said control word having at least one digit position therein associated with the data words to control the same, data processing means, transmitting means between said storage device and said data processing means for selectively transferring each word digit by digit or for combining a plurality of digits for each character, means for selecting the type of transfer over said transmitting means, means for consecutively interrogating the outputs from the controlling digits of said control word prior to the delivery of the data words, and means dependent upon the condition of the interrogated controlling digit for selecting the type of transfer for the entire related data words between said storage device and said processing means.

48. In a data processing system, the combination of a data storage device for a group of words comprising a control word and a plurality of data words, each of said words including a plurality of digit positions for storing data thereat with coded character representations with a character represented at each digit position or as a character represented by a plurality of digit positions according to a predetermined notation, said control word having at least one digit position therein associated with a related data word to control the same, data processing means, means for selectively transferring the data between said storage device and said data processing means a word at a time for selectively transferring each word digit by digit or for combining a plurality of digits for each character, means for interrogating the output of the controlling digit of each data word prior to delivery, and means dependent upon the condition of the interrogated controlling digit for selecting the type of transfer for the entire data word, said interrogating means for said control word advancing to the next controlling digit position prior to the delivery of the next word.

49. In a data processing system, the combination of a data storage device for a group of words comprising a control word and a plurality of data words, each of said words including a plurality of digit positions for storing data thereat with coded character representations, said control word having one control digit position assigned to a related data word to control the disposition of the same, data receiving means, means for selectively transferring the stored data between said storage device and said data receiving means a word at a time in accordance with the preselected condition of said control digits, means for interrogating the output of the controlling digit in the control word for the selected data word prior to delivery of the same, means dependent upon the predetermined conditioning of the interrogated controlling digit for selectively switching the word between said storage device and said receiving means, and means operative after the delivery of the related data word for advancing to the next controlling digit position in the control word for interrogation of the same prior to delivery of its related data word.

50. In a data processing system for numeric and alphabetic characters, the combination of a data storage device for a group of words comprising a plurality of alphabetic and numeric data words, each including a plurality of digit positions, said plurality of data words including a control word having at least one control digit for each data word assigned to control the interpretation of the data words as alphabetic or numeric in accordance with a predetermined notation, a data processing device, means for transferring the data between said storage and processing devices in numeric and alphabetic modes one word at a time, switch means operative at the end of each word delivery for interrogating the controlling digit for the next data word, and second switch means operative upon the presence of the predetermined notation during interrogation for effecting the transfer of the related data word in an alphabetic or a numeric mode.

51. The combination as claimed in claim 50 wherein said control word remains in said storage means, and means for consecutively advancing said interrogation means to the next controlling digit for interrogation after the delivery of each word.

52. The combination as claimed in claim 51 wherein said control word and said data words form an integral part of said word group.

References Cited in the file of this patent

UNITED STATES PATENTS

| | | |
|---|---|---|
| 2,134,005 | Potts | Oct. 25, 1938 |
| 2,234,694 | Robinson | May 11, 1941 |
| 2,605,965 | Shepherd | Aug. 5, 1952 |
| 2,817,072 | Chien | Dec. 17, 1957 |